United States Patent [19]

Arakawa

[11] Patent Number: 4,780,871
[45] Date of Patent: Oct. 25, 1988

[54] DATA TRANSMISSION SYSTEM

[75] Inventor: Tadashi Arakawa, Tokyo, Japan

[73] Assignee: Canon Kabushiki Kaisha, Tokyo, Japan

[21] Appl. No.: 883,050

[22] Filed: Jul. 8, 1986

[30] Foreign Application Priority Data

| Jul. 9, 1985 | [JP] | Japan | 60-149134 |
| Jul. 9, 1985 | [JP] | Japan | 60-149135 |
| Jul. 9, 1985 | [JP] | Japan | 60-149136 |
| Jul. 9, 1985 | [JP] | Japan | 60-149137 |
| Jul. 9, 1985 | [JP] | Japan | 60-149138 |
| Jul. 9, 1985 | [JP] | Japan | 60-149139 |

[51] Int. Cl.$^4$ .............................................. H04J 3/16
[52] U.S. Cl. ........................................ 370/89; 370/85
[58] Field of Search ............... 370/89, 90, 85, 95, 370/94; 340/825.5, 825.51

[56] References Cited

U.S. PATENT DOCUMENTS

| 4,454,508 | 6/1984 | Grow | 370/89 |
| 4,609,920 | 9/1986 | Segarra | 340/825.5 |
| 4,627,051 | 12/1986 | Shimizu | 370/89 |
| 4,637,013 | 1/1987 | Nakamura | 370/85 |
| 4,701,908 | 10/1987 | Ikeda | 370/85 |

Primary Examiner—Douglas W. Olms
Attorney, Agent, or Firm—Fitzpatrick, Cella, Harper & Scinto

[57] ABSTRACT

A data transmission system for causing one of a plurality of nodes commonly connected to a transmission line to obtain a transmission right by a token as a transmission right assignment instruction. The system includes at least one master node which stores and renews the number of transmission requests that cannot be previously processed. Upon reception of the transmission right by the master node by means of the token, the master node sends a token to assign the transmission right to a slave node having the largest number of transmission requests that could not be previously processed. Otherwise, the master node sends a token to assign the transmission right to a normal downstream slave node to be assigned with the token.

31 Claims, 51 Drawing Sheets

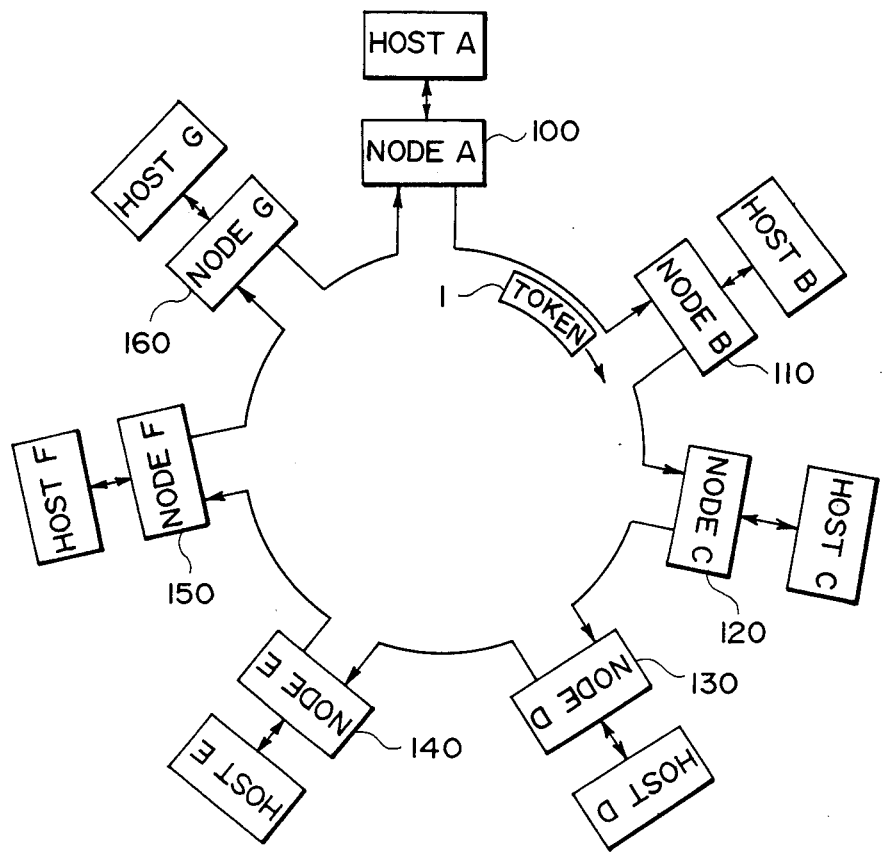
F I G. 1

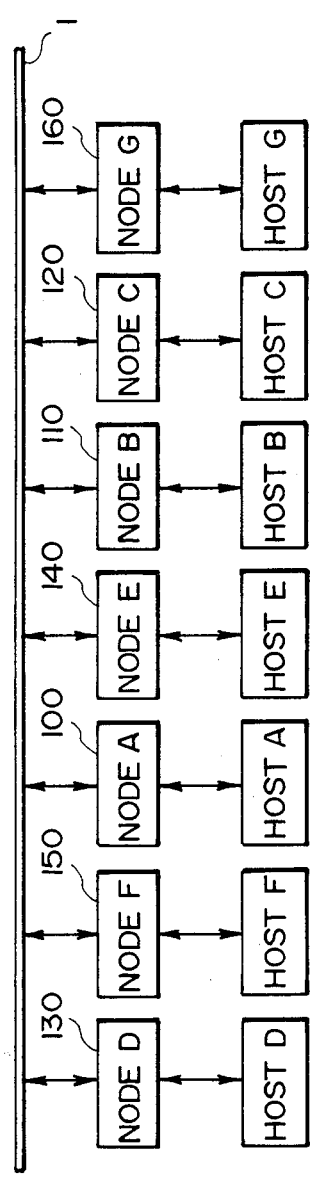
F I G. 2
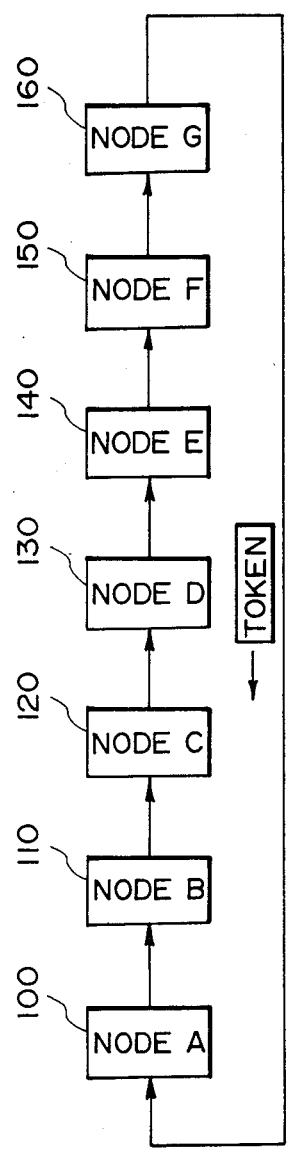
F I G. 3

| SA | DA | TOKEN CODE | THE NUMBER OF TRANSMISSION REQUESTS IN AWAITING |
|----|----|------------|---|
| 201 | 202 | 203 | 204 |

| SA | DA | TRANS-MISSION CODE | TRANSMISSION INFORMATION |
|----|----|---|---|
| 201 | 202 | 205 | 206 |

| SA | DA | TOKEN CODE | THE NUMBER OF TRANSMISSION REQUESTS IN AWAITING | RETURN REQUEST CODE |
|----|----|---|---|---|
| 201 | 202 | 203 | 204 | 207 |

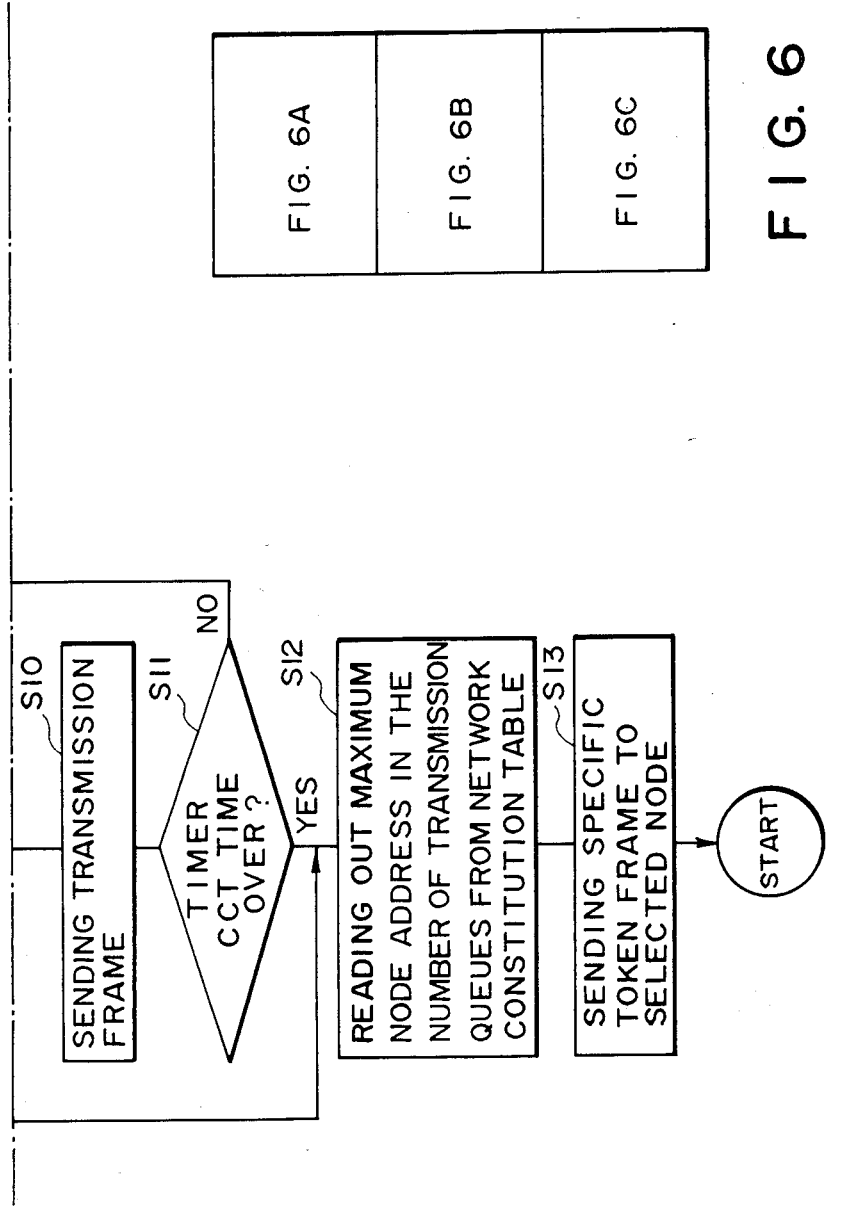

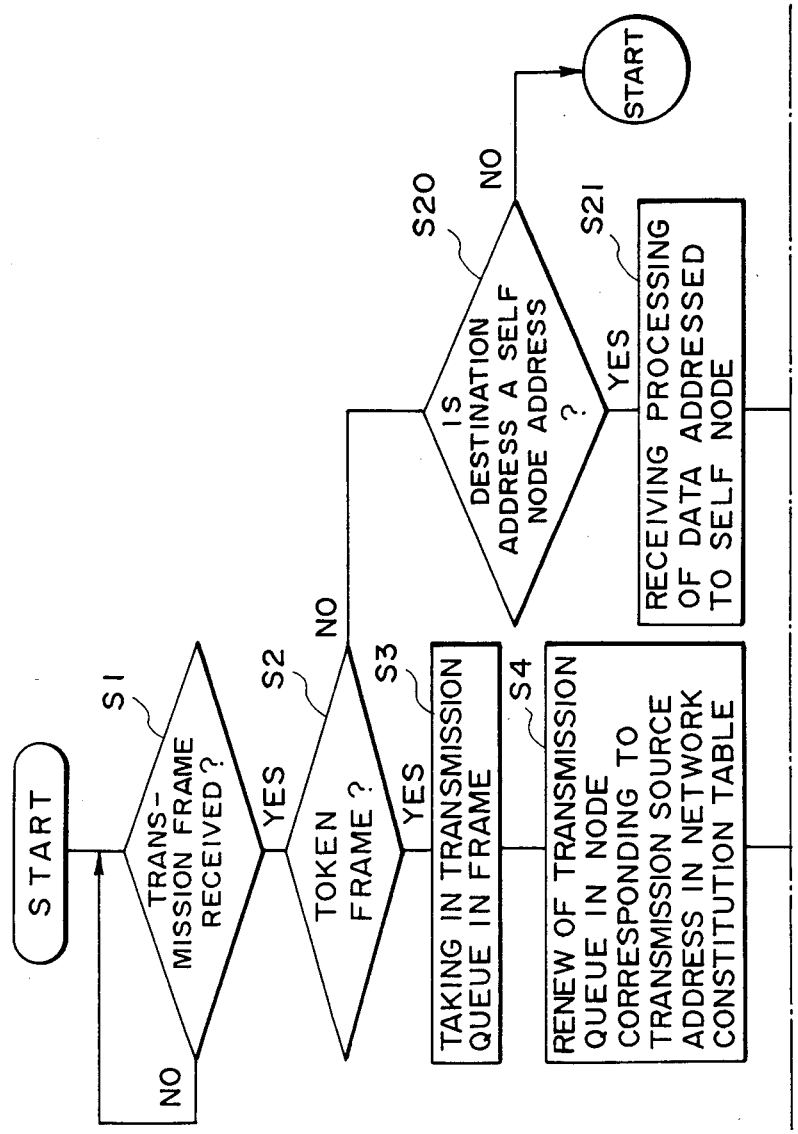
F I G. 6A

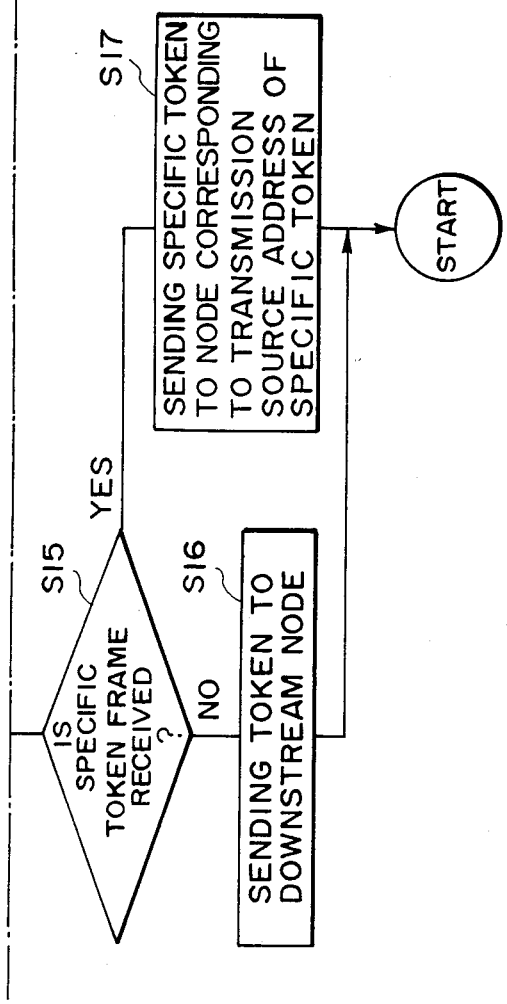

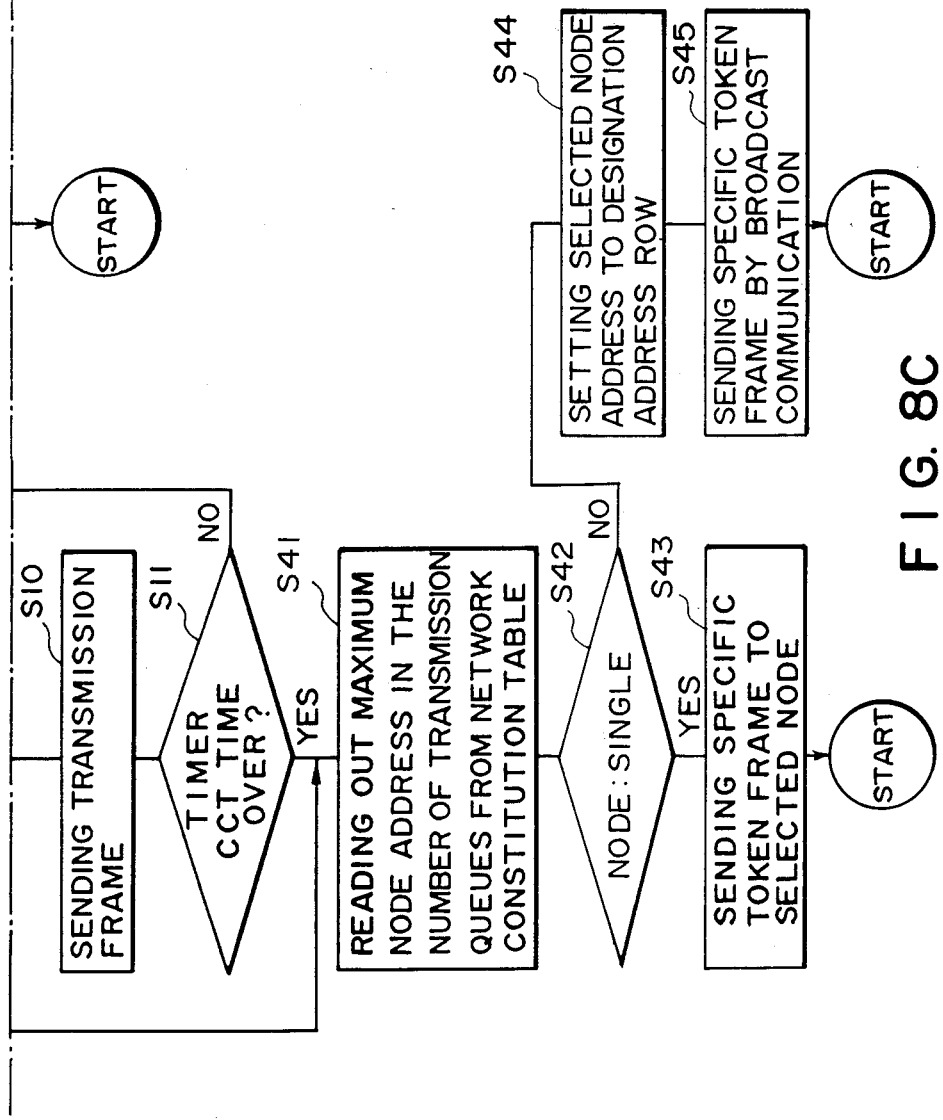

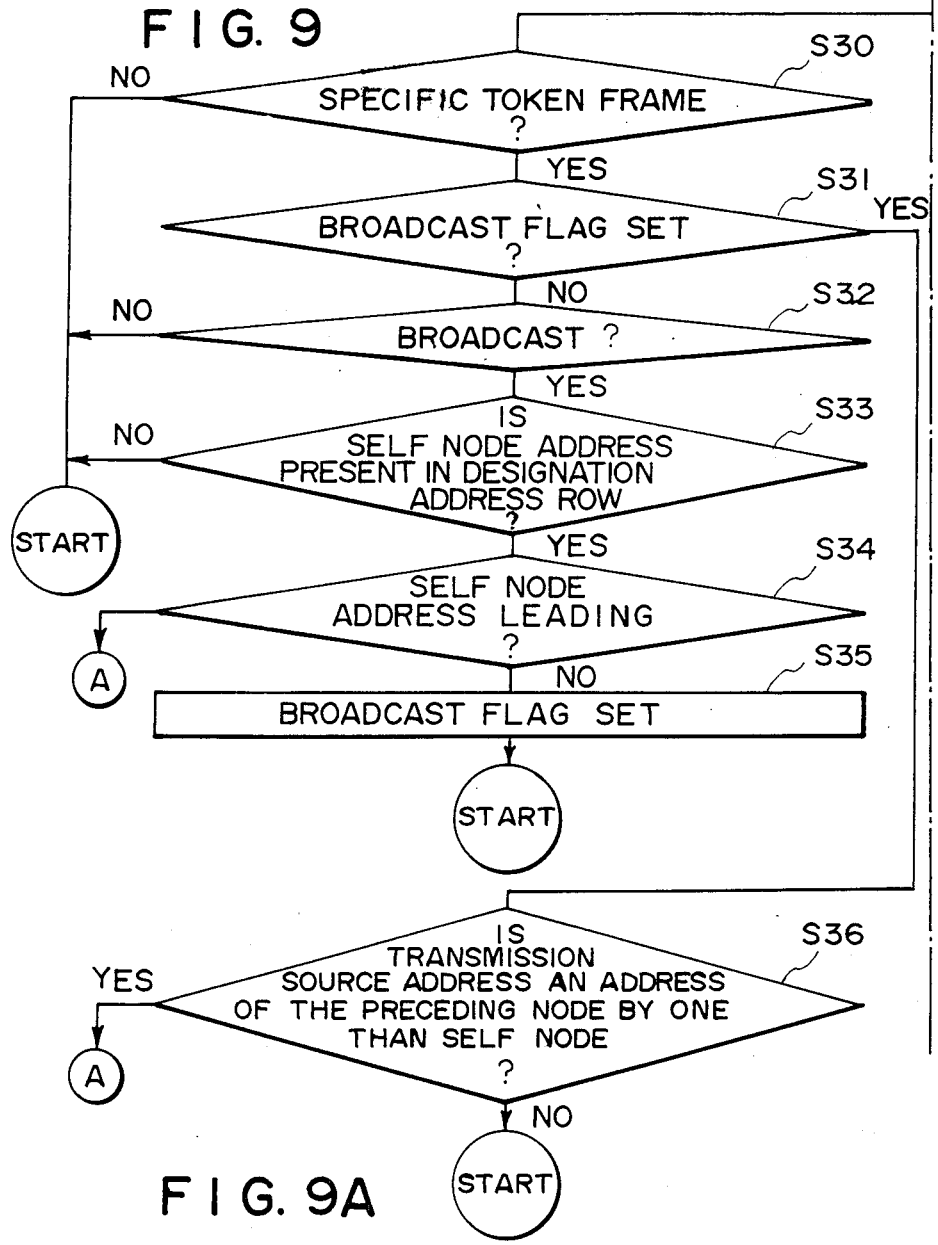

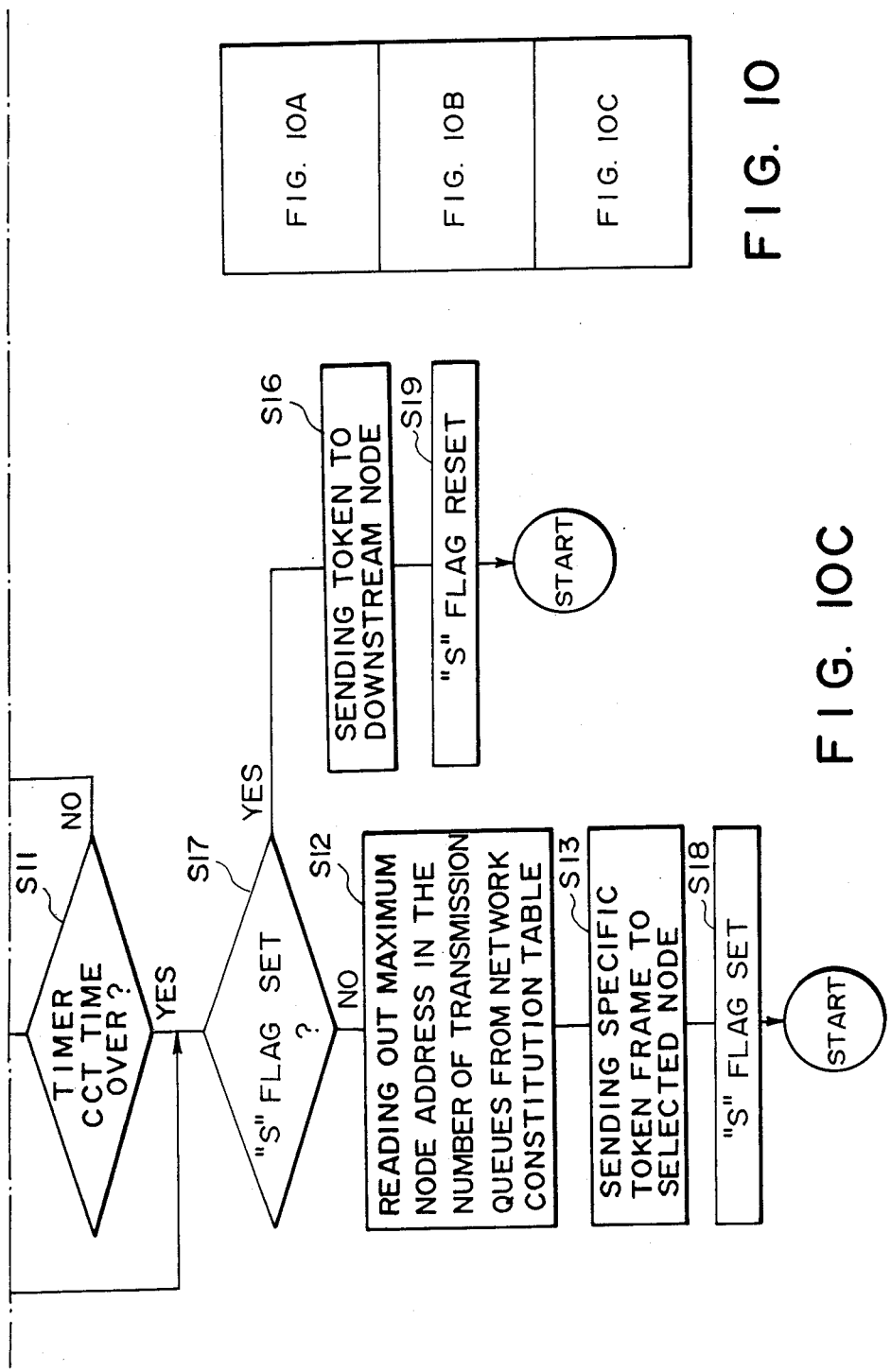

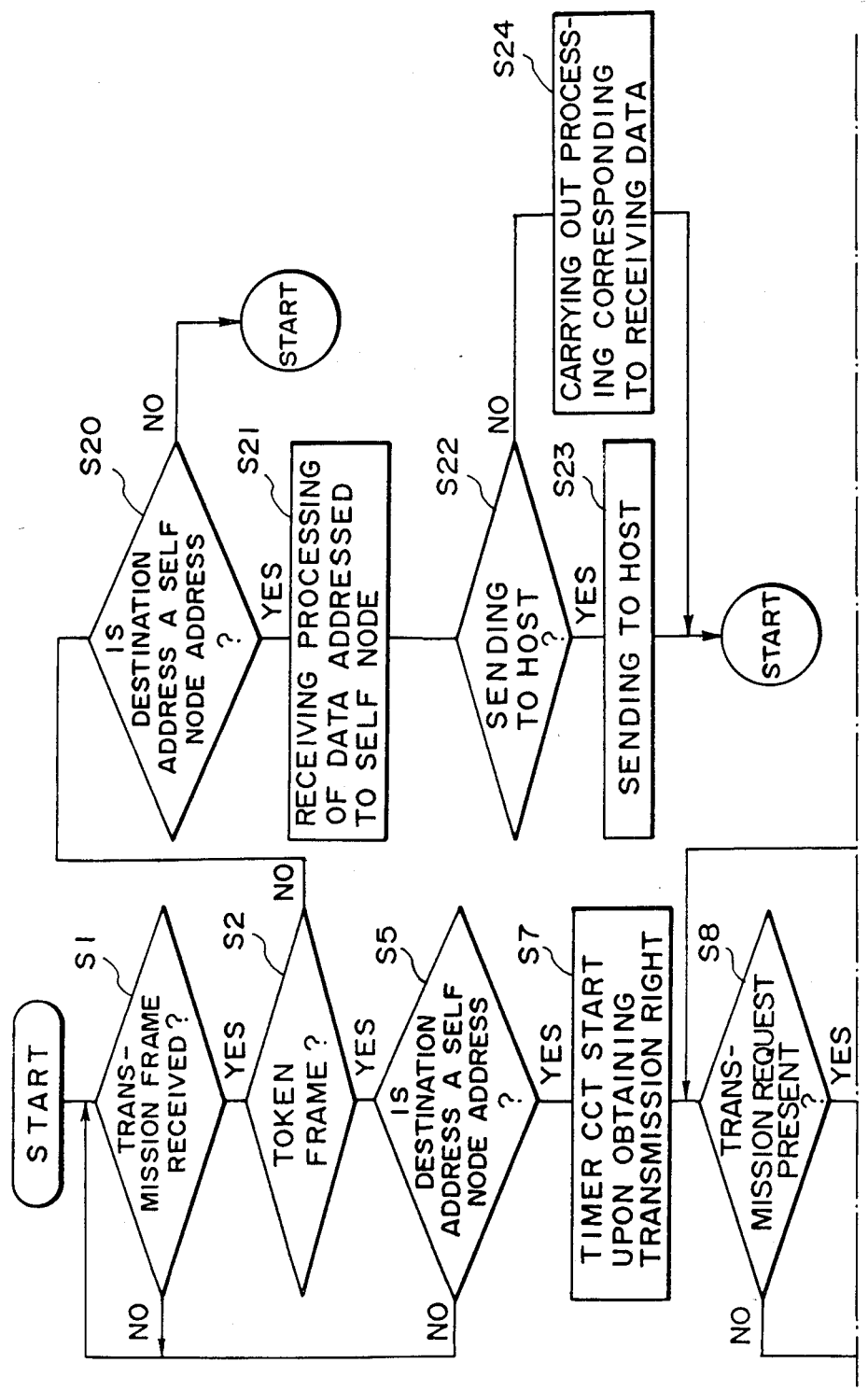
FIG. IIA

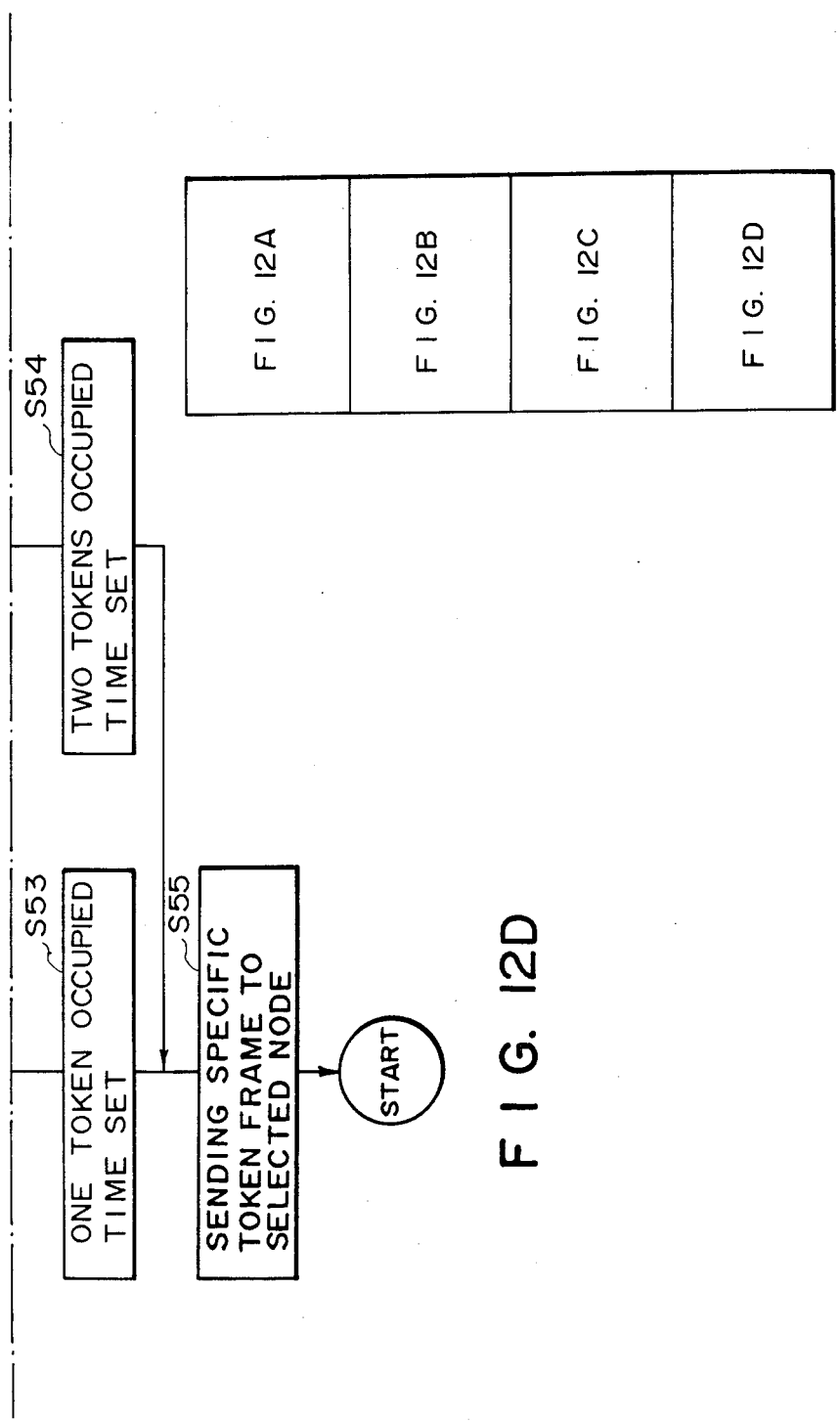

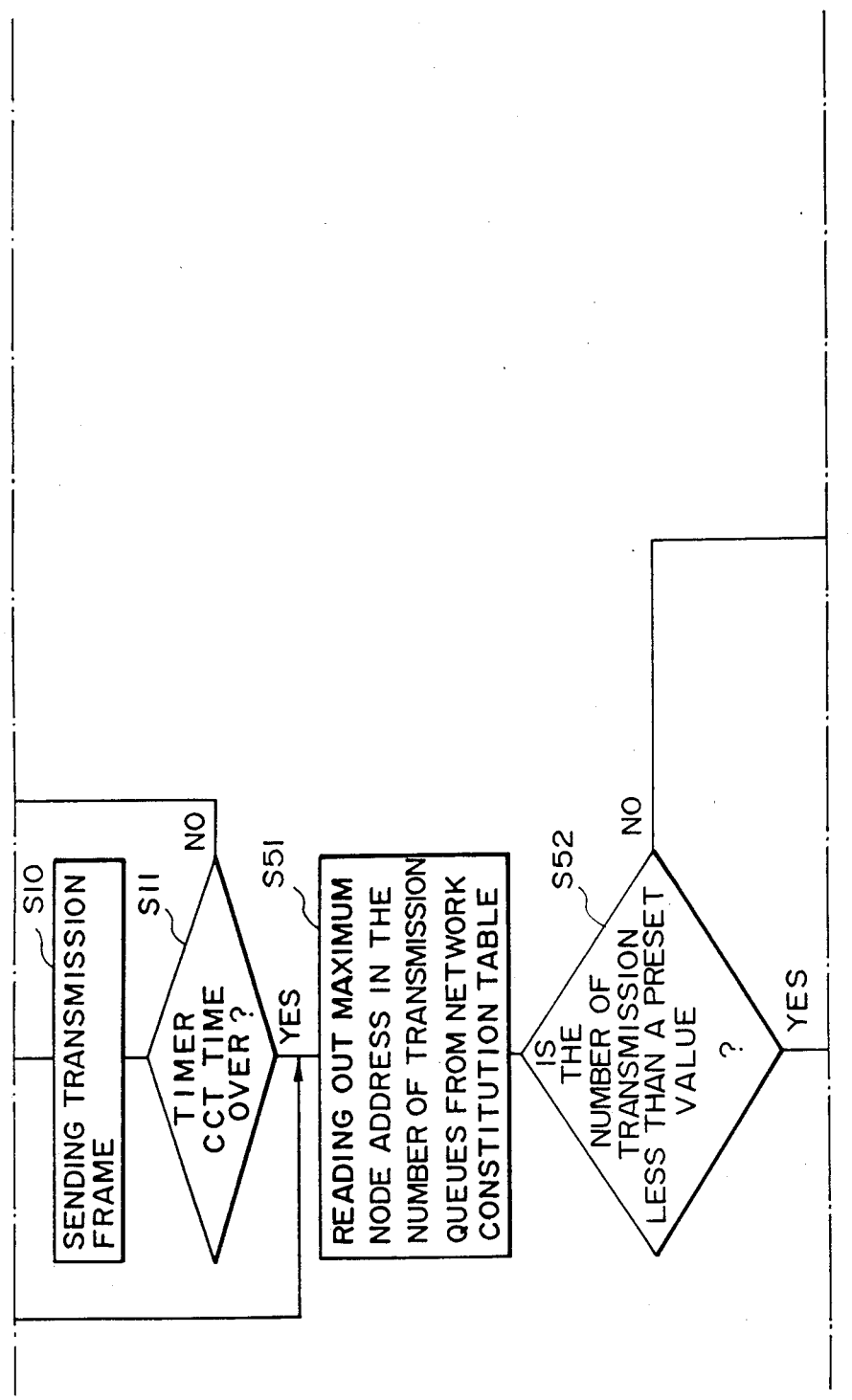

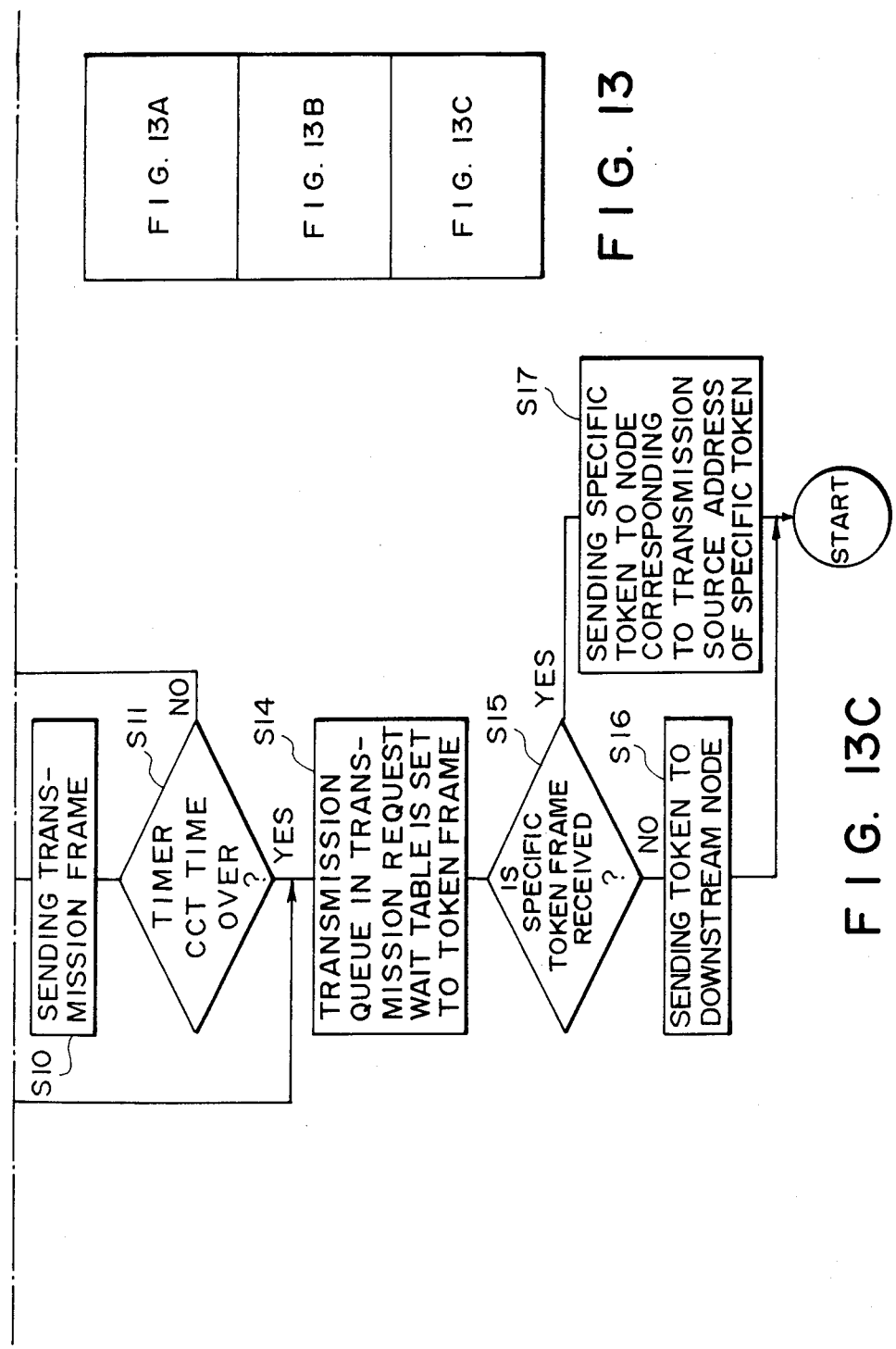

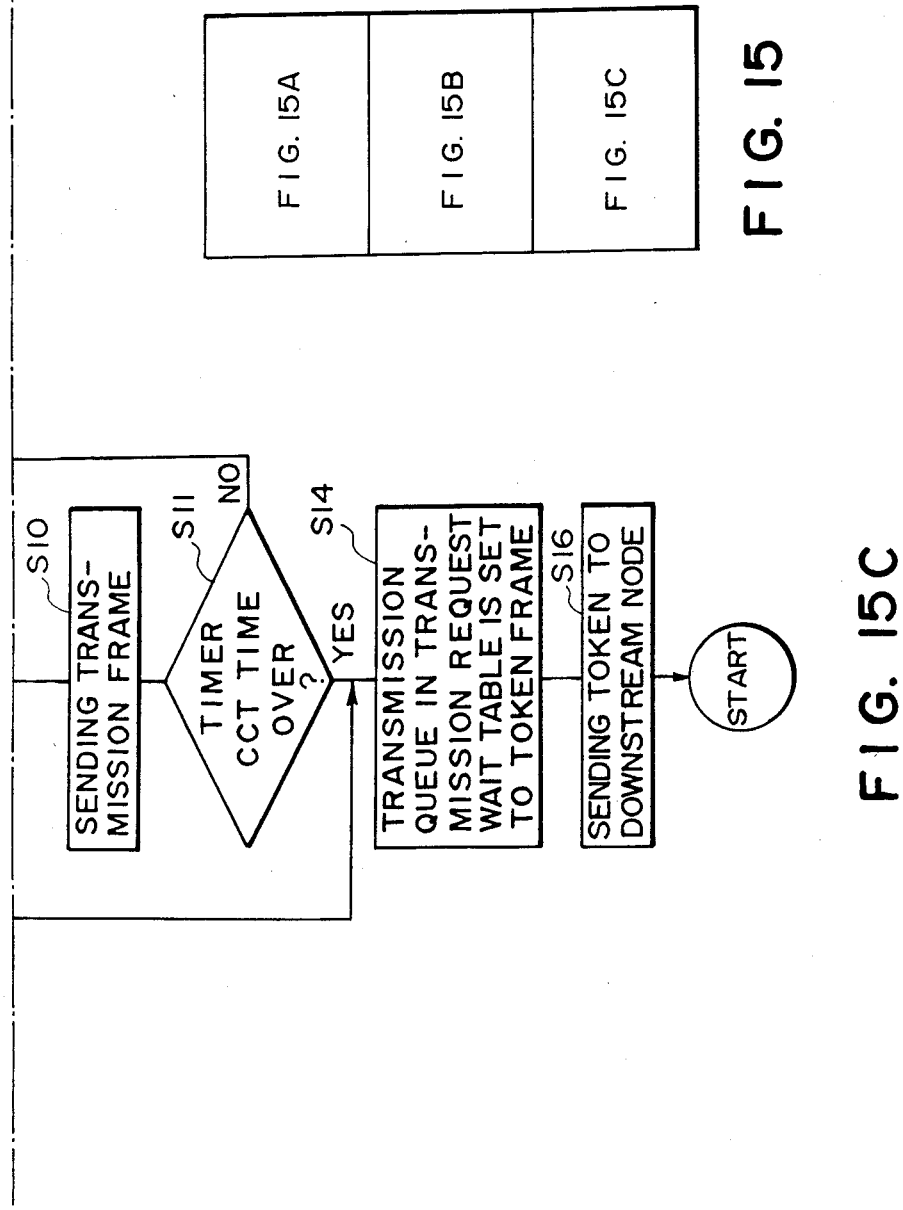

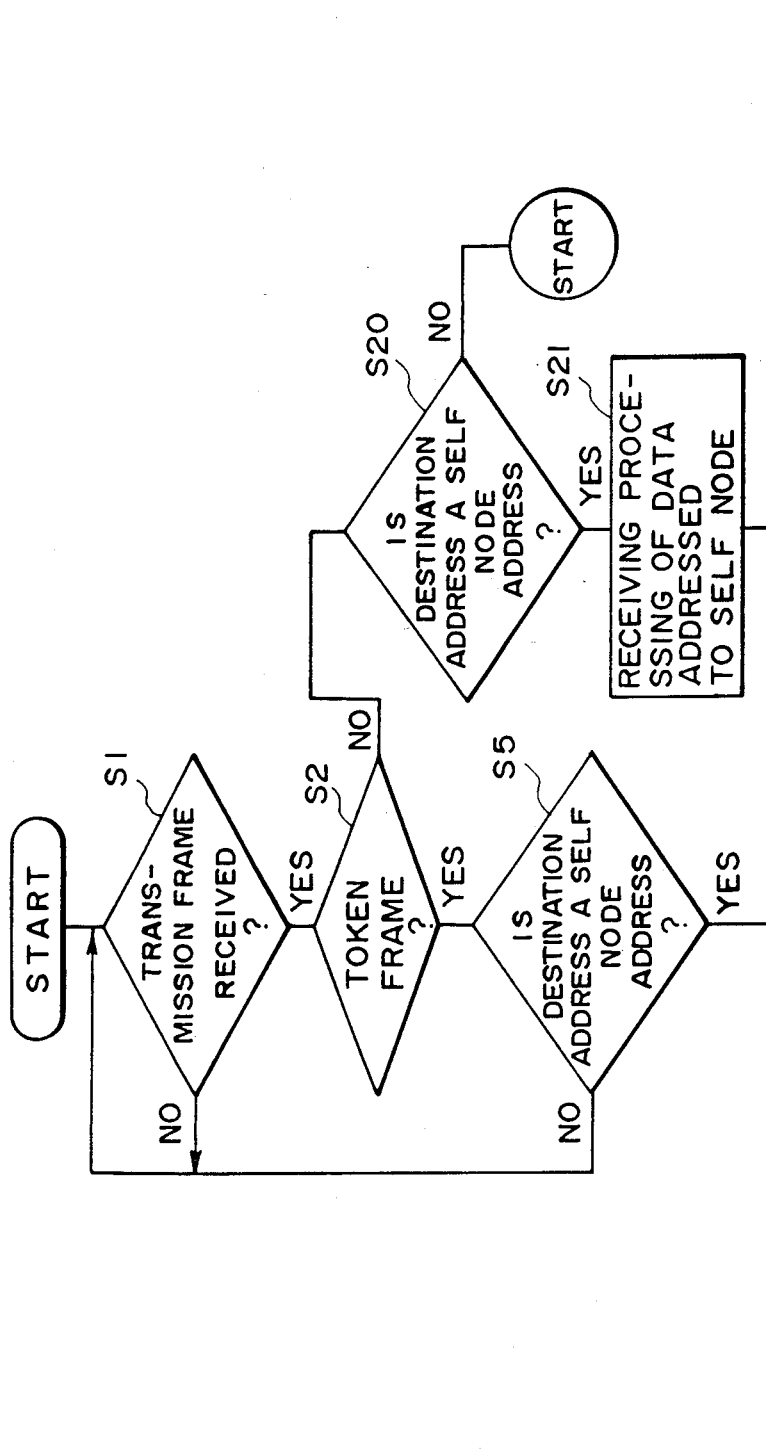
F I G. 15A

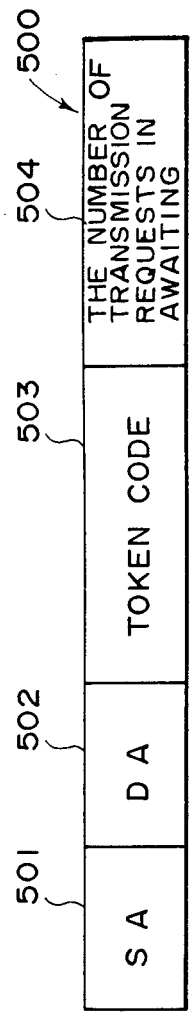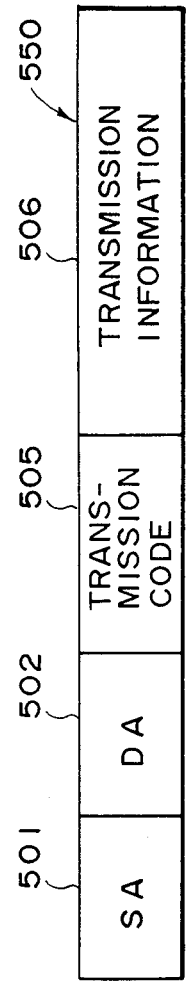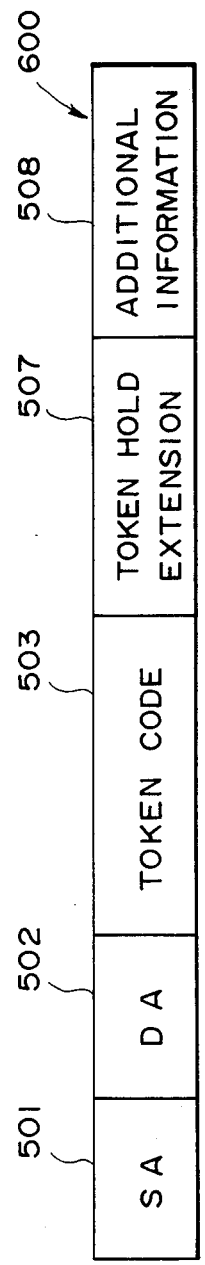

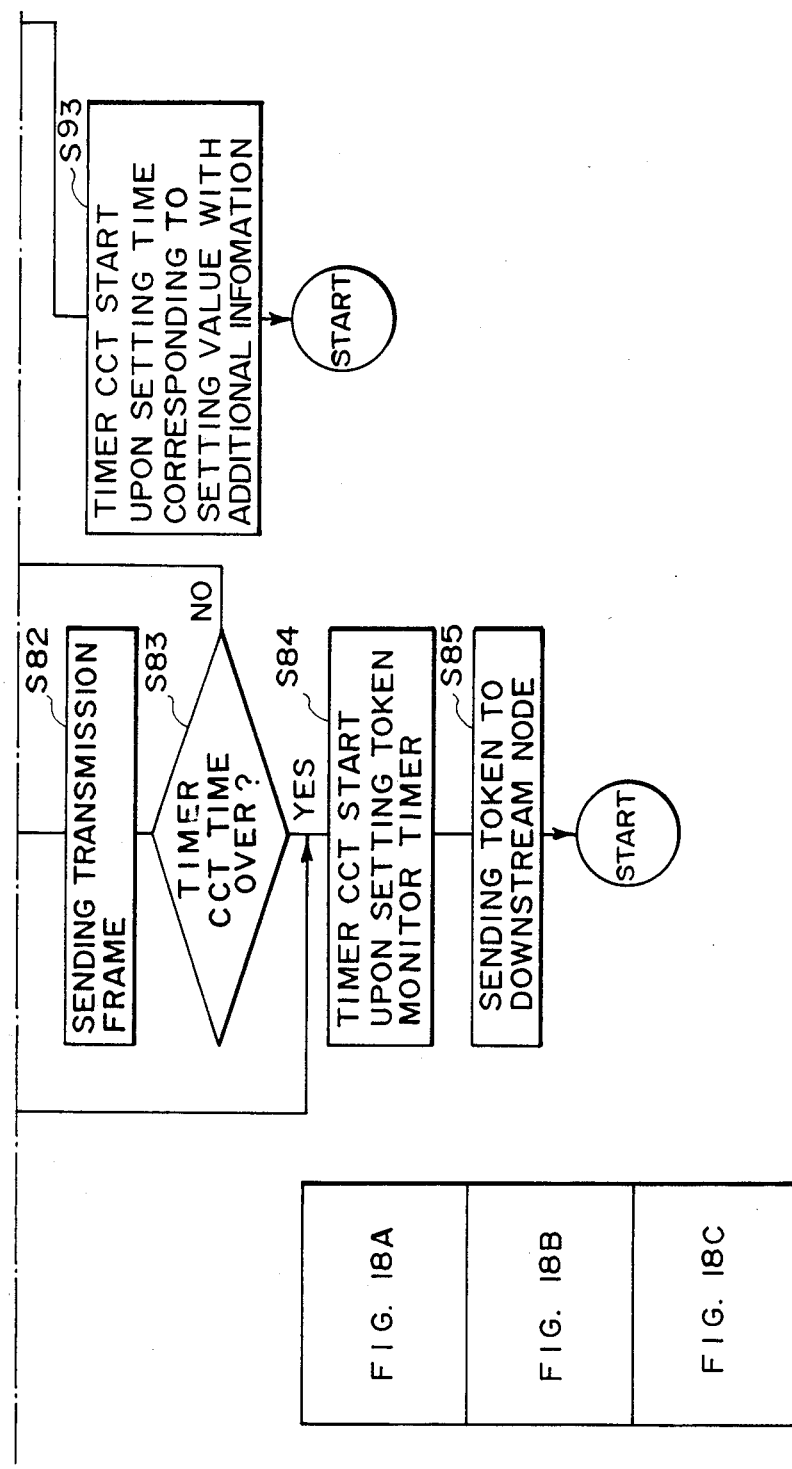

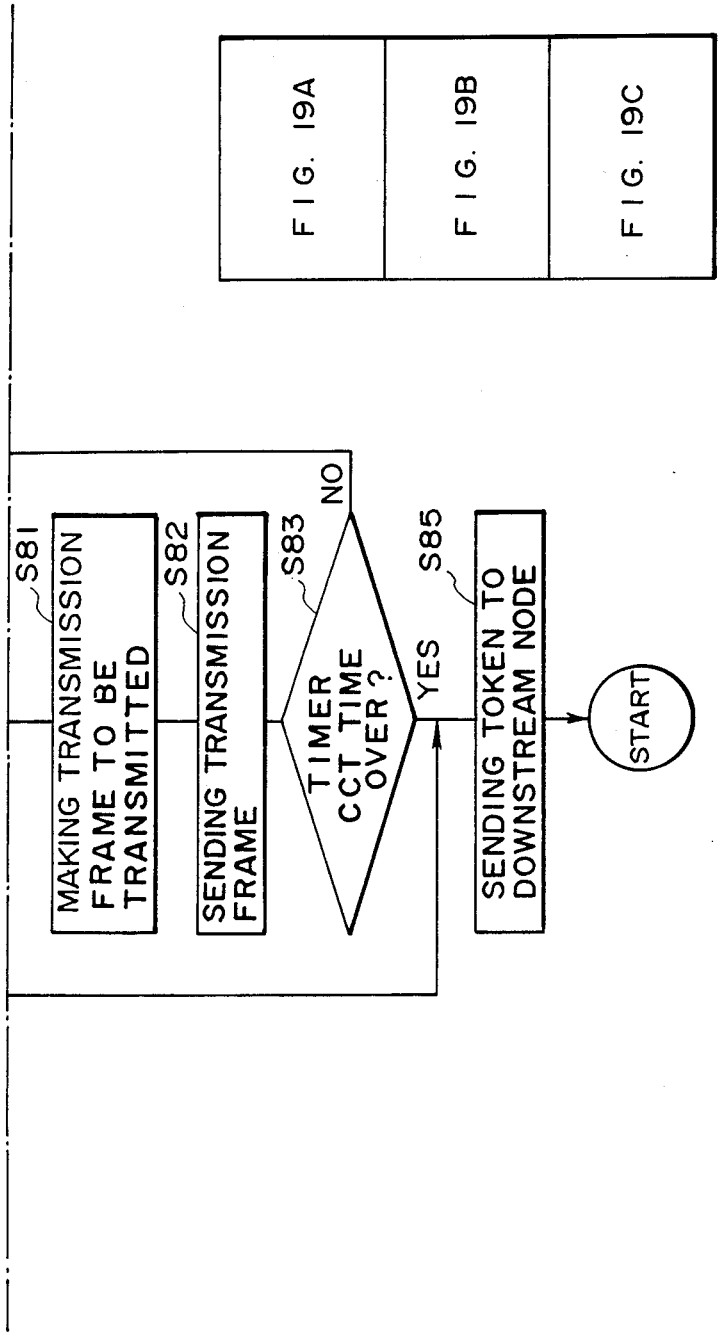

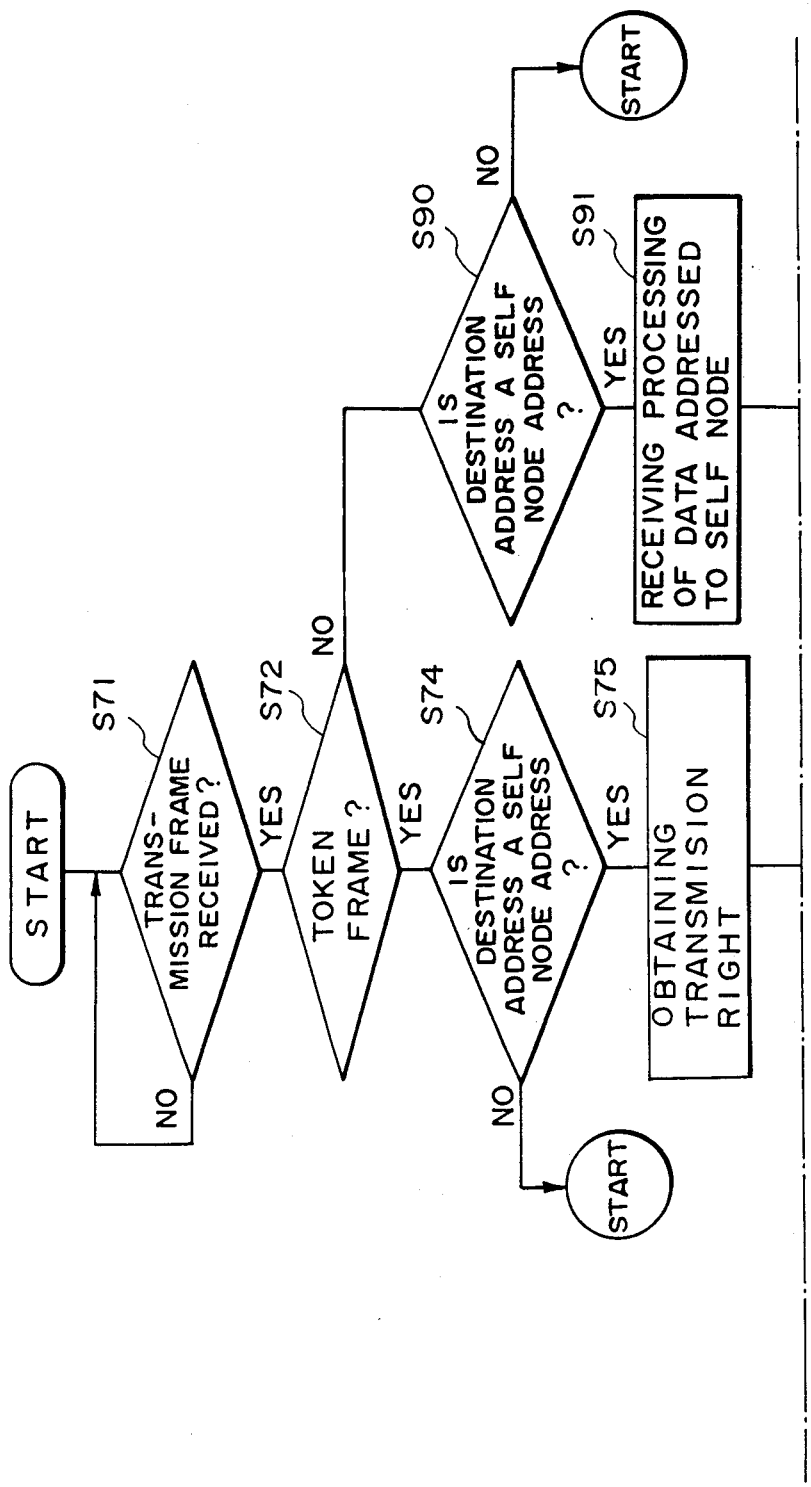
F I G. 19A

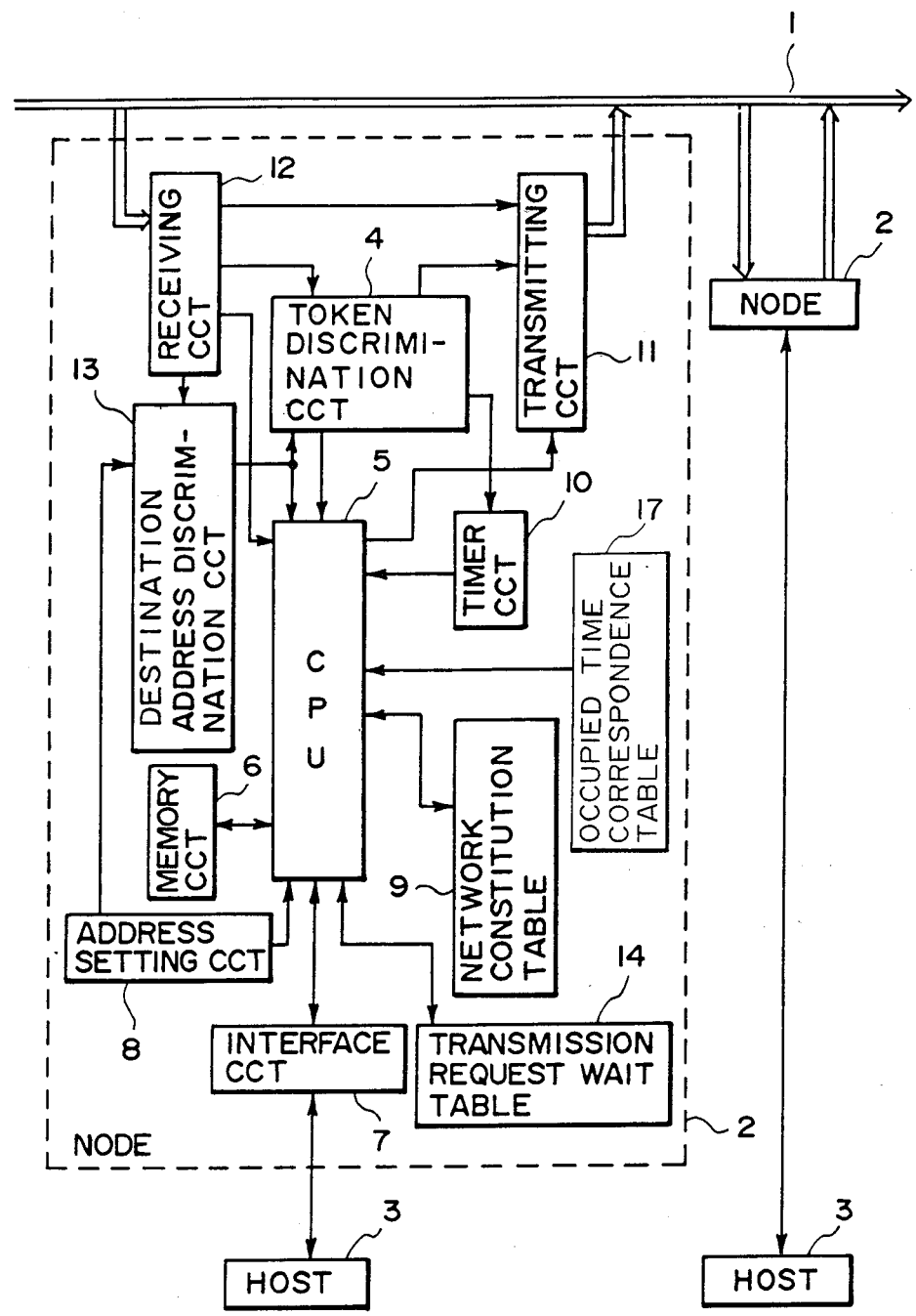
F I G. 20

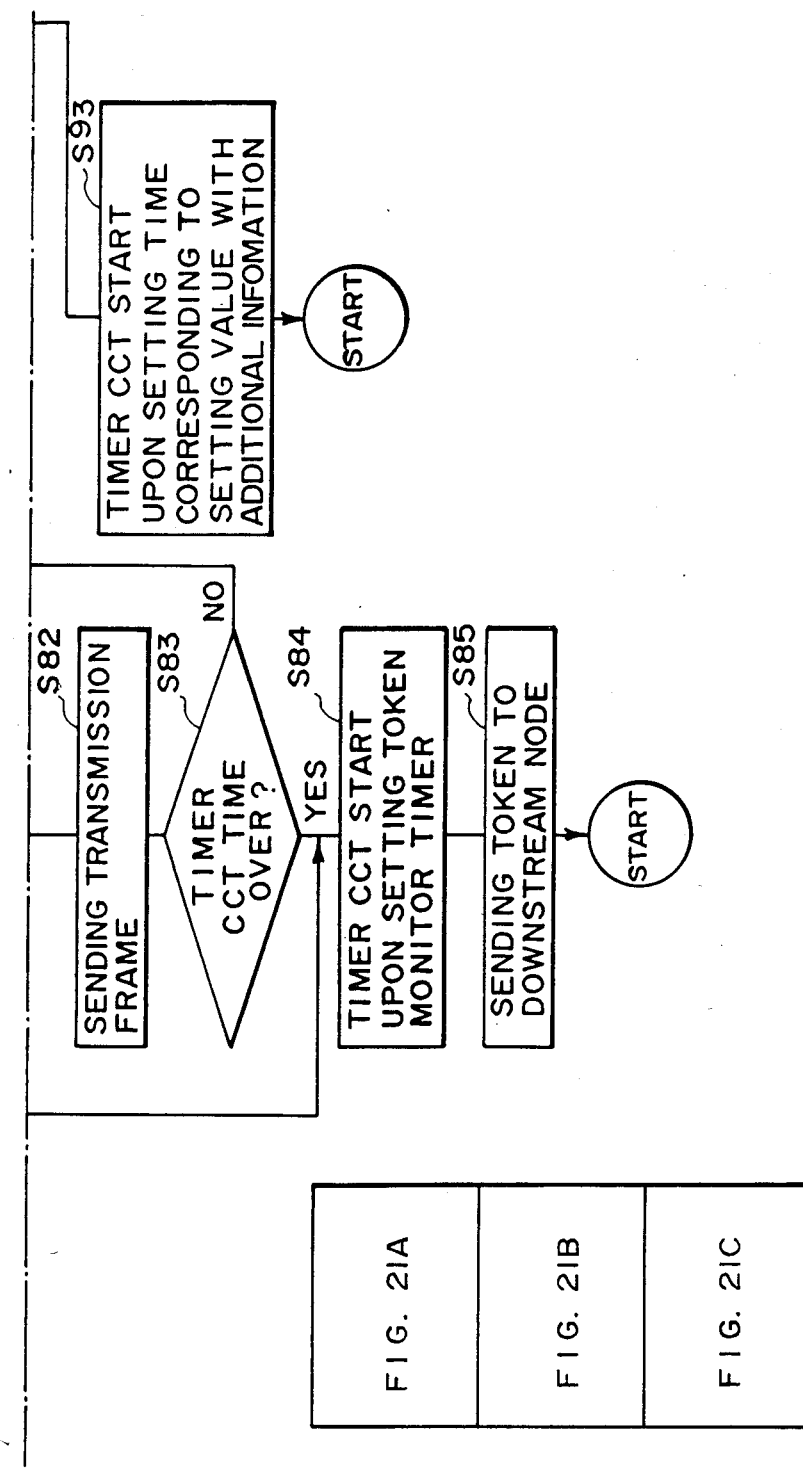

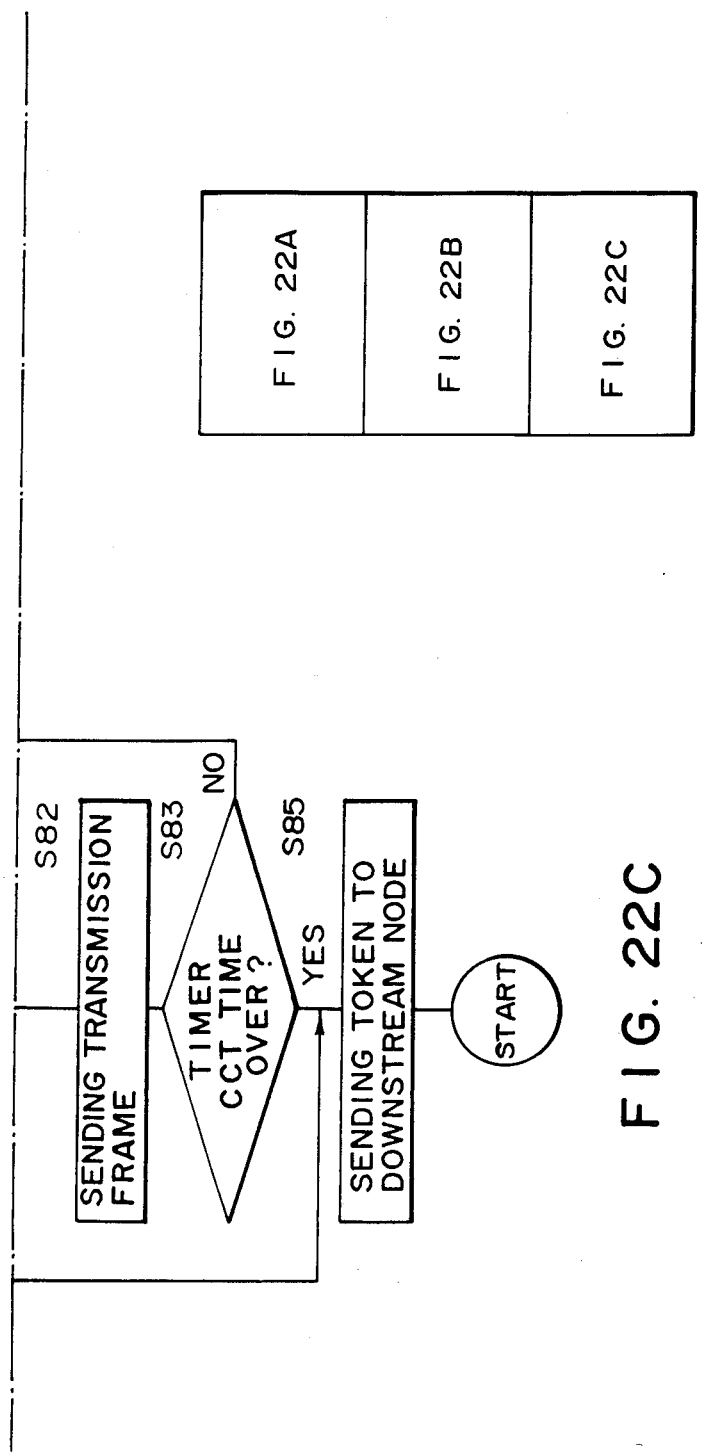

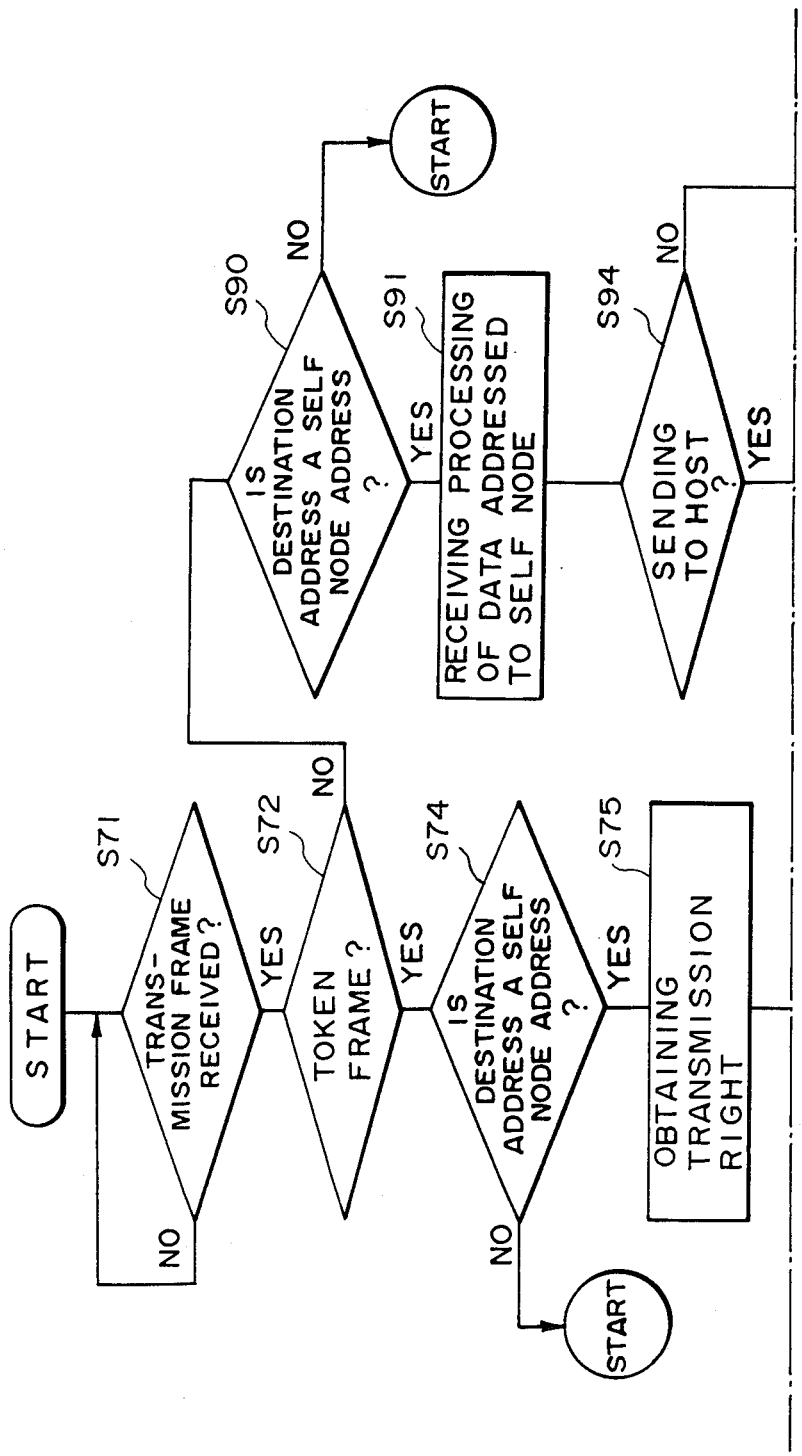

DATA TRANSMISSION SYSTEM

BACKGROUND OF THE INVENTION

The present invention relates to a data transmission system wherein a plurality of transmission devices are interconnected through a transmission medium and exchange data therebetween.

A local area network (LAN) has been recently popular to allow data communications between a large number of transmission controllers (to be referred to as nodes hereinafter) through a transmission line as a transmission medium. Among various LAN communication schemes, a token passing system, for causing only the node receiving a token as a transmission right assignment instruction to have the transmission right, has advantages in that the system can control the transmission line occupied times of all nodes even when there is high traffic in the network without degrading transmission efficiency.

Token passing system networks are classified into a token ring system and a token bus system according to their system configrations. The LAN standards of these systems are proposed by IEEE Project 802.

In the token ring system the direction of token passing is determined. The next token destination is always the adjacent node which is physically determined.

A token ring system LAN is exemplified in FIG. 1. Transmission lines 100 to 160 are respectively nodes A to G constituting a LAN. Host devices A to G (200 to 260) such as work stations, facsimile systems or file servers are respectively connected to the nodes A to G (100 to 160). A token 1 can be accessed as follows.

(1) A node with transmission data monitors passing of the token while performing regenerative repeating of a reception signal string. If the priority of transmission data is higher than or equal to that of the token, access control token bits are updated to represent the updated frame leading. A bit string from the frame control to frame status is sent out.

(2) A node represented by a destination address in a frame determines whether the destination address coincides with the self node address. If a coincidence is established, the node copies the frame. Coincidence detection and frame copying are set in the frame status, and a response signal is sent back to a source node.

(3) The source node erases the received frame and detects a coincidence between the source address and the self node address to determine the return of the leading frame already sent through the destination nodes. Thereafter, the source node sends out a token to assign the transmission right to the next node.

A conventional token bus system LAN is shown in FIG. 2. The same reference numerals as in FIG. 1 denote the same parts in FIG. 2.

Since the conventional bus LAN commonly uses a single transmission line, it constitutes a logical ring so that the token is sent to each adjacent node one by one. Assume that the same logical ring as in FIG. 1 is formed. A token passing diagram formed by the logical ring is illustrated in FIG. 3. Each node detects a preceding node which sends a token thereto and a downstream node which receives the token therefrom according to MAC control commands "who-follow" and "set-successor". Each node also detects if a new node added to the network is present by sending a MAC control command "solicit-successor" and monitoring a response. If the new node is present, each node sets it in the logical ring.

If a plurality of additional nodes are present, the response signals are subjected to a conflict or contention. In order to prevent this, a MAC control command "resolve-contention" is used.

A maximum token occupied time of a node obtaining the transmission right is predetermined in each LAN system. The node holds the transmission right within the maximum token occupied time and sends the token to the downstream node.

Although the token passing systems are good transmission control systems, as described above, they poses the following problem. Because equipment is actually connected to each node in a LAN, equal token passing and equal token assignment within the maximum token occupied time, both of which are the characteristics of the token passing system, inevitably result in inconvenience.

In a system having both personal and host computers as equipment, the host computer for providing communication service to all other nodes more frequently generates a transmission request. If the token is assigned from a given host computer to another, the given host computer cannot obtain the transmission right again until the token is sent through all other nodes. Therefore, the host computer is kept in transmission wait status and the number of transmission requests continues to increase.

Even if the token is obtained again, it must be assigned to the next node before all transmission requests are handled, because of the limits of the maximum token occupied time.

According to the conventional token passing control method, the opportunity for communication service to a node with a large number of transmission requests is the same as that for communication service to other nodes. Therefore, this method cannot satisfy all transmission requests. In the worst case, the system operation is interrupted.

SUMMARY OF THE INVENTION

The present invention has been made in consideration of the above situation, and has as its object to provide a data transmission system for performing data transmission with high efficiency.

It is another object of the present invention to provide a data transmission system having a plurality of transmission devices connected to each other through a transmission medium, a transmission device being adapted to obtain the transmission right by only a token as a transmission right assignment instruction, wherein the transmission right can be efficiently assigned according to the number of transmission requests of the transmission devices.

It is still another object of the present invention to provide a data transmission system wherein an opportunity for obtaining the transmission right is increased for a device which has frequently waited for transmission.

It is still another object of the present invention to provide a data transmission system wherein the token occupied time can be controlled in response to transmission request wait information.

The above and other objects, features and advantages of the present invention will be apparent from the following description in conjunction with the accompanying drawings.

BRIEF DESCRIPTION OF THE DRAWINGS

FIG. 1 is a schematic diagram showing a conventional token ring system local area network (LAN);

FIG. 2 is a schematic diagram showing a conventional token bus system LAN;

FIG. 3 is a schematic diagram showing logical token passing;

FIGS. 5A to 5E are respectively data formats showing structures of token frames;

FIGS. 6, 6A to 6C and 7, 7A to 7C are flow charts for explaining a first embodiment of a transmission control sequence (i.e., protocol) according to the present invention;

FIGS. 8, 8A to 8C and 9, 9A to 9C are flow charts for explaining a third embodiment of a transmission control sequence according to the present invention;

FIGS. 10, 10A to 10C and 11, 11A to 11C are flow charts for explaining a fourth embodiment of a transmission control sequence according to the present invention;

FIGS. 12, 12A to 12D and 13, 13A to 13C are flow charts for explaining a fifth embodiment of transmission control sequence according to the present invention;

FIGS. 14, 14A to 14D and 15, 15A to 15C are flow charts for explaining a sixth embodiment of a transmission control sequence according to the present invention;

FIGS. 17A to 17C are respectively data formats showing other structures of the token frames;

FIGS. 18, 18A to 18C and 19, 19A to 19C are flow charts showing a seventh embodiment of a transmission control sequence according to the present invention;

FIG. 20 is a block diagram showing still another arrangement of the transmission device; and FIGS. 21, 21A to 21C and 22, 22A to 22C are flow charts showing an eighth embodiment of a transmission control sequence according to the present invention.

DETAILED DESCRIPTION OF THE PREFERRED EMBODIMENTS

First Embodiment

A first embodiment of the present invention will be described with reference to the accompanying drawings.

Node Constitution (FIG. 1)

Figure 4:
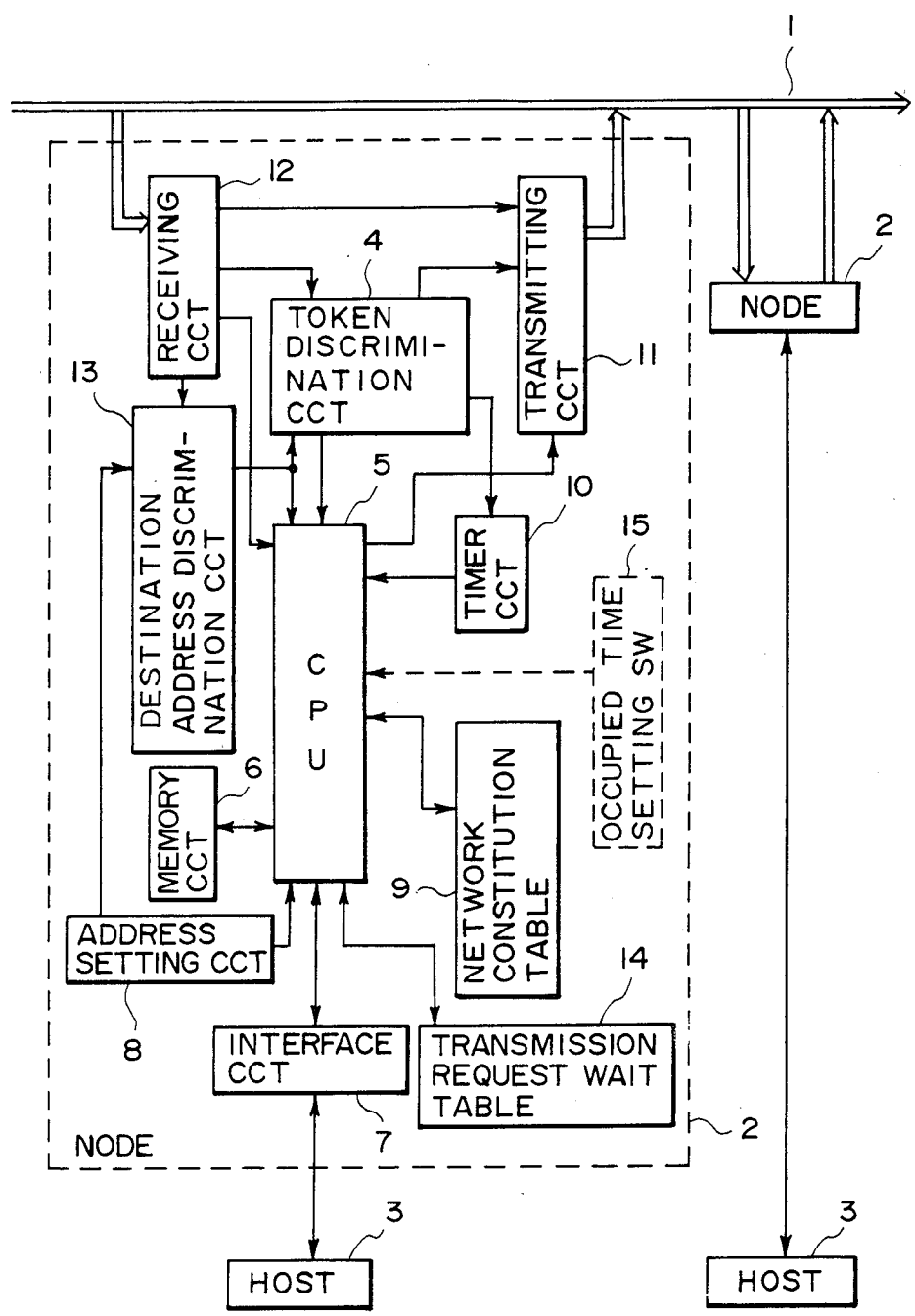
FIG. 4 is a block diagram showing an arrangement of a transmission device (i.e., a node)

FIG. 4 is a block diagram showing a node according to an embodiment of the present invention. The node corresponds to each node constituting the network system in FIG. 2. The detailed description with reference to FIG. 2 has been made and will be omitted here. The node in FIG. 4 also serves as that in the following embodiments.

Nodes 2 are commonly connected to a LAN network transmission line 1. Each node 2 serves as a transmission control device. Computers and office equipment (to be referred to as host devices hereinafter) 3 are connected to the corresponding nodes 2.

Each node 2 comprises transmitting and receiving circuits 11 and 12, a token discrimination circuit 4, a controller (to be referred to as a CPU hereinafter) 5, a memory circuit 6, an interface circuit 7, an address setting circuit 8, network constitution table 9, a timer circuit 10, a destination address discrimination circuit 13, and a transmission request wait table 14. The transmitting and receiving circuits 11 and 12 perform data exchange with the transmission line 1. The token discrimination circuit 4 discriminates whether the reception data in the receiving circuit 12 is a token. The CPU 5 performs the entire control of the node, processing the transmission data, decoding of the reception data, and timing control such as data analysis and communication operation. The memory circuit 6 stores the transmission/reception data and the protocol or the like of the CPU 5. The interface circuit 7 interfaces with the host device 3. The address setting circuit 8 comprises a switch or the like for setting an address (i.e., the node address) assigned to each node. The network constitution table 9 stores network constituting factors such as address information of the nodes in the network, the number of registered transmission queues, and the address of the node (a downstream node) which is to receive the token next. The timer circuit 10 sets a maximum token occupied time or the like. The transmission request wait table 14 updates and stores the number of transmission request frames sent from the host device 3 and stored in the memory device 6.

An address value set by the address setting circuit 8 and node information stored in the network constitution table 9 are read out by the CPU 5 and used as a destination address and a source address in the transmission/reception mode.

The transmission request wait table 14 must be arranged in each slave node.

The data to be transmitted from the host device 3 can be sent onto the transmission line 1 through the transmitting circuit 11 only when the receiving circuit 12 receives the self node token and obtains the transmission right.

The data to be transmitted is temporarily stored in the memory circuit 6 in the node 2 and is formatted (i.e., packeted) as transmission data. The transmission data is added with the destination node address as the destination address value from the network constitution table 9 and the set value as the source address from the address setting circuit 8. The packet is thus sent onto the transmission line 1.

The receiving circuit 12 receives the transmission data from the transmission line 1 and the destination address discrimination circuit 13 discriminates the destination address value in the reception data. If the destination address value is discriminated as a value, i.e., the self node destination data, set by the address setting circuit 8 in the self node, a coincidence is responded to by the CPU 5. The transmission data is thus received in this node. If the received transmission data is internode data such as transmission control data, it is processed by this node. However, if the received transmission data is transmission data for the host device 3, it is analyzed and edited by the CPU 5 to some extent. The processed data is then sent to the host device 3 connected to this node.

Based on the hardware configuration and the principle of token passing, the token is continuously sent to the downstream nodes within the network using a single transmission line. If all nodes in FIG. 2 are enabled, the token can pass through the nodes in the manner as shown in FIG. 3.

The network system configuration will be exemplified as the one shown in FIG. 2.

Network Transmission Frame (FIG. 5)

The formats of transmission frames used in the network system are shown in FIGS. 5A, 5B and 5C.

FIG. 5A shows a token frame 200. The token frame 200 consists of a source address (to be referred to as an SA hereinafter) 201, a destination address (to be referred to as a DA hereinafter) 202, a token code 203 representing a token frame, and information 204 representing the number of transmission requests in awaiting (to be referred to as a transmission queue 204 hereinafter). The transmission queue 204 represents the number of transmission requests currently registered as transmission waiting within the token source node. This number is the number of transmission requests which could not be processed within the maximum token occupied time and which are to be processed in the next token reception. FIG. 5B shows a data transmission frame 250. The data transmission frame 250 includes a transmission code 205 representing a data frame and transmission information 206. FIG. 5C shows a specific token frame 300. The specific token frame 300 includes a return request code 207 for requesting return of the token to the source node after transmission is completed.

A specific node (to be referred to as a master node hereinafter) for receiving all token frames 200 from the transmission line 1 and constantly updating the transmission queues 204 as the transmission node information of the token frames 200 in the network constitution table 9 is arranged in the network constituted as described above.

The master node detects the number of transmission requests in awaiting at the token reception timing of each of the nodes constituting the network.

Figure 6B:
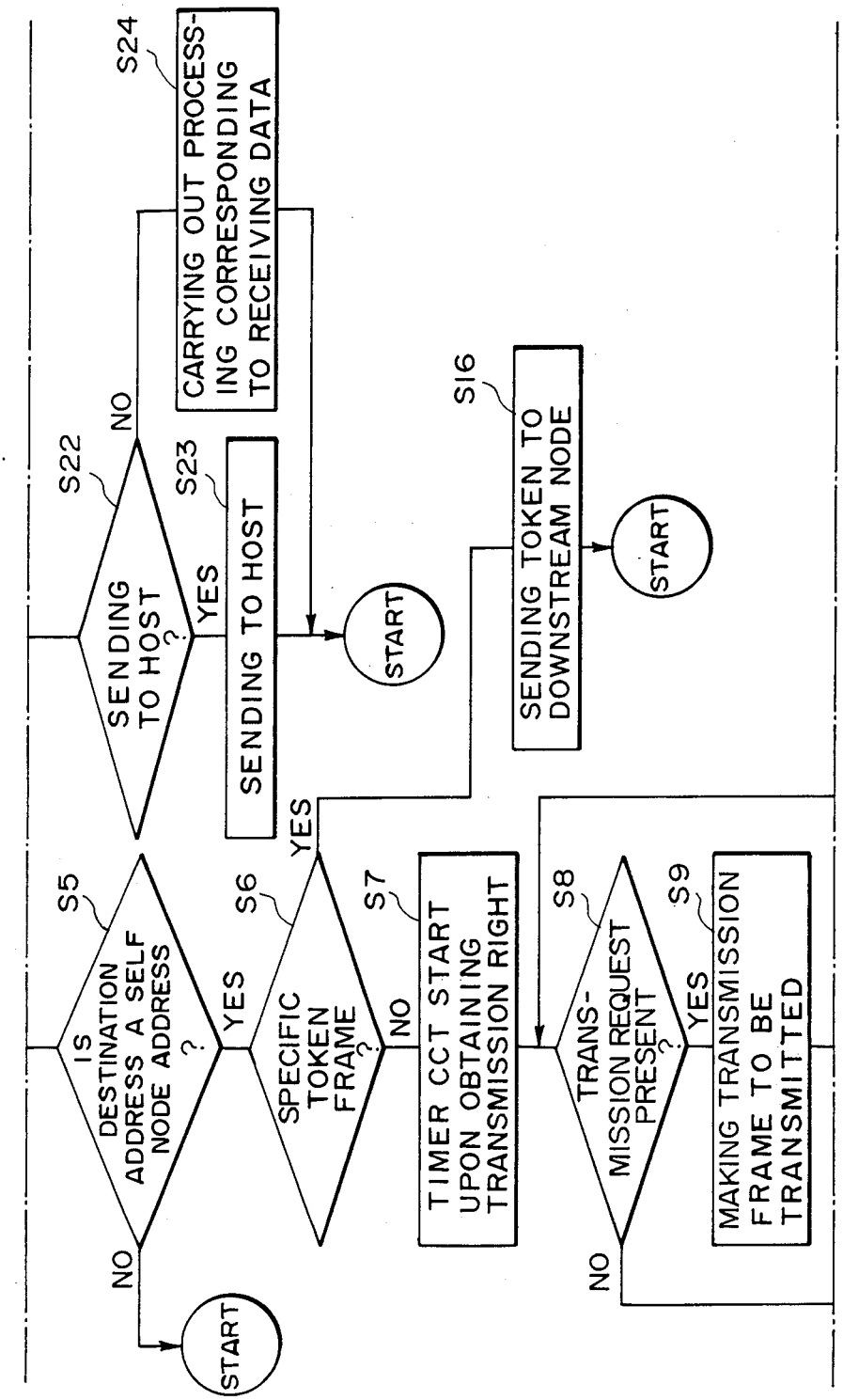
Figure 7A:
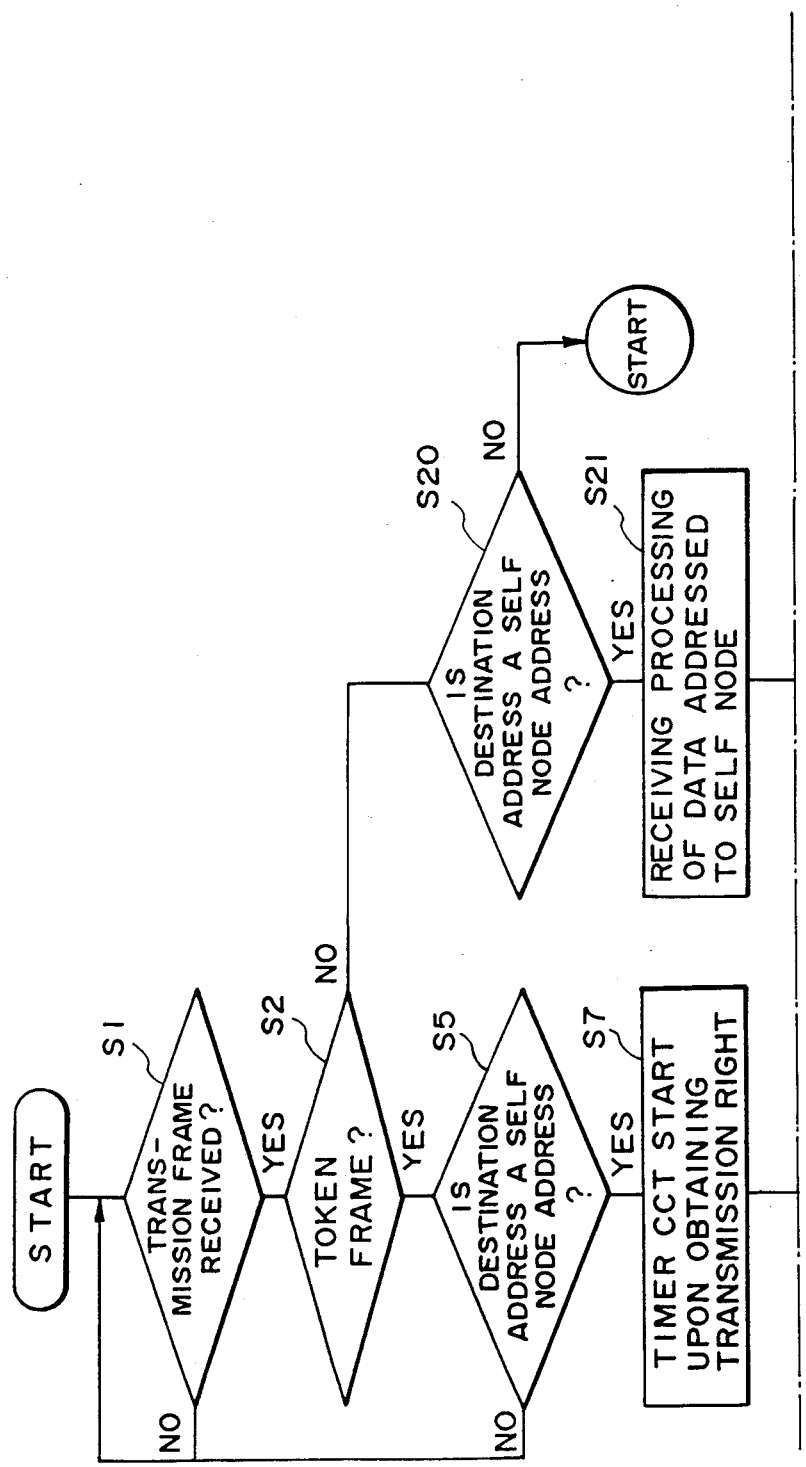
Figure 7B:
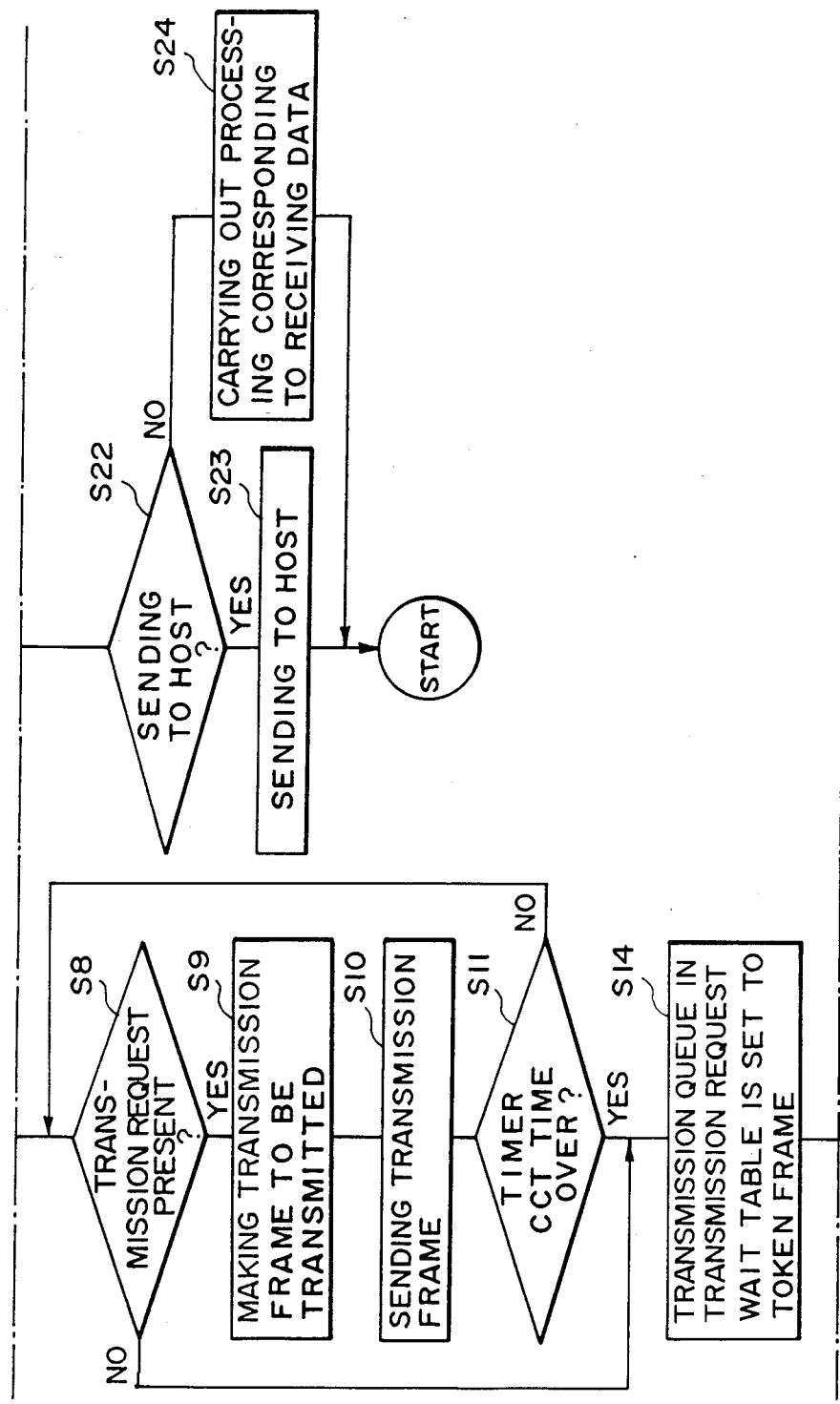

Data Transmission Control (FIGS. 6 and 7)

Data transmission control according to a first embodiment will be described with reference to FIGS. 6 and 7.

Master Node Data Transmission Control (FIG. 6)

FIG. 6 is a flow chart showing master node data transmission control.

Master node data transmission control will be described with reference to FIG. 6.

Referring to FIG. 6, the CPU waits in step S1 until the receiving circuit receives the transmission frame from the transmission line 1. Upon its reception, the flow advances to step S2. The token discrimination circuit 4 discriminates whether the transmission code area (203 or 205) in the transmission frame represents the token code 203. If YES in step S2, the flow advances to step S3 and the transmission queue in the reception frame is taken in. In step S4, the transmission queue of the node corresponding to SA 201 of the token frame in the node information in the network constitution table 9 is renewed to the received transmission queue.

In step S5, the destination address discrimination circuit 13 compares the DA 202 in the received frame with the self node address value set by the address setting circuit 8. If a noncoincidence occurs, i.e., if the frame is not the self node destination transmission frame, the flow returns to step S1. The node waits for the next transmission frame.

However, if a coincidence is established in step S5, the flow advances to step S6 to determine whether the return request code 207 is added, i.e., the frame is the specific token frame 300 (FIG. 5C). If NO in step S6, the flow advances to step S7. Upon reception of the token, the node obtains the transmission right. The timer circuit 10 starts counting. The preset time of the timer circuit 10 is the maximum token occupied time per node. If the preset time has elapsed, the token is sent to the next node so as to assign the transmission right thereto.

The CPU checks in step S8 whether data (to be transmitted) from the host device 3 or the self node is present, i.e., whether the transmission request is present. If YES in step S8, the flow advances to step S9 to make the transmission frame (FIG. 5B) to be transmitted. More specifically, the node address (i.e., the destination address) assigned to the destination node is set in the SA 202, and the self node address (i.e., the source address) set by the address setting circuit 8 is set in the SA 201. The transmission code 205 and the transmission information 206 are then set to make the data transmission frame 250. In step S10, the data transmission frame 250 is sent to the destination node according to a predetermined transmission control sequence. Such a transmission control sequence is known to those skilled in the art, and a detailed description thereof will be omitted.

The flow advances to step S11 to determine whether the preset time of the timer circuit 10 has elapsed. If YES in step S11, the timer circuit 10 sends a count end status signal to the CPU 5. However, if NO in step S11, i.e., if the lapse falls within the maximum token occupied time, the flow returns to step S8 to perform the next transmission data processing.

If YES in step S11, the flow advances to step S12 to check the number of transmission queues of each node in the network constitution table 9 and to select the node address corresponding to the number of transmission queues from the network constitution table. The flow advances to step S13 to send the specific token frame to the selected node and then returns to step S1. The specific token frame 300 is formatted by adding the return request code 207 representing the specific token frame. The node address selected in step S12 is set in the DA 202.

If a plurality of nodes having the identical number of transmission queues are detected in step S12, the specific token is sequentially sent to these nodes. For example, token sending is performed in the order from the nodes having smaller or larger addresses. If the transmission request is not present in step S8, the flow advances to step S12 to transmit the specific token frame 300.

However, if the frame is determined in step S6 to be the specific token frame 300, the flow advances to step S16 since one transmission cycle of the specific token frame 300 transmitted from the master node to other nodes (i.e., the slave nodes) is completed and the token returns to the master node. The normal token frame 200 for the downstream node adapted to receive token next is made. The normal token frame 200 is then sent to the downstream node onto the transmission line 1 through the transmitting circuit 11. The transmission right is thus assigned to the downstream node, and the flow returns to step S1.

However, if the frame is determined in step S2 not to be the token frame, the flow advances to step S20. In the same manner as in step S5, the destination address discrimination circuit 13 compares the DA 202 in the received frame with the self node address value set by the address setting circuit 8. If no coincidence occurs, i.e., if the frame is not the self node destination transmission frame, the flow returns to step S1. The node waits for receiving the next transmission frame.

However, if YES in step S20, the flow advances to step S21 to receive the self device destination data transmission frame 250 according to the predetermined transmission control sequence. The CPU determines in step S22 whether the transmission information received in step S22 is information to be sent to the host device 3. If YES in step S22, the flow advances to step S23. The information to be sent to the host device 3 is simply analyzed and edited. The processed data is sent to the host device 3. The flow returns to step S1 to prepare the next data transmission.

However, if NO in step S22, i.e., if the data is determined to be internode data, the flow advances to step S24 to carry out processing corresponding to receiving data. The flow returns to step S1 to prepare for the next transmission frame reception.

In this embodiment, the master node assigns the token upon its reception and completion of transmission if the self transmission request is detected. However, if the transmission request is not detected, the master node immediately assigns the token upon its reception. In this case, the master node compares the number of all transmission requests in awaiting in the network constitution table 9 and selects a node with the largest number of transmission requests in awaiting as the node to be assigned with the token from the master node. The token is assigned to the selected node by using the specific token (FIG. 5C).

The slave node receiving the specific token obtains the transmission right within the maxium token occupied time, i.e., one token time. After transmission processing is completed, the selected node sends back the specific token to the master node. Upon reception of the specific token, the master node does not transmit data but assigns the token to the normal token assignment destination, i.e., the downstream node. The token passes throughout the network.

Slave Node Data Transmission Control (FIG. 7)

Data transmission control of other nodes, i.e. slave nodes, will be described with reference to the flow chart in FIG. 7.

The same step numbers as in FIG. 6 denote the same operations in FIG. 7, and a detailed description thereof will be omitted.

In the slave node, if token frame reception is determined in step S2, the flow immediately advances to step S5. If the SA 201 is determined in step S5 to be the self node address, the flow unconditionally advances to step S7. Transmission processing is performed by the operations in step S7 and the subsequent steps.

When transmission processing is completed, or the preset time of the timer circuit 10 has elapsed, step S12 is executed in the case of the master node. However, the flow advances to step Sl4 in the case of the slave node. The transmission queue is read out from the transmission request wait table 14 for storing the number of transmission data (the number converted to the number of sent data transmission frames) stored in the memory circuit 6. The readout transmission queue is expanded in the token frame area 204 representing the number of transmission requests in awaiting. The flow advances to step S15 to determine whether the token received in step S15 is the specific token. If NO in step S15, the token frame 200 is made in step S16, and the token is sent to the downstream node.

However, if YES in step S15, the flow advances to step S17. The DA 202 (i.e., the address of the master node) of the received token is set in the SA 201, and the self node address set by the address setting circuit 8 is stored in the DA 202. The resultant frame is sent as the specific token frame 300. Therefore, the specific token frame is returned to the master node. However, token frame reception is not detected in step S2, and the operations in step S20 and the subsequent steps are performed, as in the master node.

Every time the token is circulated once, the transmission right during the one token occupied time is assigned to the node having the largest number of transmission requests in awaiting, thereby improving transmission request processing.

Equipment with a large number of transmission requests can receive better service than that with a small number of transmission requests.

According to the first embodiment as described above, among the transmission devices constituting the network, a larger number of times of transmission right assignment is given to the device having a larger number of transmission requests. Therefore, the number of times of the transmission right possession can be increased according to the number of transmission requests of the transmission device. Therefore, transmission right distribution can be achieved with high transmission efficiency.

Second Embodiment

In the above embodiment, only one master node exits in the network. However, the number of master nodes is not limited to one. If a node can renew the transmission queues of the nodes in the network constitution table 9, the node can serve as a master node.

Even if a plurality of master nodes are included in the network system, the control flow in FIG. 6 is executed by each master node.

However, if the number of master nodes is increased, the processing in step S14 in FIG. 7 must be performed. More specifically, the transmission queue is read out from the self node transmission request wait table 14, and each master node sets the readout queue in the transmission token and causes other master nodes to recognize it.

With a plurality of master nodes, the number of transmission rights corresponds to that of master nodes while the token passes once throughout the network, thereby dynamically preventing an abnormal increase in the number of transmission requests in awaiting. In addition, even if one master node fails, control can be performed by other master nodes. Therefore, token assignment control substantially free from failure can be realized.

In the above description, the specific token frame 300 has a format including the return request code 207. Instead of the return request code 207, the token code 203 can be a specific token code representing a specific token frame. In this case, the token discrimination circuit 4 must have a function for discriminating both the specific token code and the token code 203.

Figure 8A:
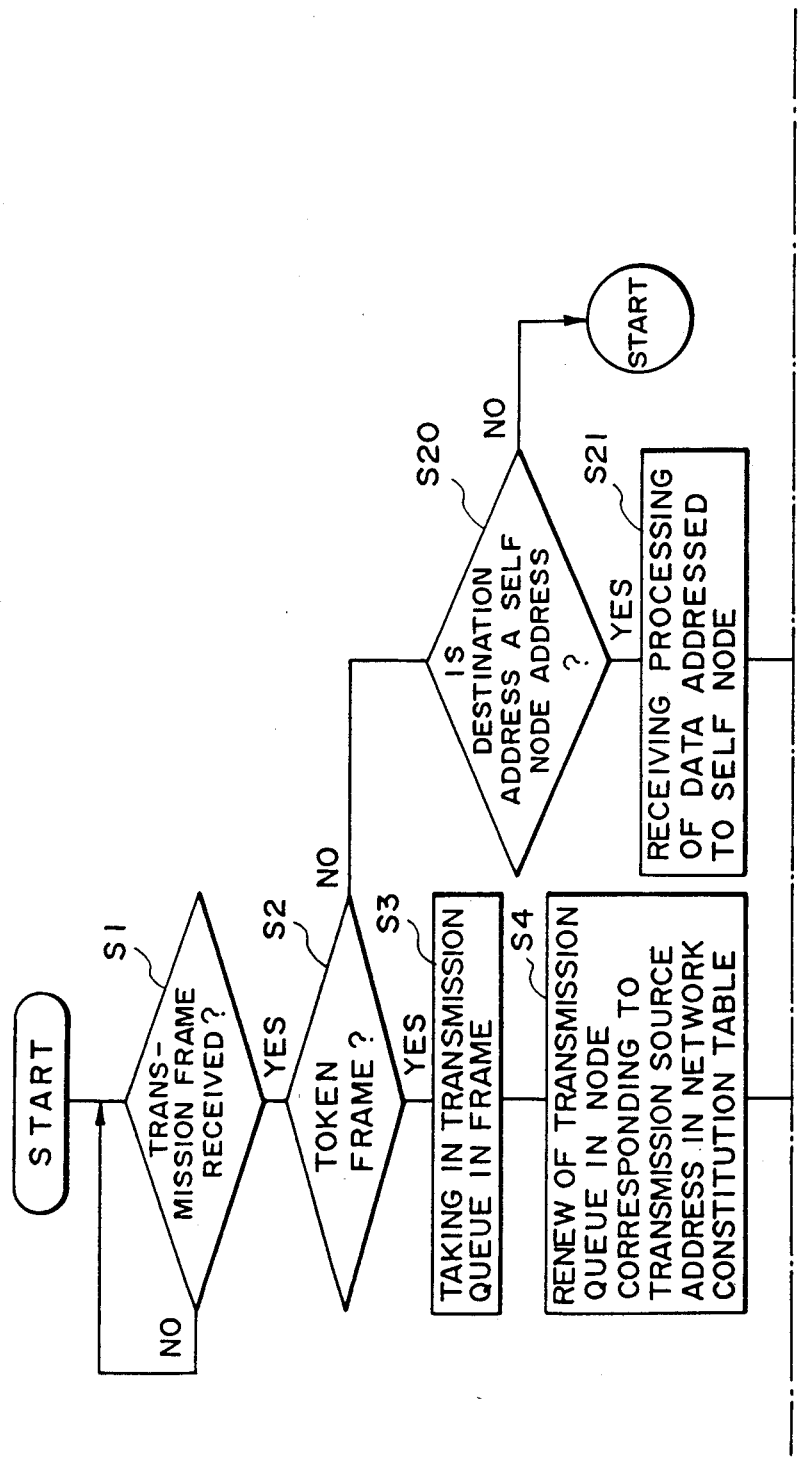
Figure 8B:
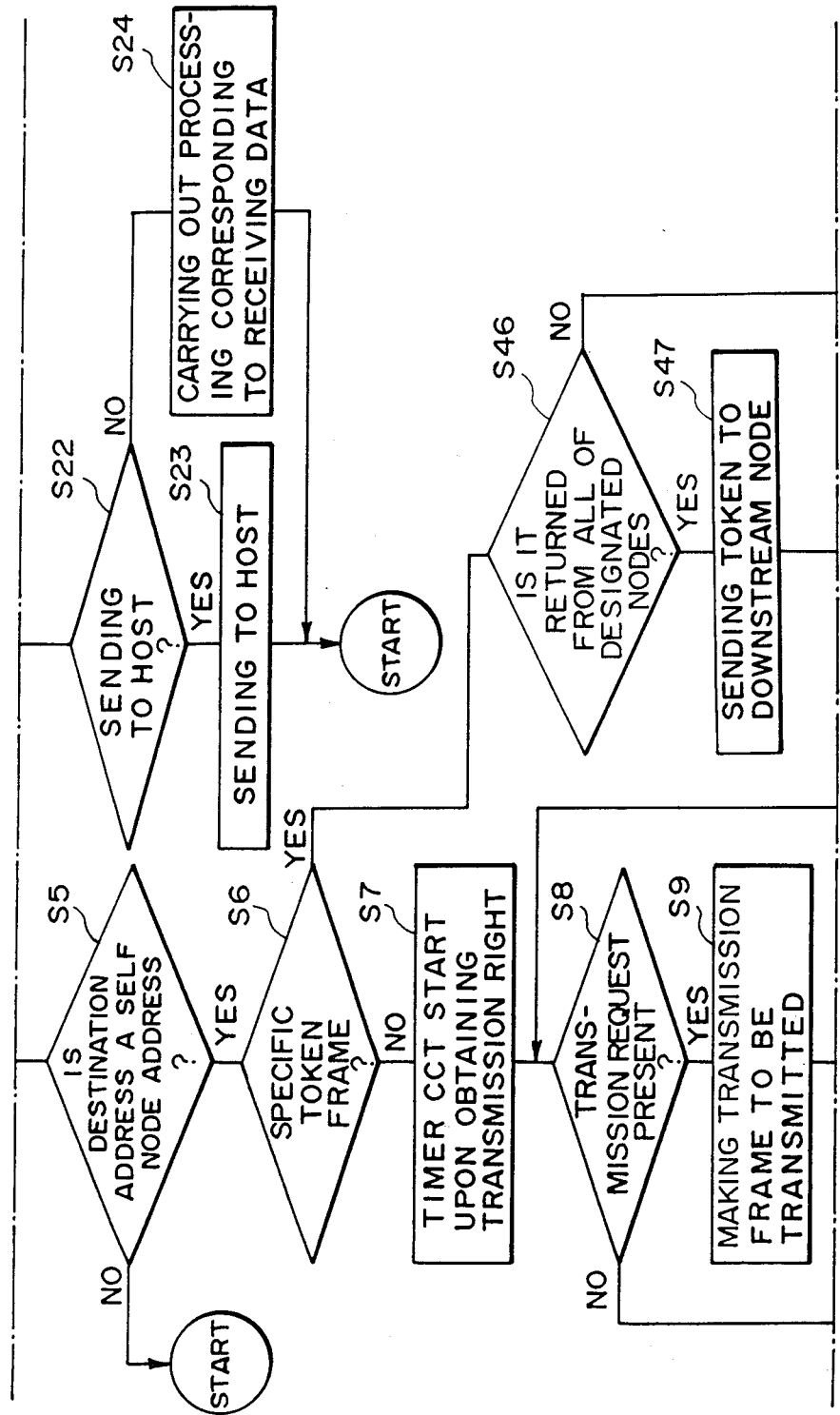
Figure 9B:
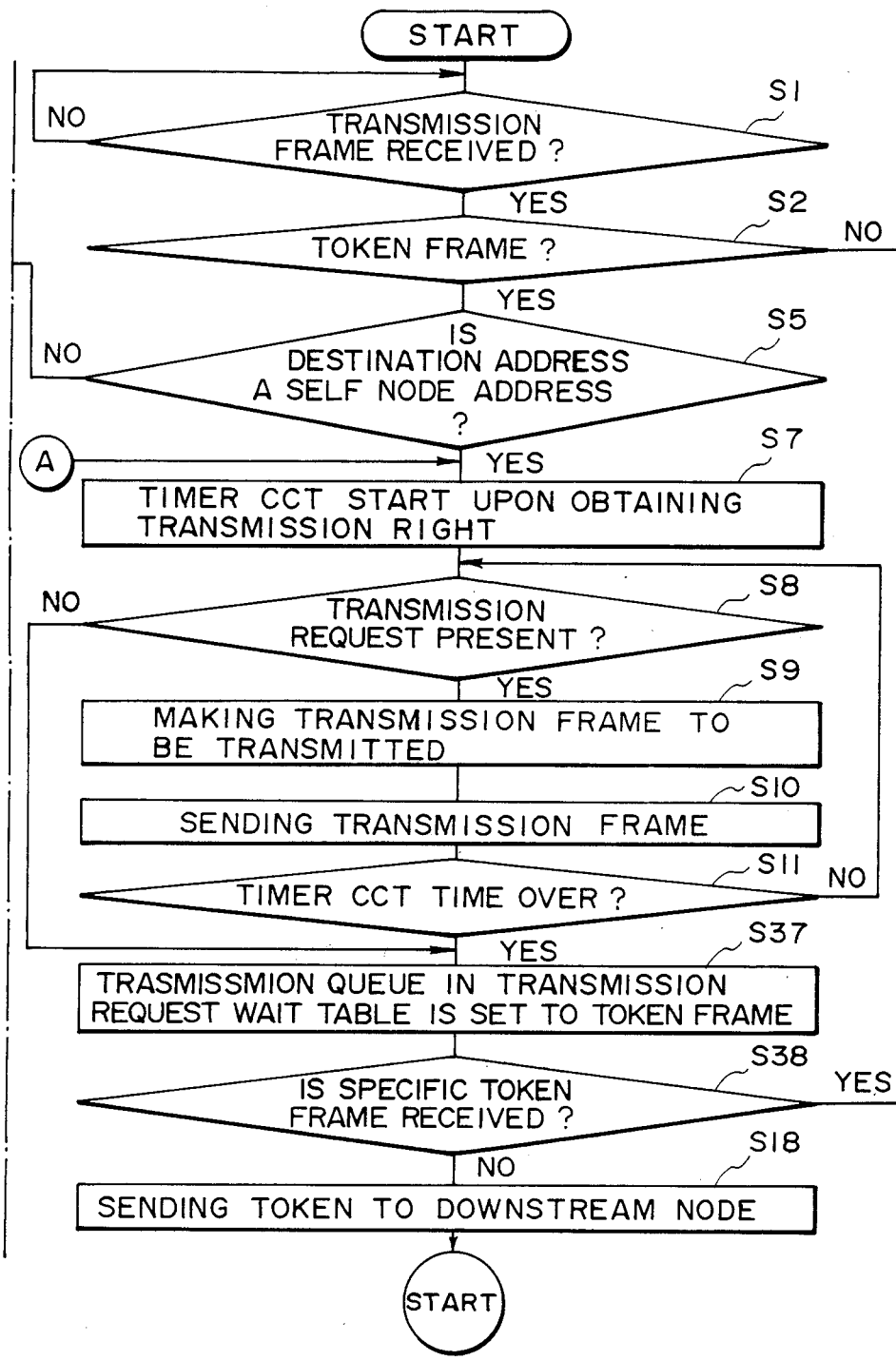
Figure 9C:
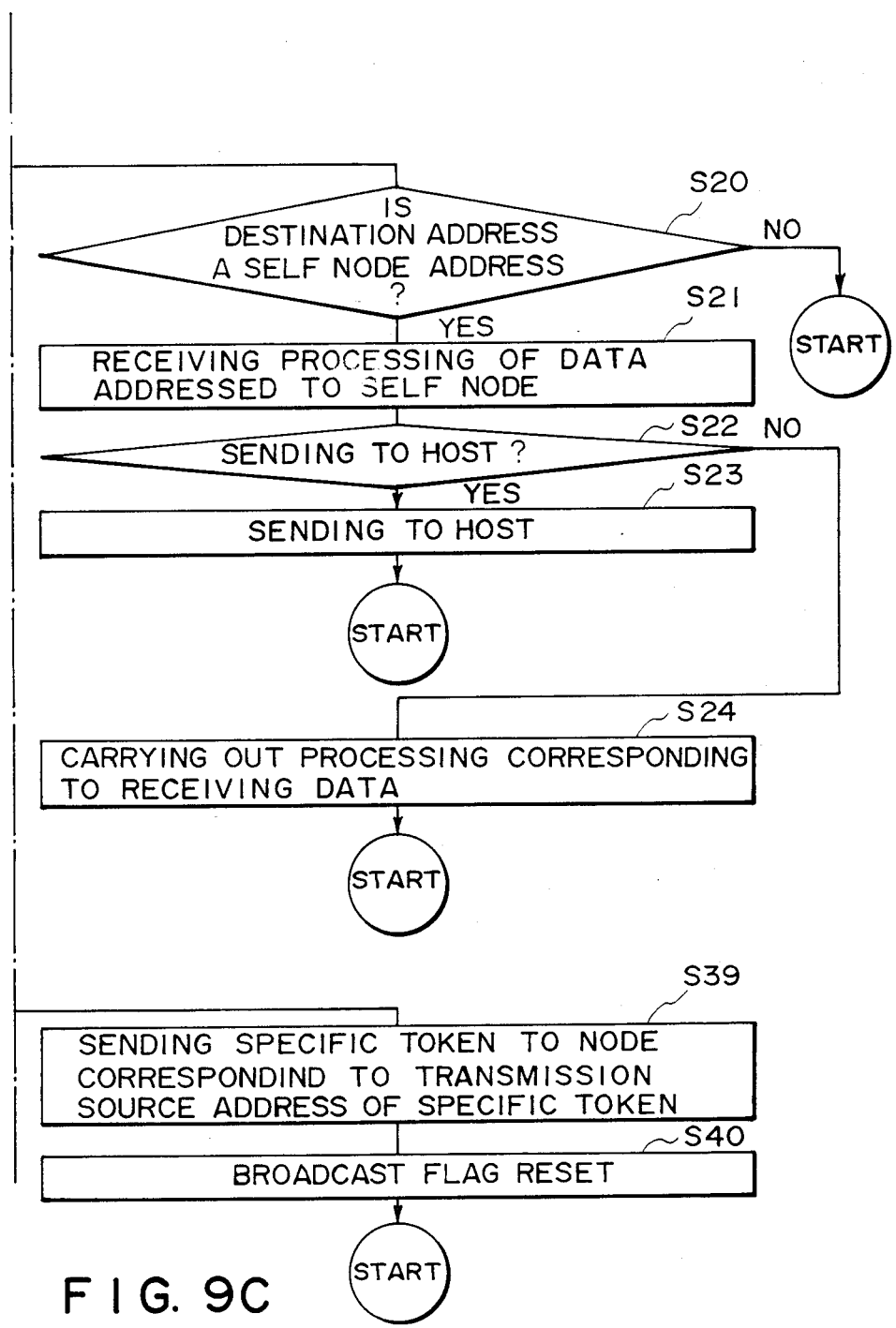

Third Embodiment (FIGS. 8 and 9)

If a plurality of nodes having an identical number of transmission request queues are included in the network system, the master node can designate all these nodes in response to additional information of the specific token frame 300. The broadcast is utilized to send the token to all these nodes. Among the plurality of nodes receiving the token, the node having, for example, the smallest address obtains the transmission right and performs transmission. The node having the second smallest address then obtains the transmission right after it confirms that the node having the smallest address returns the specific token to the master node. The node having the second smallest address then starts transmission. When all the nodes sequentially obtain the transmission right in the manner as described above, the transmission requests of the nodes do not conflict. The transmission of the specific token by the master node can be performed once. The slave node having the smallest address can send the specific token to the node having the second smallest address without returning it to the master node.

Figure 5D:
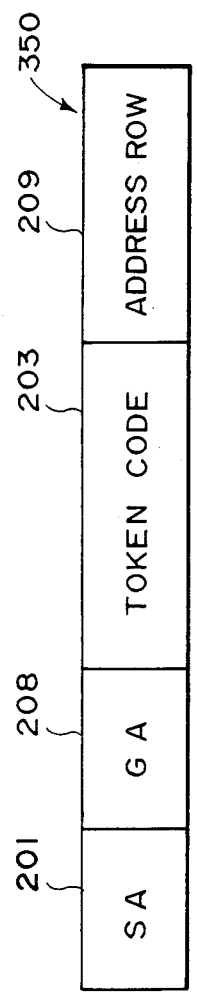

FIG. 5D shows a broadcast specific token frame 350. A group address (to be referred to as a GA hereinafter) 208 represents broadcast. An address row 209 represents a node assigned with the transmission right by the token designated by the GA 208. The designated nodes sequentially obtain the transmission right according to the address row and transmit data.

Data transmission control of the third embodiment will be described with reference to the flow charts in FIGS. 8 and 9.

Master Node Data Transmission Control (FIG. 8)

FIG. 8 is a flow chart showing master node data transmission control.

The same steps as in FIG. 6 denote the same operations in FIG. 8, and a detailed description thereof will be omitted.

In the master node, predetermined processing (steps S1 to S11) are performed upon reception of the token, as described with reference to FIG. 6. If transmission processing in step S8 is completed, or the preset time of the timer circuit 10 has elapsed, the flow advances to step S41 to check the number of transmission queues of each node in the network constitution table 9 and to select a node having the largest number of transmission queues. If there are a plurality of nodes having an identical number of transmission queues, all these nodes are selected. The flow advances to step S42 to determine whether the number of selected nodes is one. If YES in step S42, the flow advances to step S43 to make the specific token frame 300 shown in FIG. 5C and to sent it to the selected node, and then returns to step S1. It should be noted that the node address selected in step S41 is set in the DA 202.

If the number of nodes selected in step S42 is two or more, the flow advances to step S44 to set all selected node addresses in the designated address row 209. These addresses can be set in the order from the smaller or larger addresses. In step S45, the destination address is set in the GA 208 to make the broadcast specific token frame in FIG. 5(D). The specific token frame is sent onto the transmission line 1, and the flow returns to step S1.

If the transmission request is not detected in step S8, the flow advances to step S41 to transmit the specific token frame.

However, if specific token frame 300 is detected in step S6, the flow advances to step S46 since transmission processing in response to the specific token frame sent from the master node to other nodes (i.e., the slave nodes) has been completed and the specific token has returned to the master node. Whether the specific token frame 300 is returned from all nodes designated by the specific token frame is determined in step S46. This decision block is designed to wait the return of the specific token frame 300 from all nodes designated by the specific token 350. If NO in step S46, the flow returns to step S1 and the return of the token 300 from all the nodes to the master node is awaited. If YES in step S46, the flow advances to step S47. A normal token frame 200 is made for the downstream node to be assigned therewith next within the logic ring. The normal token frame 200 is sent onto the transmission line 1 through the transmitting circuit 12 so that the transmission right is assigned to the corresponding downstream node. The flow then returns to step S1.

In this embodiment, if the self transmission request is present, the master node assigns the token to the slave node after transmission is completed. In this case, the slave node to be assigned with the token is not the adjacent node. The master node compares all numbers of transmission requests of the nodes in awaiting and selects a node having the largest number of transmission requests. The token is thus assigned from the master node to the slave node having the largest number of transmission requests.

The slave node having received the specific token has the transmission right within the maximum token occupied time, i.e., one token occupied time. After transmission processing is completed, this slave node sends back the specific token to the master node. Upon reception of the specific token node, the master node does not perform its own transmission. When the specific token is returned from all the nodes designated by the specific token, the master node assigns the token to the normal token assignment node, i.e., the downstream node.

Slave Node Data Transmission Control (FIG. 9)

Data transmission control of other nodes, i.e., slave nodes constituting the network will be described with reference to the flow chart in FIG. 9.

The same steps as in FIGS. 6 and 8 denote the same operations in FIG. 9, and a detailed description thereof will be omitted.

If token frame reception of the slave node is determined in step S2, the flow immediately advances to step S5. If the SA 201 coincides with the self node address in step S5, the flow unconditionally advances to step S7. Transmission processing in step S7 and the subsequent steps is performed.

If transmission processing is completed, the flow advances to step S41 (FIG. 8) in the case of the master node. However, in the case of the slave node, the flow advances to step S37 to read out the transmission queues from the transmission request wait table 14 for storing the number of transmission data (i.e., the number converted to the number of data transmission frames) sent from the host device 3 and stored in the memory device 6 but not transmitted yet. The readout transmission queues are expanded in the token frame area 204 representing the number of transmission requests in waiting. Whether the received token is a specific token is determined in step S38. If NO in step S38, the token frame 200 is made in step S18 and sent to the downstream node.

However, if YES in step S38, the flow advances to step S39 to set the DA 202 of the received specific token in the SA 201 and the self node address set by the address setting circuit 8 in the DA 202. The resultant frame is thus sent as the specific token frame 300. Therefore, the specific token frame thus returns to the master node. In step S30, a broadcast flag (not shown) in the memory circuit 6 is reset. The flow returns to step S1.

If token frame reception is not determined in step S2, the same processing as in the master node, i.e., the operations in step S20 and the subsequent steps, is performed.

If the destination address is determined in step S5 not to be the self node address, the flow advances to step S30 to check whether the received frame is the specific token frame. If NO in step S30, the flow returns to step S1. However, if YES in step S30, whether the broadcast flag is set is determined in step S31. If NO in step S31, the flow advances to step S32 to determine whether the received token frame is the broadcast frame. If NO in step S32, the flow returns to step S1 since the token is sent to other nodes.

If YES in step S32, whether the self node address is present in the designated address row 209 in the received frame is determined in step S33. If NO in step S33, the flow returns to step S1. However, if YES in step S33, the flow advances to step S34. Whether the designated address row leading is the self node address. If YES in step S35, the flow advances to step S7 so that the slave node obtains the transmission right by this token. However, if NO in step S35, the broadcast flag is set, and the flow returns to step S1.

If the broadcast flag is determined in step S31 to be set, the flow advances to step S36 since the transmission right has already been assigned to a plurality of nodes including the self slave node. Whether the DA 202 in the received token frame represents an immediately preceding node with the transmission right, among the nodes designated by the previous address row, i.e., the transmission source address is an address of the preceding node by one than the self node, is determined in step S36. If YES in step S36, the node which obtains the transmission right is the self node, and the flow advances to step S7 to obtain the transmission right. However, if NO in step S36, the flow returns to step S1. In this case, the node waits assignment of the transmission right.

The order of obtaining the transmission rights in the nodes designated by the address row 209 may be an order of designation of the address row 209, or an order of larger or smaller node address values.

According to the third embodiment as described above, the transmission right can be more frequently assigned to the device having a larger number of transmission requests, among the transmission devices constituting the network. The number of times of transmission right possession can be increased according to the number of transmission requests of the transmission devices. Therefore, transmission right distribution can be achieved with high efficiency.

Even if there are a plurality of devices having larger numbers of transmission requests, the transmission right can be assigned to these transmission devices. Transmission right distribution can be achieved with high efficiency.

Figure 10A:
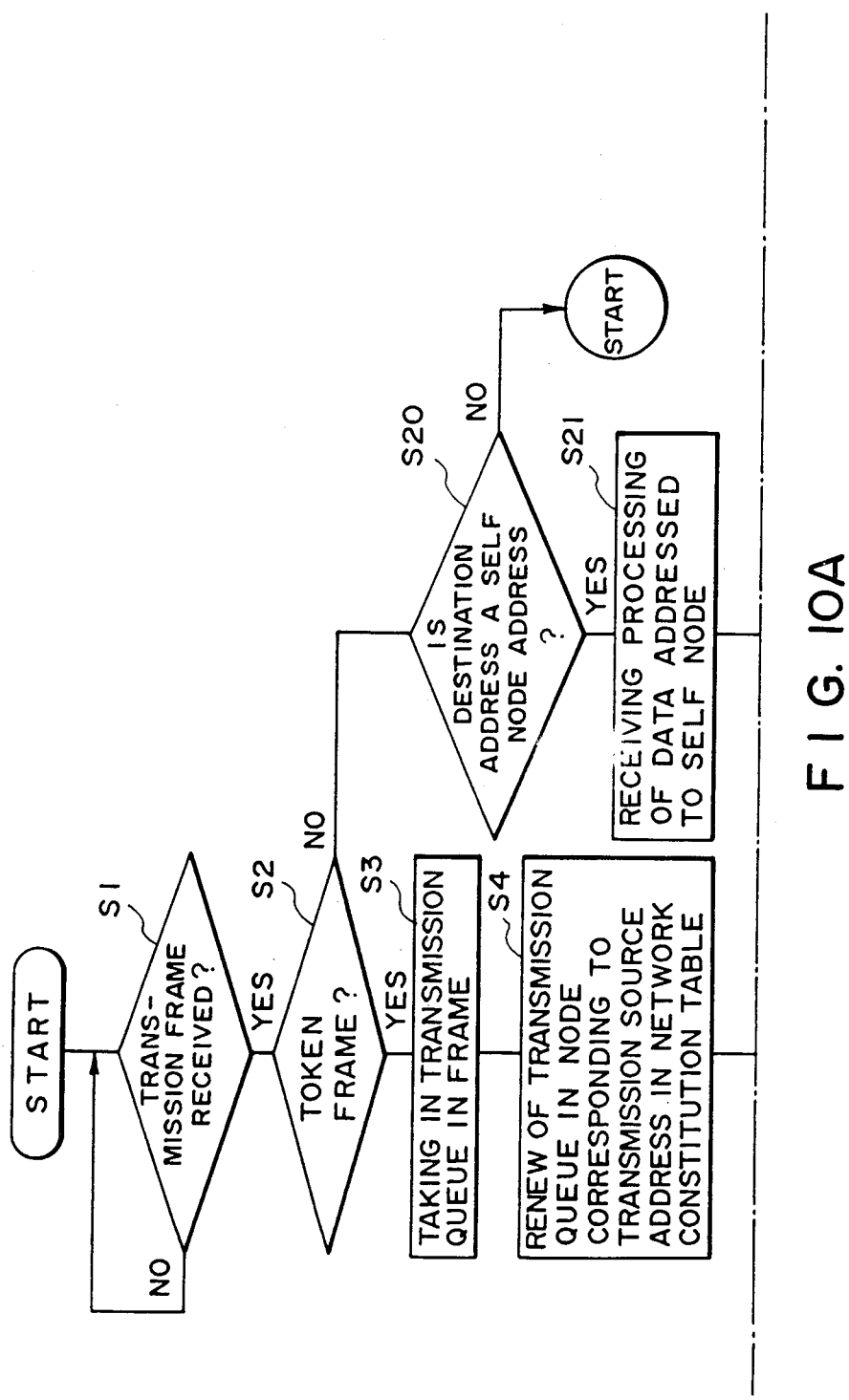
Figure 10B:
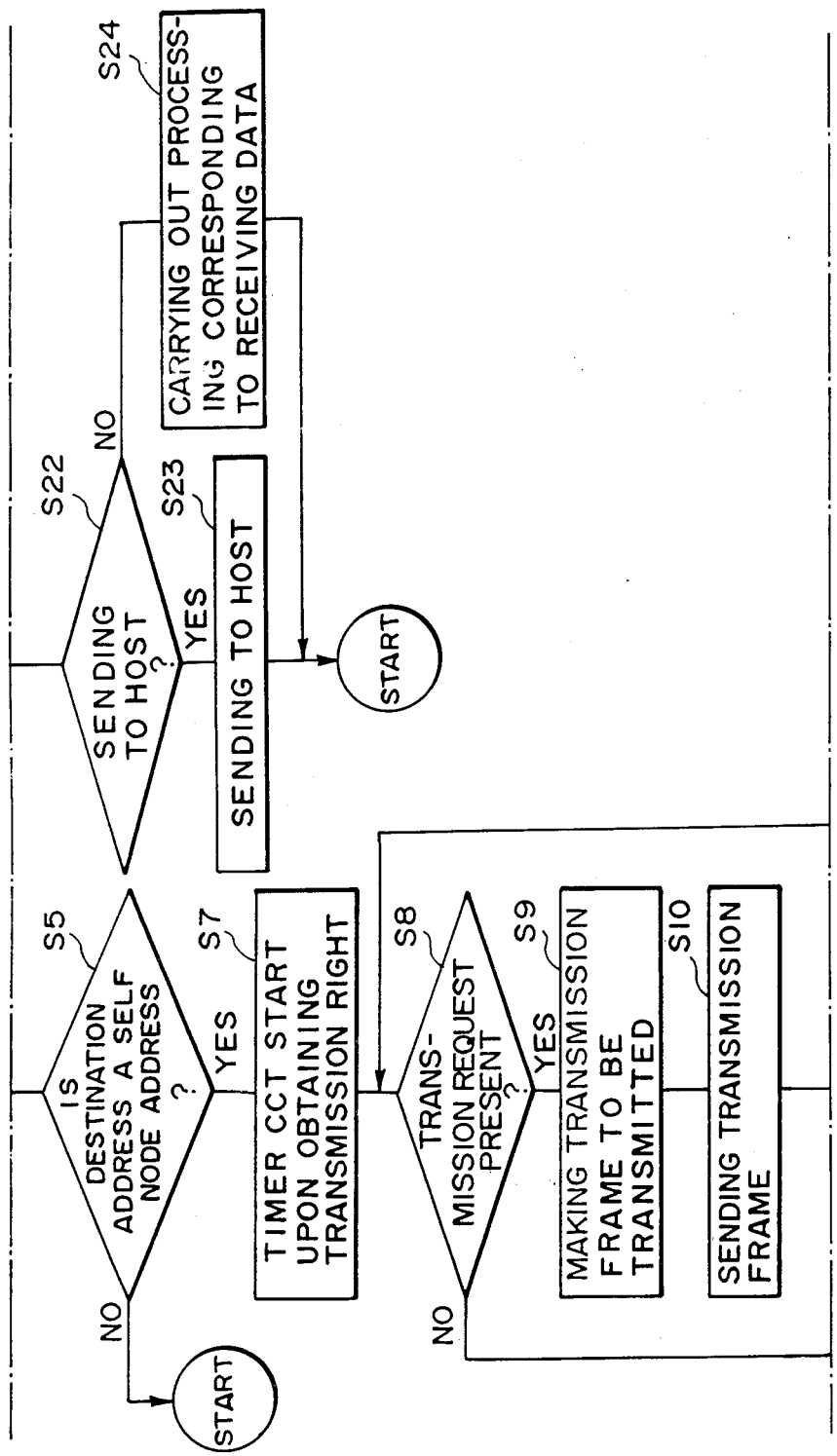
Figure 11:
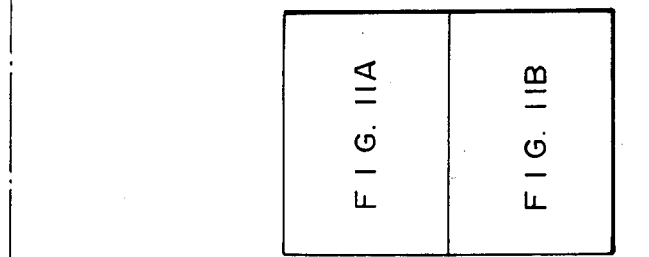
Figure 11B:
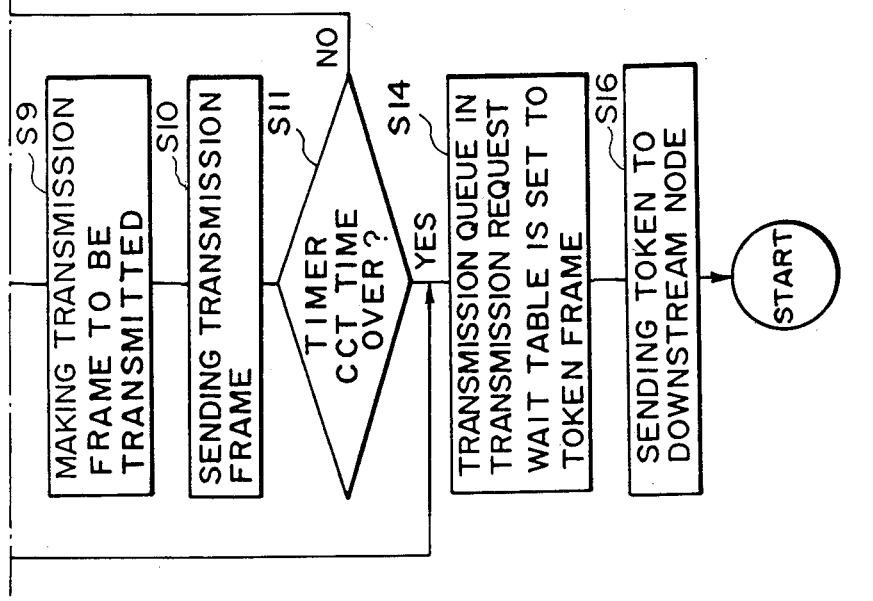

Fourth Embodiment (FIGS. 10 and 11)

In the above description, the transmission right is assigned to the node having a large transmission queue by using the specific token frame 300 in FIG. 5(C). The node sends back the specific token to the specific token frame source node after data transmission is completed. However, the node having received the specific token can assign this node to the normal downstream node.

The master node can alternately perform normal transmission right assignment to the downstream node and transmission right assignment to a node having a larger number of transmission queues.

In this case, the slave node performs the identical operations for receiving the specific token or the normal token. Only the token frame 200 can be used, i.e., without using the specific token frame 300, to achieve transmission control.

The transmission sequences of the master and slave nodes are described in FIGS. 10 and 11, respectively.

The same steps as in FIGS. 6 and 7 denote the same operations in FIGS. 10 and 11, and a detailed description thereof will be omitted.

If the DA 202 in the received token frame is determined in step S5 to be the self node address, i.e., if the DA 202 is the address preset by the address setting circuit 8, the flow immediately advances to step S7 and the master node obtains the transmission right.

If the lapse of the transmission right or token occupied time is determined in step S11 or transmission processing is completed in step S8, the flow advances to step S17. The CPU 5 checks in step S17 whether a flag S (not shown) in the memory circuit 6 is set. If NO in step S17, the operations in steps S12 and S13 are performed to send the token frame 200 to the node having the largest number of transmission queues in the network. The flag S is set in step S18, and the flow returns to step S1.

However, if YES in step S17, step S16 is executed to send out the token to the predetermined downstream node in the network. The flag S is reset in step S19.

The master node sends the token to the node having the largest number of transmission queues in the network upon the first acquisition of the token. Upon the second acquisition of the token, the master node sends out the token to the normal downstream node. In this embodiment, the node assigned with the token is changed for each token reception cycle. However, the node assigned with the token can be changed by a plurality of token reception cycles.

Processing for the specific token frame 300 in FIG. 7 is inhibited for the slave node, as shown in FIG. 9. In other words, the flow directly jumps from step S14 to step S16.

Fifth Embodiment

In the above description, the transmission right for the one token occupied time is assigned by the specific token frame. However, in a system wherein a node has an abnormally large number of transmission requests in awaiting, a token occupied time representing a plurality of tokens can be provided to obtain the same effect as described above. For example, a two token occupied time may be assigned for such a node. When the token occupied time is prolonged, an increase in the abnormal number of transmission requests in awaiting can be prevented.

In order to average the transmission service to the nodes in such a system as much as possible, the token occupied time is not fixed but can vary. For example, a token occupied time can be designated according to additional information of the specific token.

This method requires a means arranged in the master node to set a token occupied time for a slave node. For example, a switch setting circuit is arranged so that the CPU 5 can detect the status preset by the switch setting circuit. The value preset by the switch setting circuit is compared with the number of transmission queues. If the number of queues is larger than the preset value, the two token occupied time is assigned. Otherwise, the one token occupied time is assigned. It is possible to cause the switch setting circuit to set 3- or 4-level token occupied time, thus realizing high-precision control. In this case, the token occupied time of each node can arbitrarily vary according to changes in the preset values of the timer circuit 10.

An embodiment will be exemplified wherein a token occupied time of the node can vary according to the number of transmission requests in awaiting.

This embodiment includes an occupied time setting switch 15 for selecting an occupied time designated by the specific token 300 to be described in more detail later. When a preset value of the occupied time setting switch 15 exceeds the number of transmission queues of the node to be assigned with the specific token, the token occupied time is doubled.

Figure 5E:
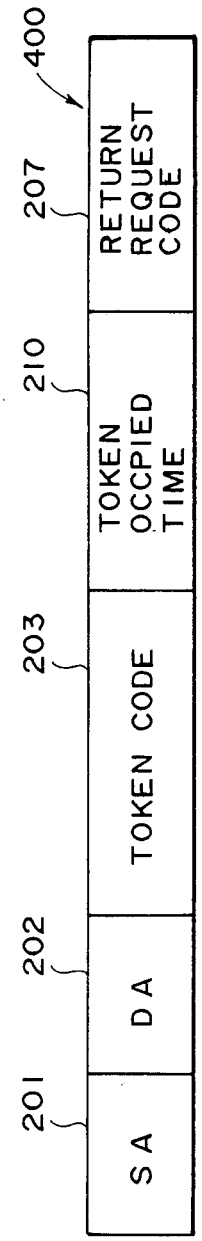

FIG. 5E shows a specific token frame 400 for designating the token occupied time of the node. The token frame 400 includes a maxium token occupied time 210, i.e., the token occupied time for designating the transmission right holding time, and a return request code 207 for requesting the return of the token to the source node after transmission processing is completed.

Data transmission control of the fifth embodiment will be described with reference to the flow charts in FIGS. 12 and 13.

Figure 12A:
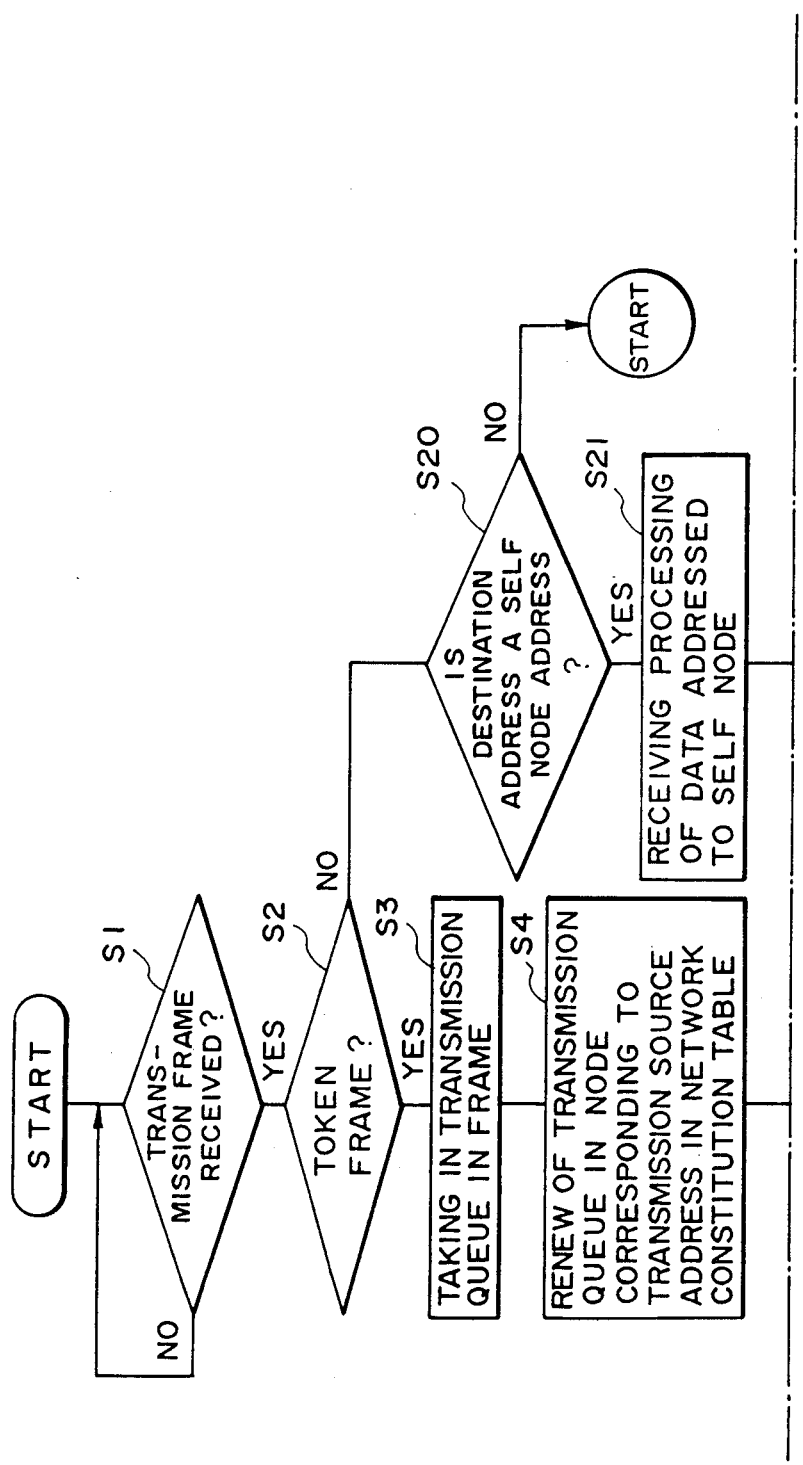
Figure 12B:
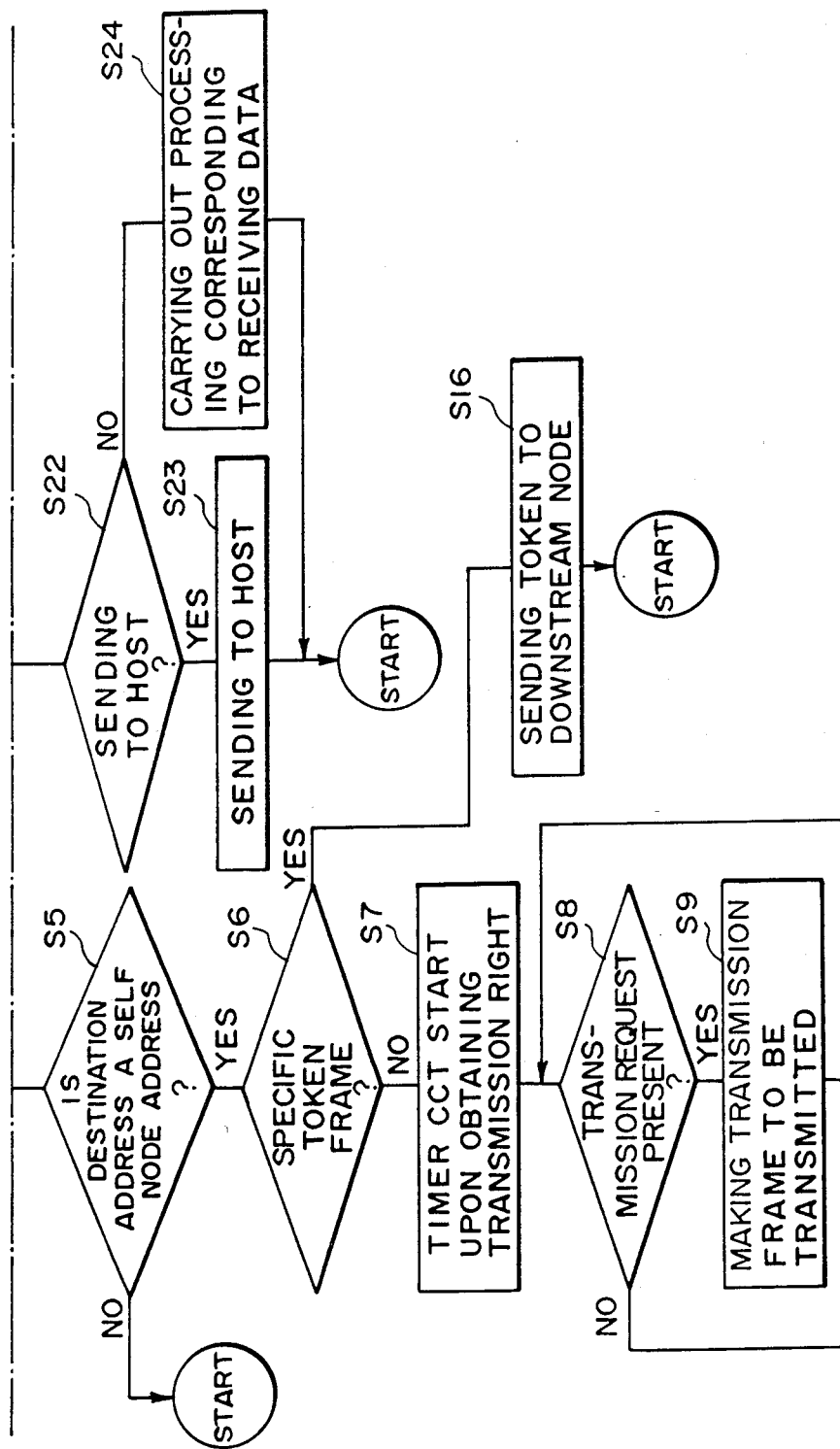

Master Node Data Transmission Control (FIG. 12)

FIG. 12 is a flow chart showing master node data transmission control.

Master node data transmission control will be described with reference to FIG. 13.

The same steps as in FIG. 6 denote the same operation in FIG. 12, and a detailed description thereof will be omitted.

Tha master node performs predetermined operations (steps S1 to S11) upon reception of the token, as described with reference to FIG. 6.

Referring to FIG. 12, the present time of the timer circuit 10 is the maximum one token occupied time for the master node. However, the master node can also perform token occupied time setting processing of its own. This preset time can be set in the timer circuit 10.

If transmission processing is completed in step S38, or the preset time of the timer circuit 10 has elapsed, the flow advances to step S51 to check the number of transmission queues of each node in the network constitution table 9 and to select the node having the largest number of transmission queues. The number of queues of the selected node is compared with the present value of the occupied time setting switch 15 in step S52. If the number of transmission queues is smaller than the prcset value, the flow advances to step S53. A time given by the normal one token (to be referred to as a one token occupied time hereinafter) is set in the token occupied time 210 in the frame 400 in FIG. 5E, and the flow advances to step S55.

However, if the number of queues is larger than the preset value in step S52, the flow advances to step S54. A two tokens occupied time is set in the token occupied time 210, and the flow advances to step S55. In step S55, the specific token frame 400 is made for and sent to the selected node, and the flow returns to step S1. The specific token frame 400 is made by adding the return request code 207 representing the specific token frame, and the node address selected in step S12 is set in the DA 202.

If there are a plurality of nodes having an identical number of transmission queues in step S12, the specific token is sequentially sent to these nodes. In this case, specific token sending is performed in the order of smaller or larger node addresses. If transmission request is not found in step S8, the flow advances to step S12 and specific token frame 400 is sent.

If the frame is determined in step S6 to be the specific token frame 400, the flow advances to step S16 since single transmission processing in response to the specific token frame 400 sent from the master node to other nodes (i.e., the slave nodes) has been completed and the specific token frame has turned to the master node. The master node makes the normal token frame 200 for the downstream node to be assigned with the token next. The token frame is 200 is sent onto the transmission line 1 through the transmitting circuit 11 and the transmission right is assigned to the downstream node. The flow returns to step S1.

In this embodiment, the master node assigns the token to another node upon completion of data transmission if the self transmission request is present. In this case, the node to be assigned with the token is not the next node. The master node compares all numbers of trasmission requests in awaiting and selects the node having the largest number of transmission requests. The selected node is thus assigned with the token.

Ths slave node having received the specific token 400 obtains the trasmission right for a period designated by the token occupied time 210. Transmission processing is performed and the slave node sends back the specific token 400 to the master node. Upon reception of the specific token 400, the master node does not perform transmission, but assigns the token to the normal token assignment destination, i.e., the downstream node. The token passes again throughout the network.

Figure 13A:
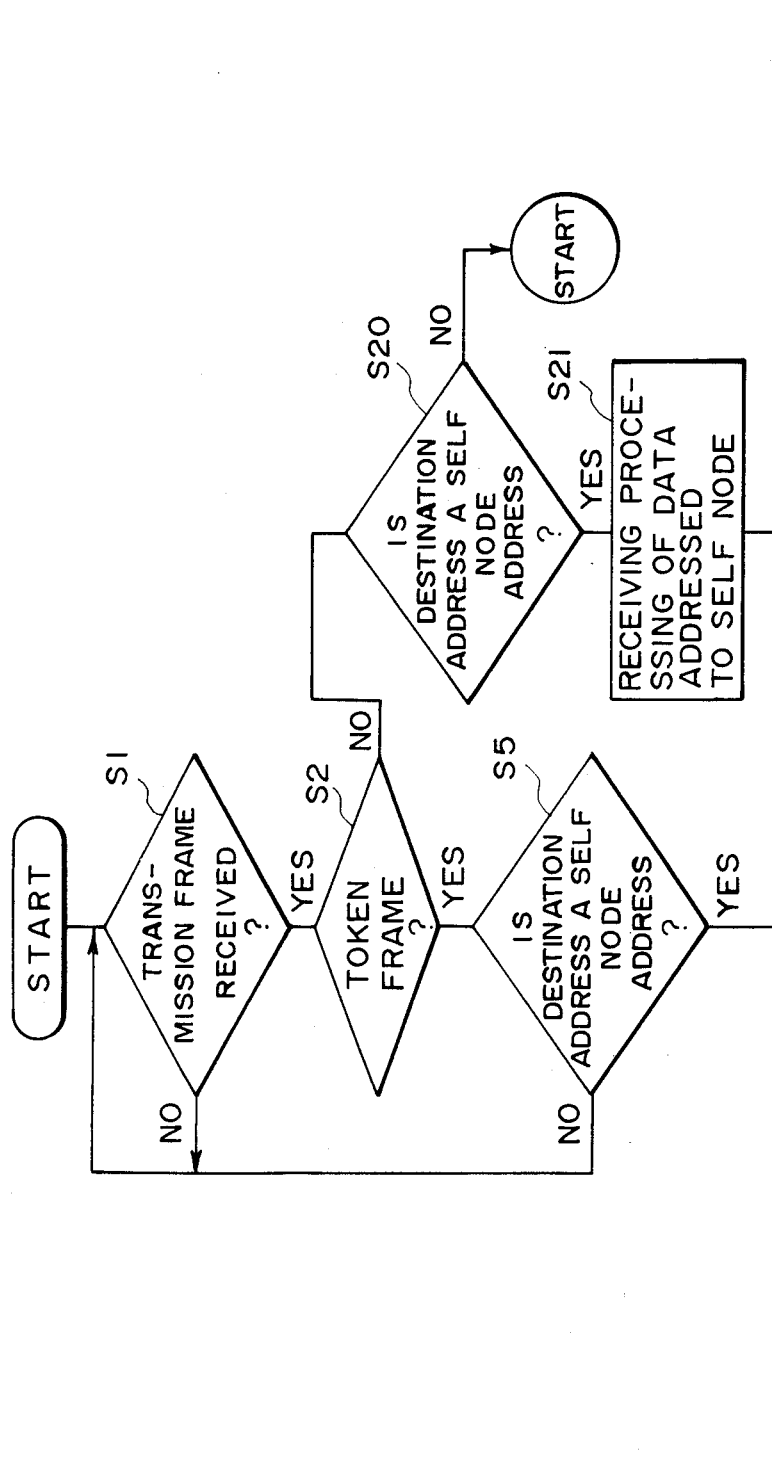
Figure 13B:
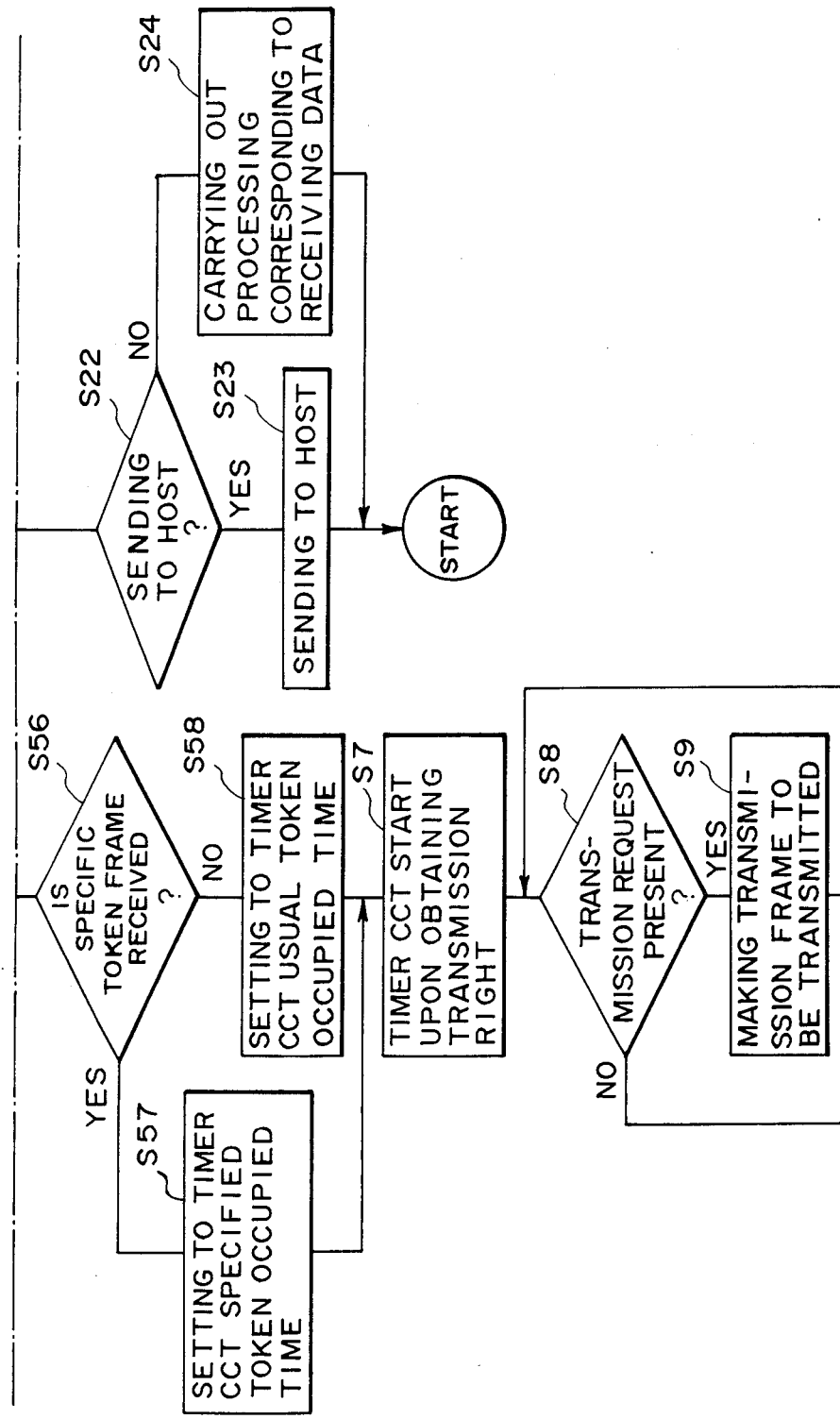

Slave Node Data Transmission Control (FIG. 13)

Data transmission control of other nodes, i.e., slave nodes constituting the network will be described with reference to the flow chart in FIG. 13.

The same steps as in FIG. 6 and 12 denote the same operation in FIG. 13, and a detailed description thereof will be omitted.

Referring to FIG. 13, token frame reception of the slave node is detected in step S2, the flow immediately advances to step S5. If the SA 201 is determined in step S5 to be the self node address, the flow unconditionally advances to step S56 to determine whether the received token is the specific token frame 400. If YES in step S56, the flow advances to step S57. The time designated by the token occupied time 210 in the frame is set in the timer circuit 10, and the flow advances to step S7. However, if YES in step S56, i.e., if the received frame is determined not to be the specific token frame 400 but to be the normal token frame, the flow advances to step S58, and one or usual token occupied time is set in the timer circuit 10. The flow advances to step S7, and tarnsmission processing in step S7 and the subsequent steps is performed.

If transmission processing is completed, the flow advances to step S51 (FIG. 12) in the case of the master node. However, in the case of the slave node, the flow advances to step S14 to read out the transmission queues from the transmission request waiting table 14 for storing the number of transmission data (i.e., the number converted to the number of data transmission frames) sent from the host device 3 and stored in the memory device 6 but not transmitted yet. The readout transmission queues are expanded in the token frame area 204 representing the number of transmission requests in waiting. Whether the received token is a specific token is determined in step S15. If NO in step S15, the token frame 200 is made in step S16 and sent to the downstream node.

However, if YES in step S16, the flow advances to step S17 to set the DA 202 of the received specific token in the SA 201 and the self node address set by the address setting circuit 8 in the DA 202. The resultant frame is thus sent as the specific token frame 400. Therefore, the specific token frame thus returns to the master node.

If token frame reception is not determined in step S2, the same processing as in the master node, i.e., the operations in step S20 and the subsequent steps, is performed.

The node having the largest number of transmission requests for each token passing cycle obtains the transmission right for a period corresponding to the number of pieces of transmission information.

Therefore, transmission request processing can be performed at high speed.

Figure 14:
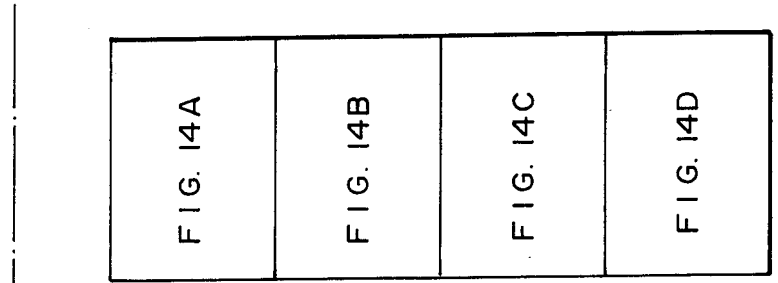
Figure 14D:
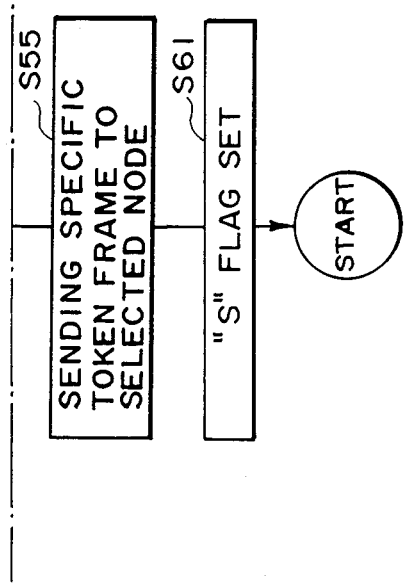
Figure 14A:
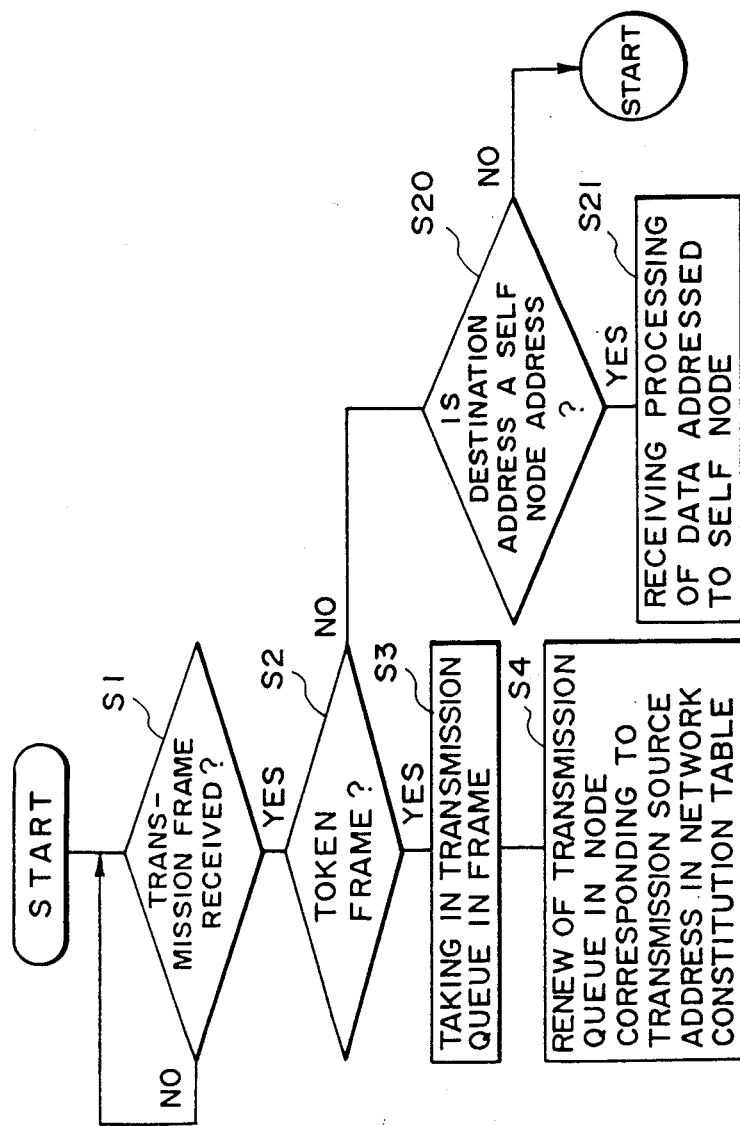
Figure 14B:
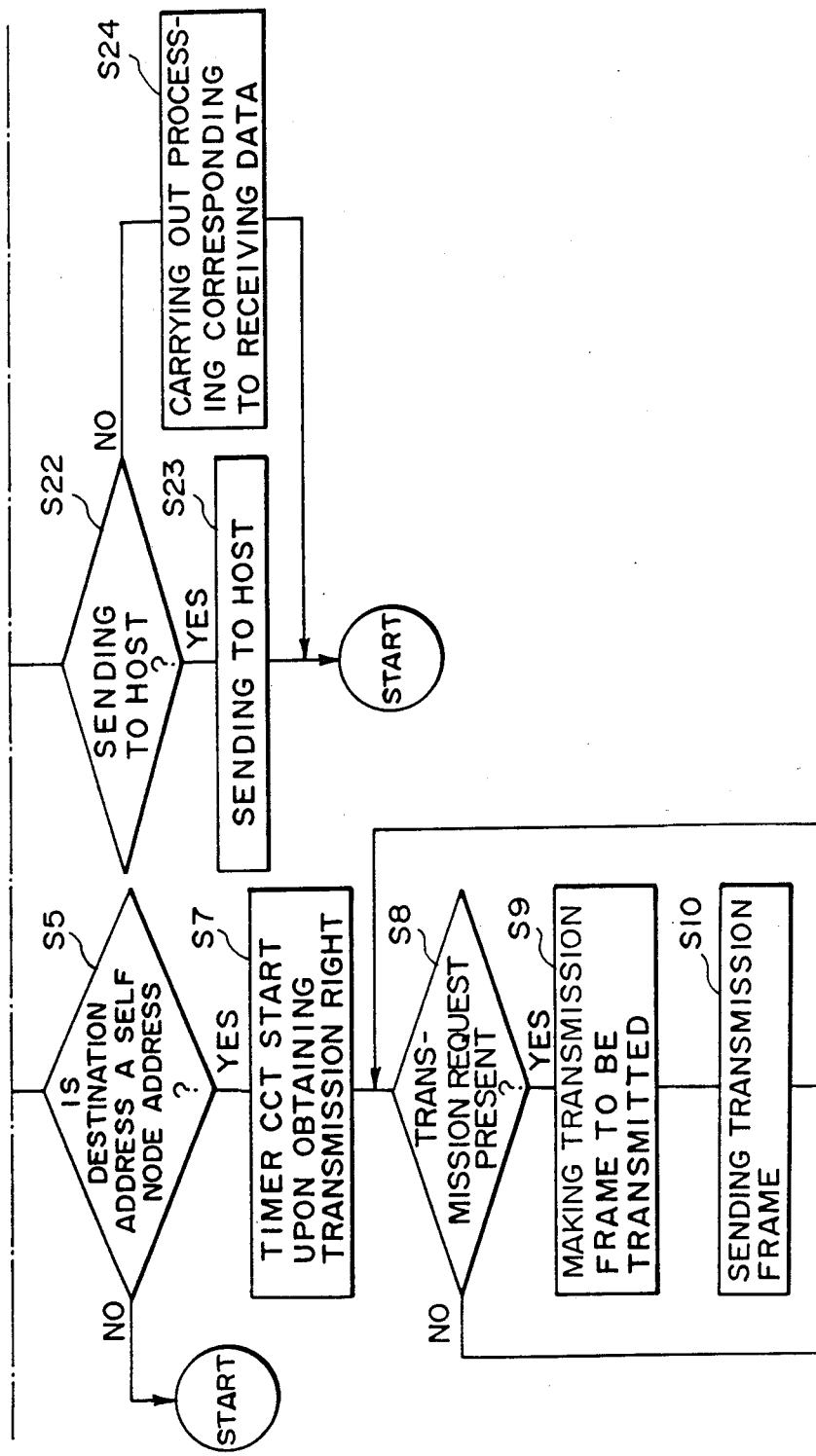
Figure 14C:
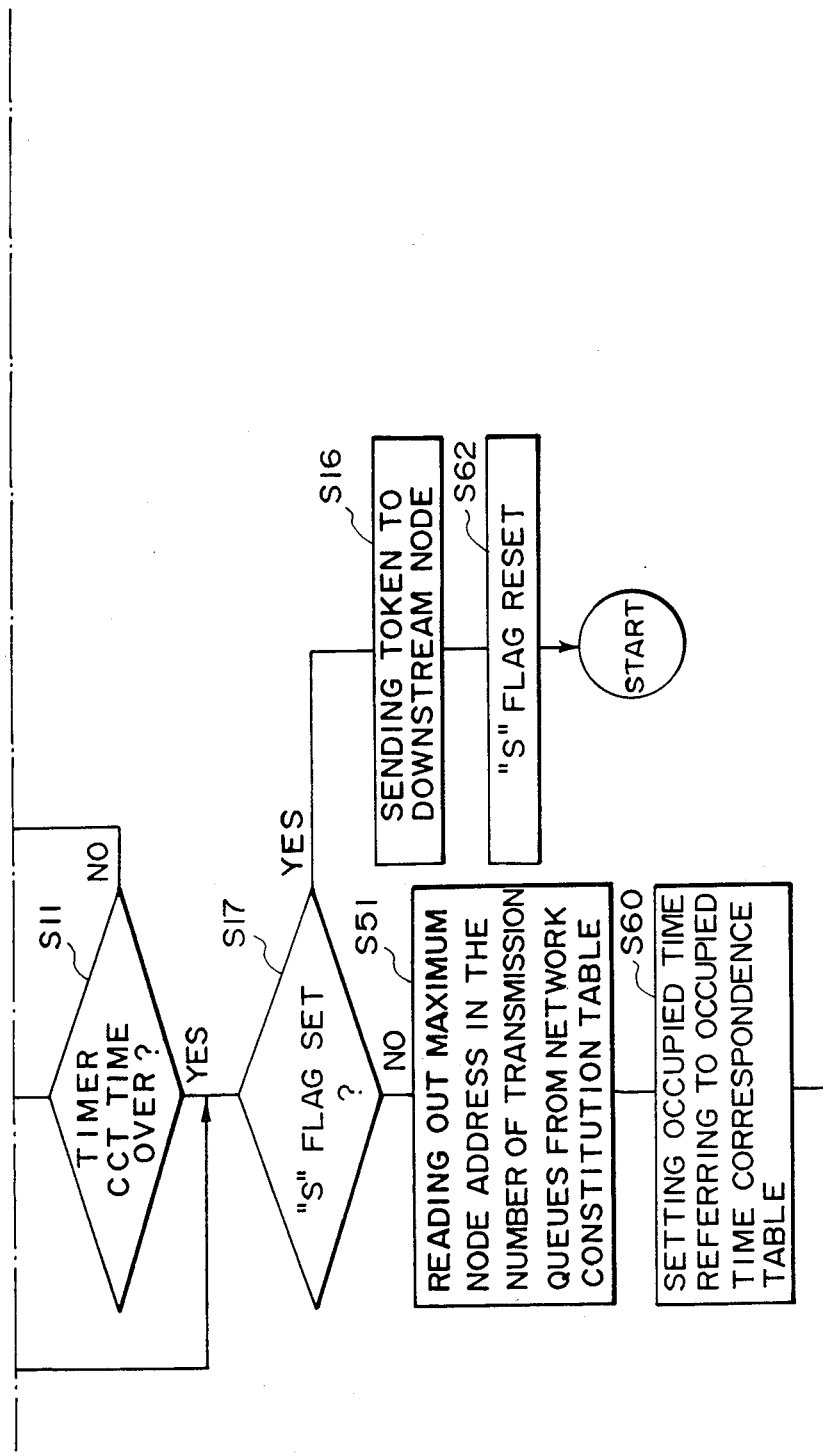
Figure 15B:
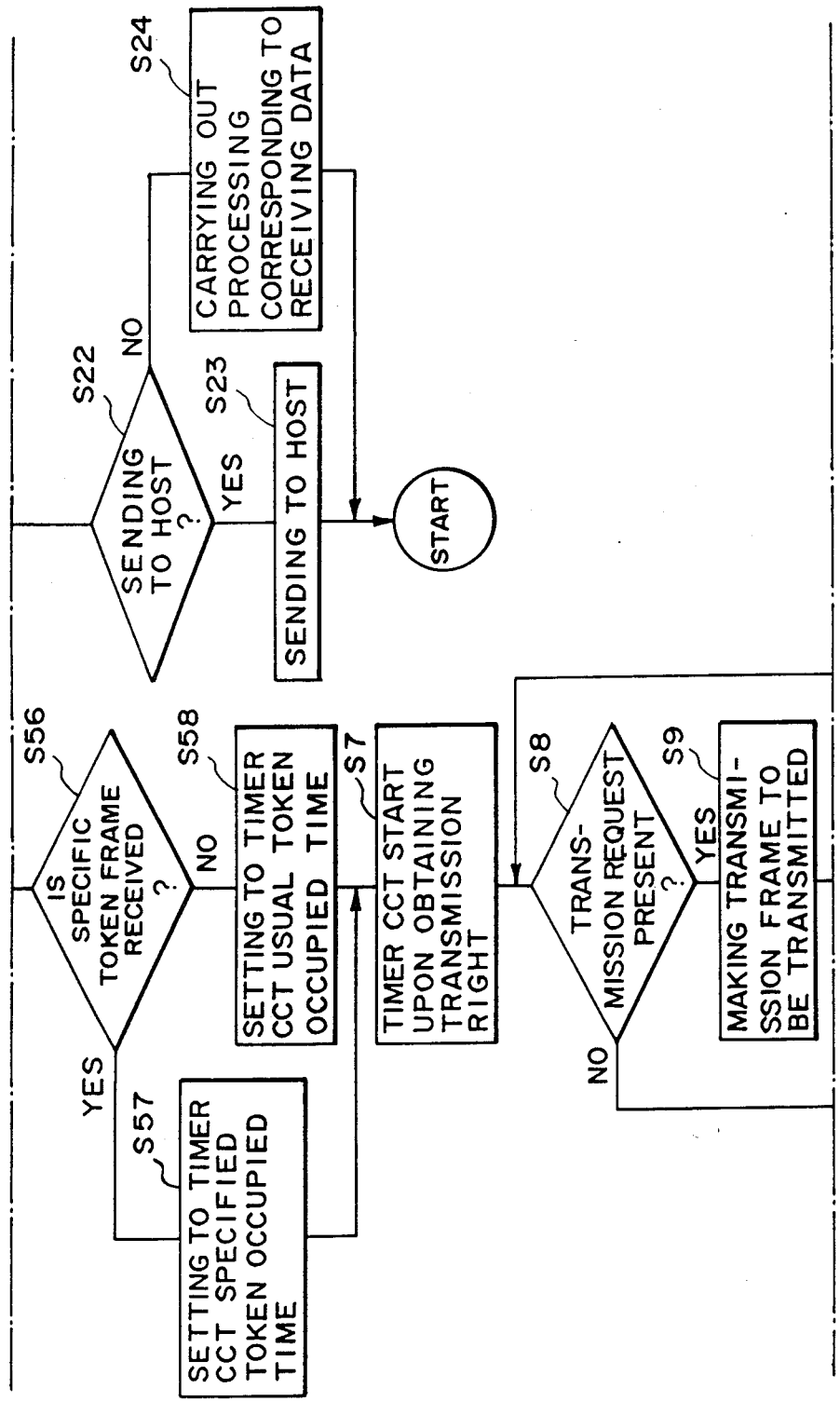

Sixth Embodiment (FIGS. 14 and 15)

In the above embodiment, the transmission right is assigned to the node having the largest number of transmission queues by using the specific token frame 400 shown in FIG. 5E. The node sends back the token to the specific token frame source node after transmission is completed. However, the node having received the token frame can assign this token to the normal downstream node.

In this case, the master node can alternately perform normal transmission right assignment to the downstream node and the transmission right assignment for the node having the largest number of transmission queues. Instead of setting the token occupied time using the preset value of the occupied time setting switch 15 as the reference, a table (below) representing the token occupied time corresponding to the number of transmission queues can be stored in the CPU 5 or memory circuit 6. Occupied time control can be achieved according to the table below.

TABLE

| No. of Transmission Queues | Occupied Time |
| --- | --- |
| 3 or less | 1 |
| 5 or less | 1.5 |
| 7 or less | 2 |
| 9 or less | 2.5 |
| 9 or more | 3 |

The transmission control sequences of the master and slave nodes in the mode described above will be described with reference to FIGS. 14 and 15, respectively.

The same steps as in FIGS. 12 and 13 denote the same operations in FIGS. 14 and 15, and a detailed description thereof will be omitted.

If the DA 202 of the token frame received by the master node is determined in step S5 to be the self node address, i.e., the address preset by the address setting circuit 8, the flow immediately advances to step S7 and the master node obtains the transmission right. In this case, the preset time of the timer circuit 10 is one token occupied time.

When the lapse of the transmission occupied time is determined in step S11 or transmission processing is completed in step S8, the flow advances to step S17. The CPU 5 checks in step S17 whether a flag S (not shown) in the memory circuit 6 is set. If NO in step S17, step S51 is executed. In step S60, the occupied time corresponding to the node having the largest number of transmission queues is determined by referring to the occupied time correspondence table. The determined occupied time is set in the token occupied time 210. In step S55, the token frame 400 is sent out to the node selected in step S51. The flag S is set in step S61, and the flow returns to step S1.

However, if YES in step S17, step S16 is executed to send the token to the predetermined downstream node in the network. In step S62, the flag S is reset.

The master node sends the specific token to the node having the largest number of transmission queues in the network upon the first reception of the token. Upon the second reception of the token, the token can be sent to the normal downstream node.

Processing for the specific token frame 400 in steps S15 and S17 in FIG. 13 is inhibited for the slave node, as shown in FIG. 15. In other words, the flow directly jumps from step S14 to step S16.

Seventh Embodiment

A seventh embodiment of the present invention will be described in detail with reference to FIGS. 16 to 19.

Figure 16:
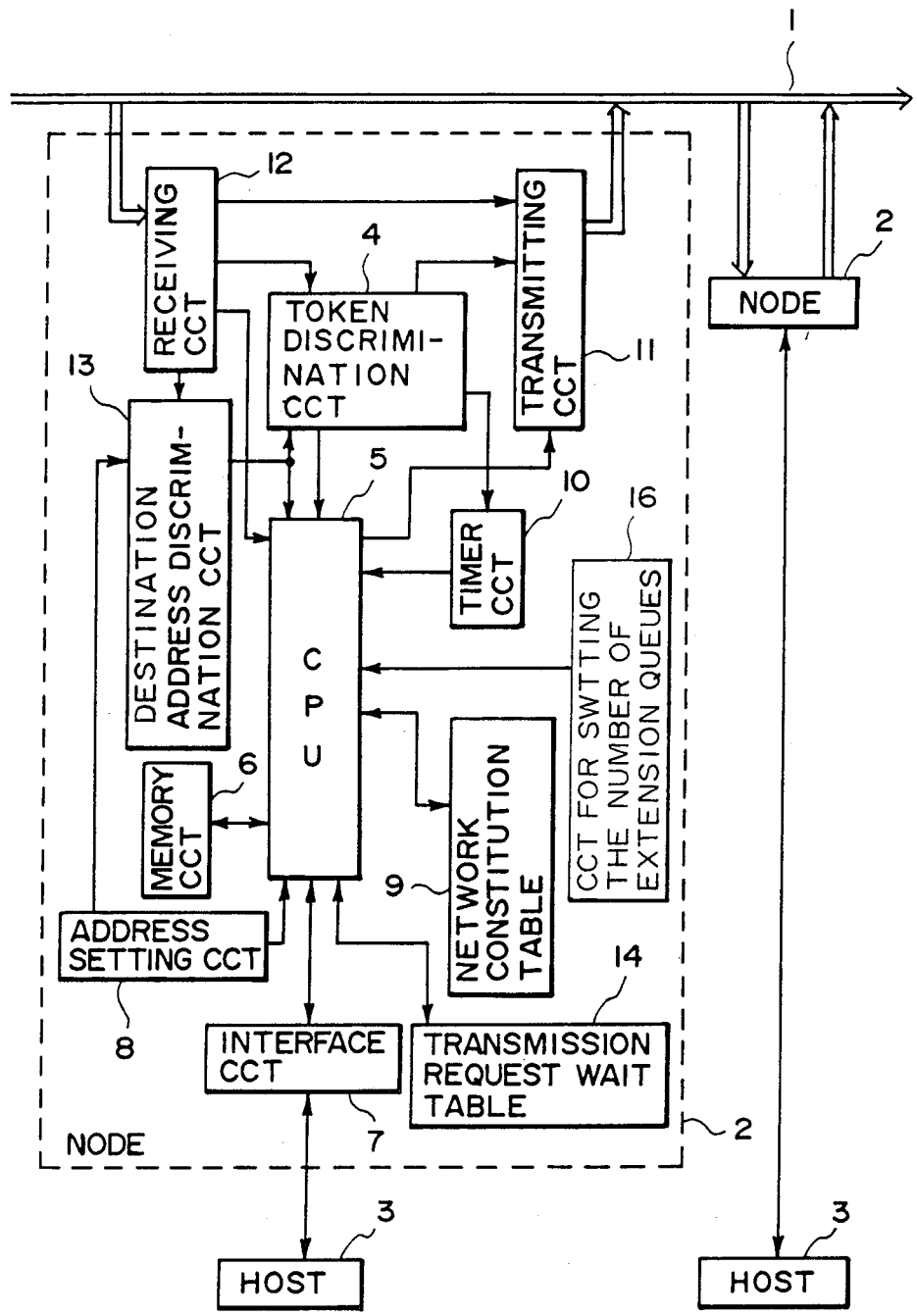
FIG. 16 is a block diagram showing another arrangement of a transmission device.

Node Constitution (FIG. 16)

FIG. 16 is a block diagram of a node of the seventh embodiment of the present invention. Such nodes constitute the network system in FIG. 2. The description of the network system in FIG. 2 has been made and will be omitted.

The same reference numerals as in FIG. 4 denote the same parts in FIG. 16, and a detailed description thereof will be omitted. The node in FIG. 16 includes a circuit 16 for setting the number of extension queues. A switch or the like in the circuit 16 sets a preset value subjected to comparison so as to determine whether the transmission right occupied time is extended according to information representing the number of transmission requests in awaiting (to be referred to as a transmission queue hereinafter) in the transmission request wait table 14. The number of transmission queues represents the number of transmission requests currently registered as the transmission request in awaiting in the node. In other words, the number of transmission queues represents the number of transmission requests in awaiting since all transmission requests cannot be processed within the maximum token occupied time.

According to the hardware configuration and the principle of token passing, the token is sequentially assigned to the downstream nodes within the network, and data transmission using the single common transmission line is performed.

The network system of this embodiment is exemplified as the one shown in FIG. 2.

Network Transmission Frame (FIG. 17)

The formats of the transmission frames used in the network of this embodiment are shown in FIGS. 17A 17B, and 17C. FIG. 17A shows a token frame 500. The token frame 500 includes a source address (to be referred to as an SA hereinafter) 501, a destination address (to be referred to as a DA hereinafter) 502, and a token code (to be referred to as a transmission queue) 503 representing the token frame. FIG. 17B shows a data transmission frame 550. The data transmission frame 550 includes a transmission code 505 representing a data frame, and transmission information 506. FIG. 17C shows a token occupied time extension command frame (to be referred to as a command frame) 600. The command frame 600 includes a token hold extension 507 for designating an extension of the maximum token occupied time, i.e., the transmission right holding time extension, determined by the token, and additional information 508 representing the extended maximum token occupied time.

In this embodiment, there is provided a specific node (to be referred to as a master node) for receiving all token frames 500 from the transmission line 1, monitors whether the token frame 500 is passing within the network, regenerates a token if the token disappears upon completion of token passing, and circulates the token frame within the network again.

Figure 18A:
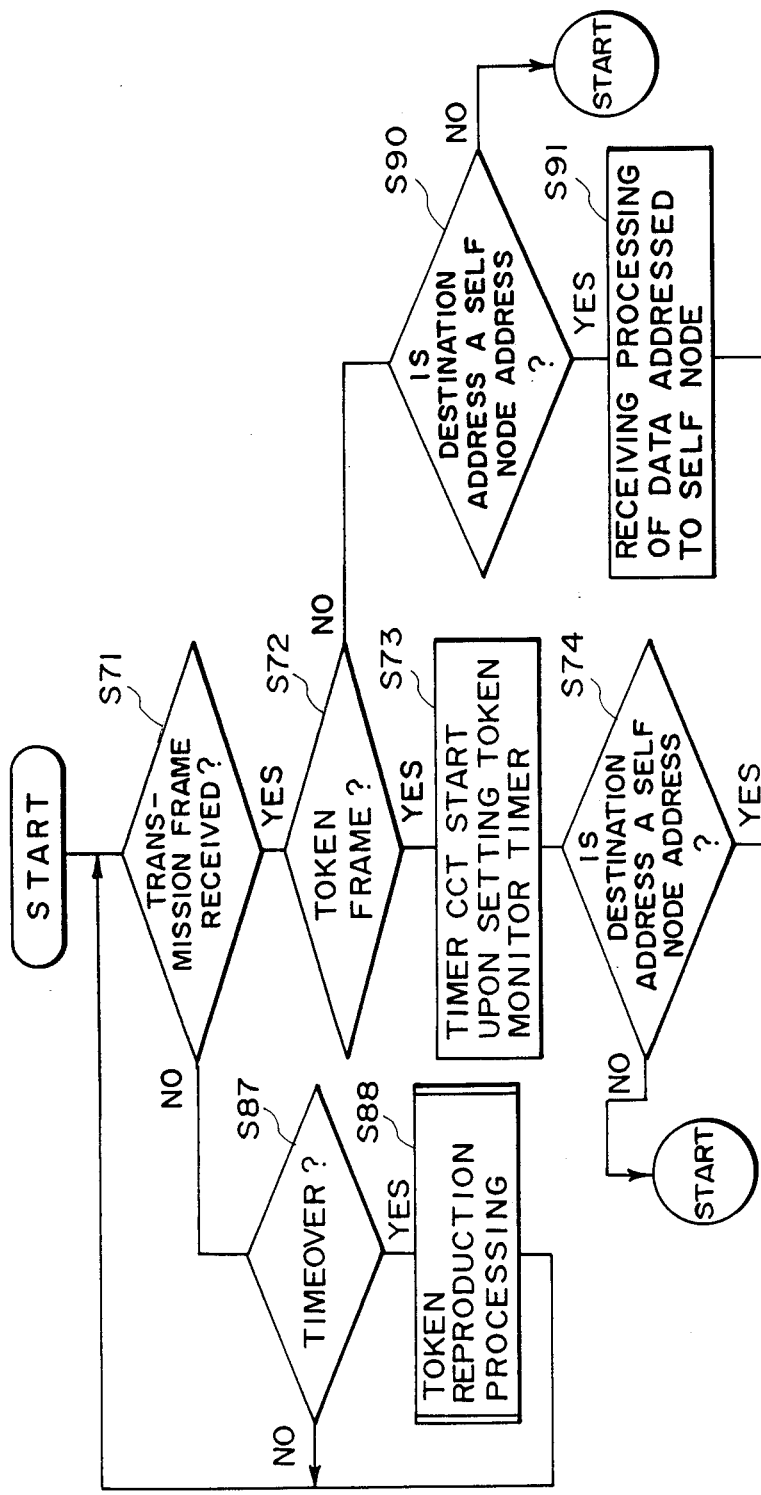
Figure 18B:
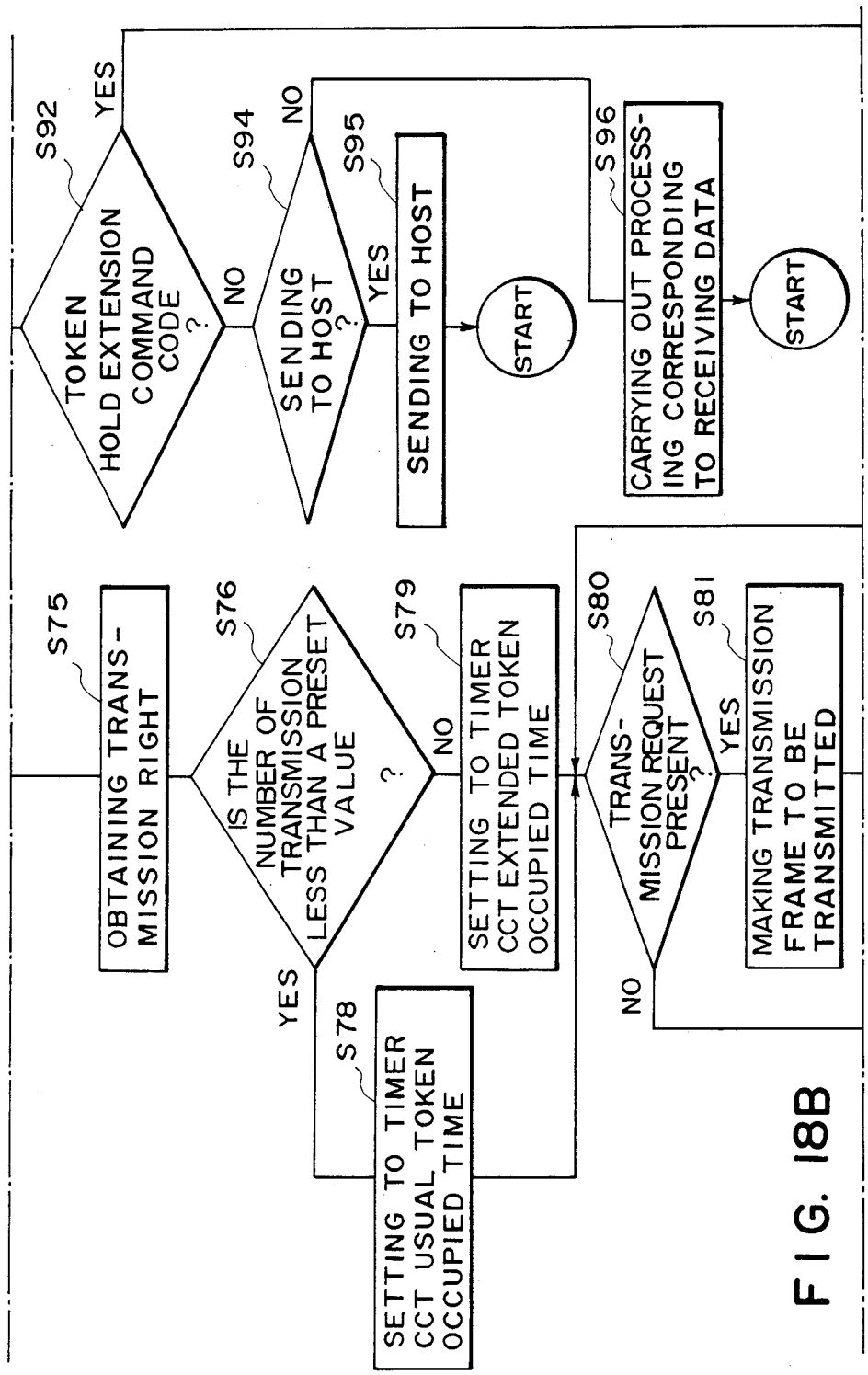
Figure 19B:
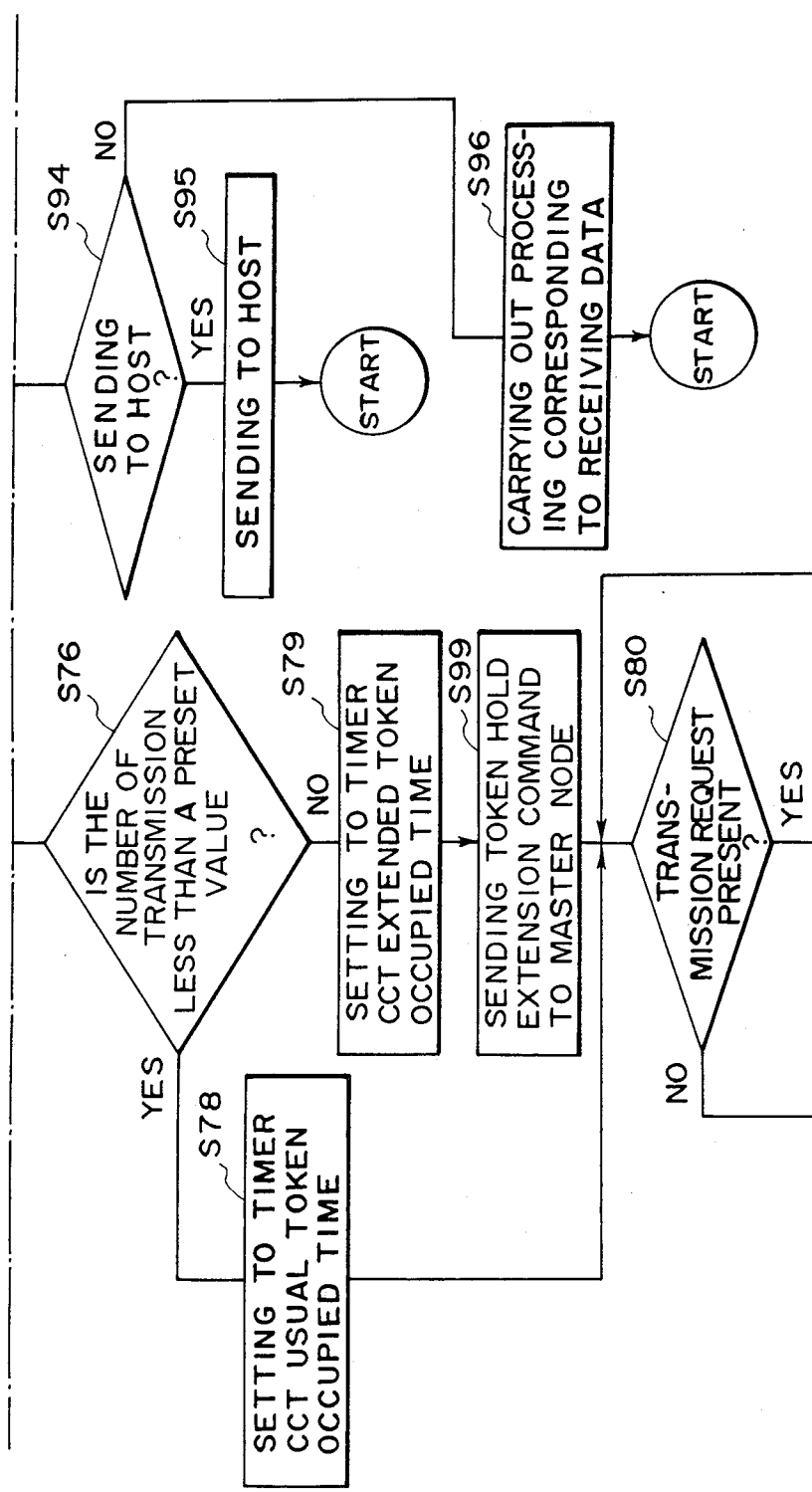

Data Transmission Control (FIGS. 18 and 19)

Data transmission control of this embodiment will be described with reference to the flow charts of FIGS. 18 and 19.

Master Node Data Transmission Control (FIG. 18)

FIG. 18 is a flow chart showing master node data transmission control.

Master node data transmission control will be described with reference to FIG. 18 below.

The master node sets a time (the normal maximum transmission right occupied time+$\alpha$) in the timer circuit 10. Whether the receiving circuit receives the transmission frame from the transmission line 1 is determined in step S1. If NO in step S1, the flow advances to step S87 to determine whether the preset time of the timer circuit 10 has elapsed. If NO in step S87, the flow returns to step S71. However, if YES in step S87, the flow advances to step S88 since the token frame 500 disappears from the network. The token frame is made again in step S88. Token frame making can be performed by retrieving the network constitution table 9. Alternatively, the network constitution table 9 is renewed by network reconstruction processing (reconfirmation processing of the network constitution), and the token frame regeneration is performed on the basis of the renewed network constitution table 9. After the token frame is sent out, the flow returns to step S71.

Upon reception of the transmission frame in step S71, the flow advances to step S72 to check the transmission code area (503, 505 and 507) in the transmission frame to be the token code 503. If token frame reception is determined in step S72, the flow advances to step S73. A (usual maximum transmission right occupied time+$\alpha$) time (a token monitor timer) is set in the timer circuit 10, and the timer circuit is started.

In step S74, the destination address discrimination circuit 13 compares the DA 502 in the received frame with the self node address value set by the address setting circuit 8. If a noncoincidence occurs in step S74, i.e., if the frame is determined not to be the self node destination transmission frame, the flow returns to step S71. The master node prepares for reception of the transmission frame of its own.

However, if YES in step S74, the flow advances to step S75 to obtain the transmission right. In step S76, the number of transmission queues from the transmission wait table 14 is compared with the value preset by the circuit 16. If the number of transmission queues is less than the preset value, the flow advances to step S78. The time (i.e., the usual maximum transmission right occupied time) is set as the token monitor timer in the timer circuit 10. The timer circuit 10 is then started, and the flow advances to step S80. If the number of transmission queues is larger than the preset value, the flow advances to step S79. The time (i.e., the usual maximum transmission right occupied time+occupied time to be extended) is set in the timer circuit 10, and the timer circuit 10 starts counting. The flow then advances to step S80. The occupied time to be extended is the usual maximum transmission right occupied time.

Whether data (to be transmitted) from the host device 3 or the self node is present, i.e., whether the transmission request is present, is determined in step S80. If NO in step S80, the flow advances to step S84. However, if YES in step S80, the transmission frame subjected to data transmission is made. More specifically, the node address (i.e., the destination address) assigned to the destination node is set in the DA 502, and the self node address (i.e., the source address) set by the address setting circuit 8 is set in the SA 501. Subsequently, the transmission code 505 and the transmission information 506 are set to format the data transmission frame 550. The resultant data transmission frame 550 is sent to the destination node according to the predetermined transmission cotrol sequence in step S82. This sequence is known to those skilled in the art, and will be omitted.

Whether the preset time of the timer circuit 10 has elapsed is determined in step S83. If YES in step S83, a count end status signal is supplied from the timer circuit 10 to the CPU 5. However, if NO in step S83, i.e., within the token occupied time, the flow returns to step S80 again, and next transmission data processing is executed.

If the preset time has elapsed, the flow advances to step S84 to set the time (the usual maximum tarnsmission right occupied time+$\alpha$) and the token monitor timer is set in the timer circuit 10, and the timer circuit 10 is started. The flow advances to step S85 to made the normal token frame 500 for the downstream node to be assigned with the token next. The resultant token frame 500 is sent onto the transmission line 1 through the transmitting circuit 11, and the transmission right is assigned to the downstream node. The flow returns to step S71.

If token frame reception is not detected in step S72, the flow advances to step S90. In this step, the destination address discrimination circuit 13 compares the DA 502 in the received frame with the self node address set by the address setting circuit 8 in the same manner as in step S74. If a noncoincidence occurs in setp S90, i.e., if the frame is determined not to be the self node destination transmission frame, the flow returns to step S71. The node waits for reception of the self node destination transmission frame.

If YES in step S90, the flow advances to step S91. The self device destination data transmission frame 550 is received within itself, and it is determined whether the received frame 500 is the command frame 600 received in step S92. If YES in step S92, the flow advances to step S93 to set a sum of the (usual maximum transmission right occupied time+α) time and the extended transmission right occupied time in the additional information as a token monitor timer in the timer circuit 10. The sum is designated by the corresponding frame. The timer circuit is started. Token disappearance decision is inhibited even if the token frame 500 is not transmitted when the usual transmission right occupied time has elapsed. The flow then returns to step S71.

If the frame is determined in step S92 not to be the command frame 600, i.e., upon reception of the data transmission frame 550, the flow advances to step S94 to determine whether the received information is information to be sent to the host device 3. If YES in step S94, the data is simply analyzed and edited in step S95. The resultant data is sent to the host device 3. The flow returns to step S71, and the node prepares for the next data transmission.

If NO in step S94, i.e., if data is determined to be the internode transmission data, the flow advances to step S96 to perform processing for the received data. The flow then returns to step S71 to prepare for the next transmission frame reception.

In this embodiment, the master node receives the transmission right occupied time extension request from the node. Even if the token frame 500 is not sent out after the lapse of the normal transmission right occupied time, token disapoearance is not determined.

Slave Node Data Transmission Control (FIG. 19)

Data transmission control of other nodes, i.e., slave nodes constituting the network will be described with reference to the flow chart in FIG. 19.

The same steps as in FIG. 18 denote the same operations in FIG. 19, and a detailed description thereof will be omitted.

If transmission frame reception of the slave node is not determined in step S71, the flow immediately returns to step S71. In this case, the slave node waits for reception of the data transmission frame. If token frame reception is determined in step S72, the flow immediately advances to step S74.

If the number of transmission queues is large so that extension of the occupied time is requested in step S79, the flow does not advance to step S80 but to step S99. The command frame is made prior to transmission of the data transmission frame 550. The command frame is sent to the master node. In this case, the usual transmission right occupied time as the token hold extension time is set as the additional information 508. Therefore, transmission can continue for a time twice the usual occupied time. Thereafter, the flow advances to step S80, and transmission processing is performed, as in the master node.

If transmission processing is oompleted, the flow advances to step S84 in the case of the master node. However, in the case of the slave node, the flow advances to step S85 to make the token frame 500 and to send it to the downstream node. The flow then returns to step S71.

If token frame reception is not determined in step S72, the operations is step S90 and the subsequent steps are performed, as in the master node. It should be noted that the slave node does not receive the command frame 600 and the flow unconditionally jumps from step S91 to step S94.

The node having the large number of transmission requests in awaiting can transmit data for a time twice the usual token occupied time, thereby effectively performing transmission request processing. In other words, equipment having a larger number of transmission requests can receive better transmission service than equipment having a smaller number of transmission requests.

Eighth Embodiment

In the above description, the token hold time extension is limited to an extension by one token occupied time. However, instead of using the present value of the circuit 16 as reference for determining the extension of the token occupied time, a table representing the relationship between the number of transmission queues and the token occupied time to be extended may be arranged in the CPU 5 or a memory circuit. The extension of the token occupied time can be performed by retrieving this table (described later).

The eighth embodiment of the present invention will be described in detail with reference to FIGS. 20 to 22.

Node Constitution (FIG. 20)

FIG. 20 is a block diagram of a node according to the eighth embodiment of the present invention. Such nodes constitute the network system shown in FIG. 2. The network system in FIG. 2 has been described and will be omitted. The same reference numerals as in FIG. 20 denote the same parts in FIG. 4, and a detailed description thereof will be omitted. The node in FIG. 20 includes an occupied time correspondence table 17 for determining a transmission right occupied time in response to transmission request waiting information (to be referred to as a transmission queue hereinafter) in the transmission request wait table 14.

The network system of this embodiment is exemplified as the one shown in FIG. 2. In the network system in FIG. 20, the three transmission frames in FIGS. 17A to 17C are used to perform data transmission.

Figure 21A:
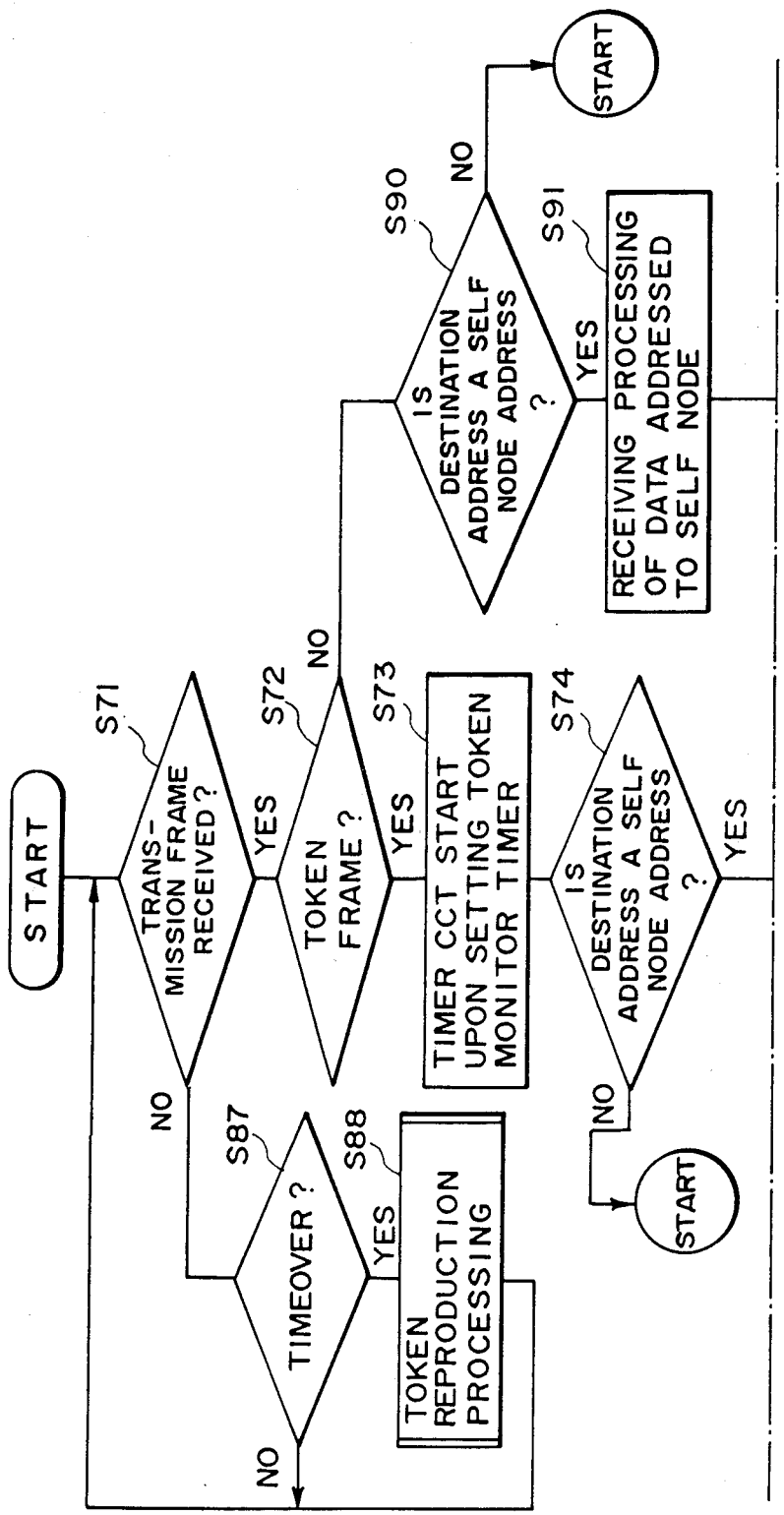
Figure 21B:
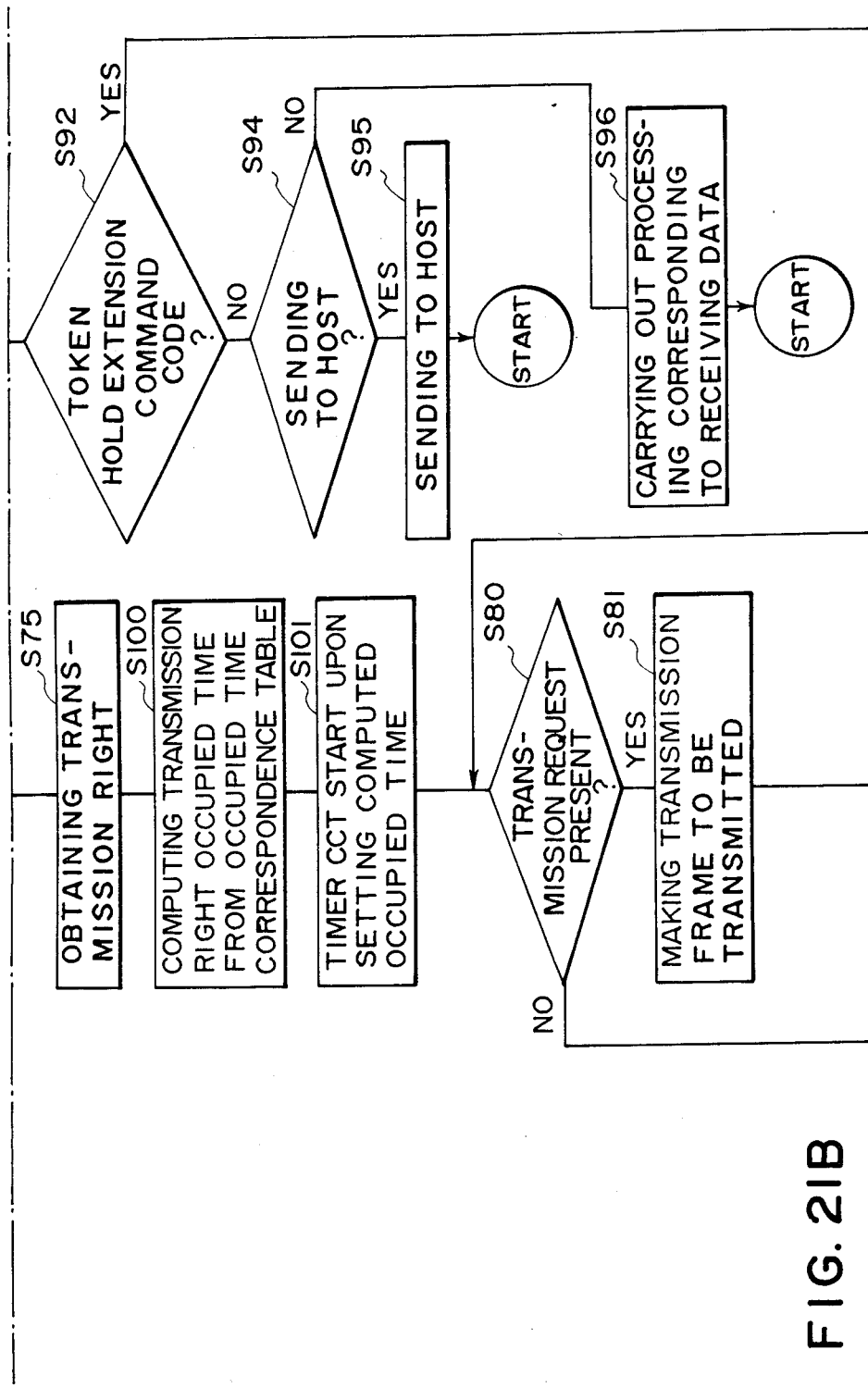
Figure 22B:
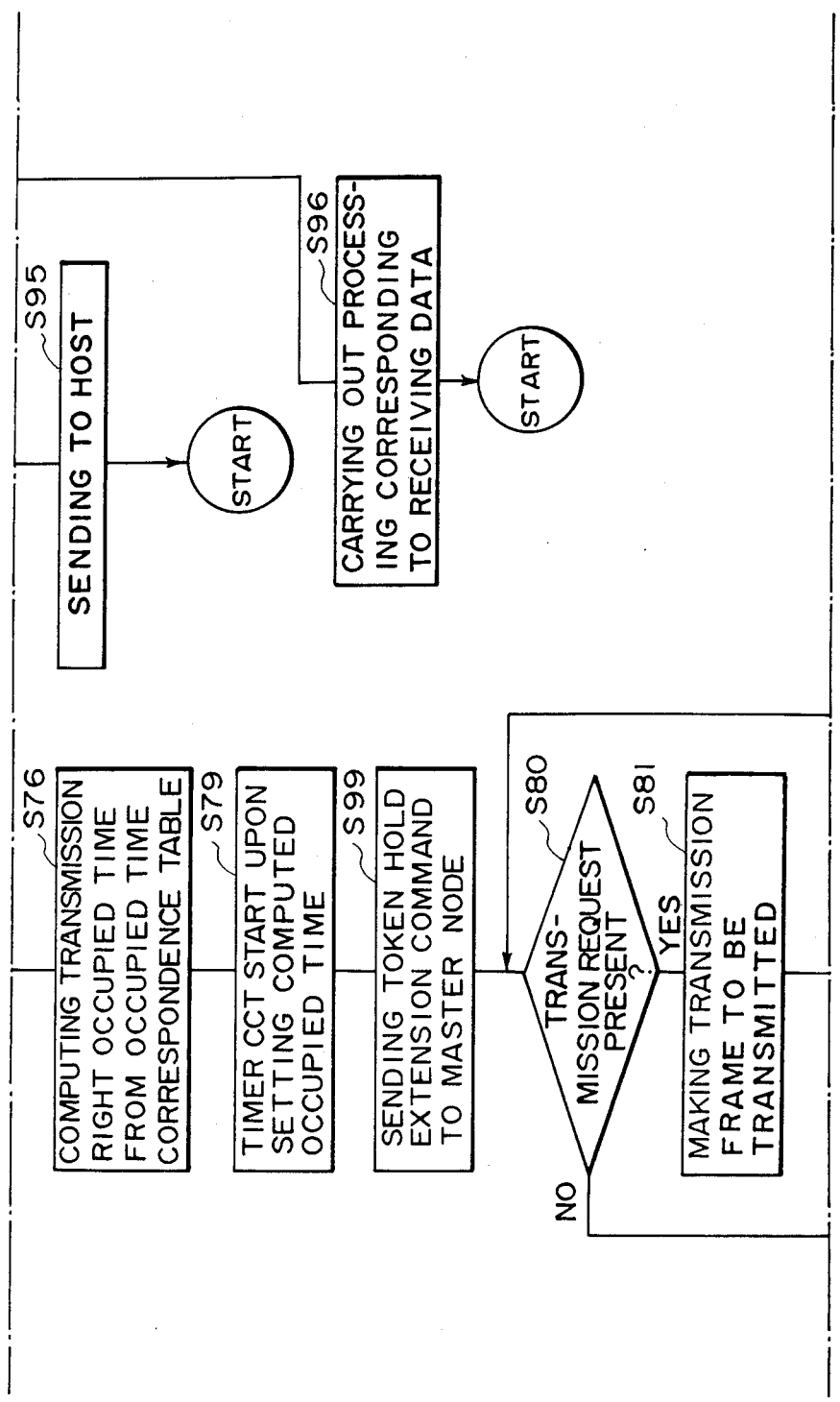

Data Transmission Control (FIGS. 21 and 22)

Data transmission control of the eighth embodiment of the present invention will be described with reference to the flow charts in FIGS. 21 and 22.

Master Node Data Transmission Control (FIG. 21)

FIG. 21 is a flow chart showing master node data transmission control.

Master node data transmission will be described with reference to FIG. 21.

The same steps as in FIG. 18 denote the same operations in FIG. 21, and a detailed description thereof will be omitted.

Although one of the two occupied times is selected as to whether or not the number of transmission queues exceeds a predetermined or preset value in steps S76, S78, and S79 in the flow chart in FIG. 18, the flow advances to step S75 in FIG. 21 to determine if the self node destination transmission frame is detected. After the transmission right is obtained, the flow advances to step S100. A transmission occupied time is computed in step S100 according to the number of transmission queues in the transmission request wait table 14 and the preset value in the occupied time correspondence table 17. The transmission right occupied time computed in step S100 is set in the timer circuit 10 in step S101. The timer circuit is started, and the flow advances to step S80.

The numeric value of the occupied time represents a ratio of the token hold extension time to the usual occupied time. The occupied time correspondence table 17 is exemplified below.

TABLE

| No. of Transmission Queues | Occupied Time |
| --- | --- |
| 3 or less | 1 |
| 5 or less | 1.5 |
| 7 or less | 2 |
| 9 or less | 2.5 |
| 9 or more | 3 |

Slave Node Data Transmission Control (FIG. 22)

Data transmission control of other nodes, i.e., slave nodes constituting the network will be described with reference to the flow chart of FIG. 22.

The same steps as in FIG. 21 denote the same operations in FIG. 22, and a detailed description thereof will be omitted.

If transmission frame reception of the slave node is not determined in step S71, the flow immediately returns to step S71, and the slave node waits for reception of a data transmission frame. If token frame reception is determined in step S72 the flow immediately advances to step S74.

After the transmission right occupied time is set in step S79, the flow does not advance to step S80 but to step S99. Prior to transmission of the data transmission frame 550, the command frame is made and sent to the master mode. The transmission right occupied time computed in step S76 is set as the transmission right occupied time in the additional information 508. Therefore, transmission can be performed for a period of time corresponding to the number of transmission queues. The flow then advances to step S80 and the same transmission processing as in the master node is performed.

If transmission processing is completed, the flow advances to step S84 in the case of the master node. However, in the case of the slave node, the flow advances to step S85 to make the token frame 200. The token frame 200 is sent to the downstream node, and the flow returns to step S71.

If token frame reception is not determined in step S72, the operations in step S90 and the subsequent steps are performed, as in the master node. It should be noted the command frame 600 is not received in the slave node, and that the flow unconditionally advances from step S91 to step S94.

As is apparent from the above description, the node having a larger number of transmission queues can transmit data for the period of time corresponding to the number of transmission queues, thereby improving efficiency of transmission request processing. In other words, equipment having a larger number of transmission requests can receive better transmission service (the token hold extension time is longer than the usual occupied time) than equipment having a smaller number of transmission requests.

The present invention has been exemplified by the particular embodiments. However, the present invention is not limited to these embodiments. Various changes and modifications may be made within the spirit and scope of the invention and the appended claims.

What is claimed is:

1. A data transmission system including a plurality of transmission devices connected to each other through a transmission medium, wherein only a transmission device to which a transmission right has been assigned is permitted to perform data transmission between said assigned transmission device and another transmission device, wherein one of said plurality of transmission device comprises:

means for recognizing the number of transmission requests which could not be processed within a maximum token occupied time of the other transmission devices;

means for receiving the transmission right; and means for assigning the transmission right to the transmission device which has the largest number of recognized transmission requests.

2. A system according to claim 1, wherein each transmission device comprises means for transmitting data on the transmission medium representing the number of transmission requests thereof.

3. A system according to claim 1, wherein said one of said plurality of transmission devices comprises means for storing the recognized number of transmission requests.

4. A system according to claim 1, wherein the transmission device, to which said one of said plurality of transmission devices has assigned the transmission right, comprises means for assigning the transmission right to said one of said plurality of transmission devices after completion of data transmission.

5. A system according to claim 1, wherein the said assigning means assigns the transmission right by transmitting and receiving a token between the plurality of transmission devices.

6. A data transmission system including a plurality of transmission devices connected to each other through a transmission medium, wherein only a transmission device to which a transmission right has been assigned is permitted to perform data transmission between said assigned transmission device and another transmission device, wherein one of said plurality of transmission devices comprises:

means for recognizing the number of transmission requests which could not be processed within a maximum token occupied time of the other transmission devices;

means for receiving the transmission right; and means for assigning the transmission right alternately to a transmission device chosen in accordance with the number of recognized transmission requests and a transmission device chosen without regard to the number of recognized transmission requests.

7. A system according to claim 6, wherein each transmission device comprises means for transmitting data on the transmission medium representing the number of transmission requests thereof.

8. A system according to claim 6, wherein said one of said plurality of transmission devices comprises means for storing the recognized number of transmission requests.

9. A system according to claim 6, wherein the transmission device, to which said one of said plurality of transmission devices has assigned the transmission right, comprises means for assigning the transmission right to said one of said plurality of transmission device after a completion of data transmission.

10. A system according to claim 6, wherein said assigning means assigns the transmission right by transmitting and receiving a token between said plurality of transmission devices.

11. A data transmission system including a plurality of transmission devices connected to each other through a transmission medium, wherein only a transmission device to which a transmission right has been assigned is permitted to perform data transmission between said assigned transmission device and another transmission device, wherein one of said plurality of transmission devices comprises:
   means for recognizing the number of transmission requests which could not be processed within a maximum token occupied time of the other transmission devices;
   means for receiving the transmission right; and
   means for assigning the transmission right to a plurality of transmission devices chosen in accordance with the number of recognized transmission requests in a predetermined sequence.

12. A system according to claim 11 wherein each transmission device comprises means for transmitting data on the transmission medium representing the number of transmission requests thereof.

13. A system according to claim 11, wherein said one of said plurality of transmission devices comprises means for storing the recognized number of transmission requests.

14. A system according to claim 11, wherein the transmission device, to which said one of said plurality of transmission devices has assigned the transmisison right, comprises means for assigning the transmission right to said one of said plurality of transmission devices after completion of data transmission.

15. A system according to claim 11, wherein said assigning means assigns the transmission right by transmitting and receiving a token between said plurality of transmission devices.

16. A system according to claim 11, wherein one of said plurality of transmission devices, to which said one of said plurality of transmission devices has assigned the transmission right, comprises means for performing data transmission after completion of data transmission to another transmission device.

17. A data transmission system including a plurality of transmission devices connected to each other through a transmission medium, wherein only a transmission device to which a transmission right has been assigned is permitted to perform data transmission between said assigned transmission device and another transmission device, wherein one of said plurality of transmission device comprises:
   means for recognizing the number of transmission requests which could not be processed within a maximum token occupied time of the other transmission devices;
   means for receivintg the transmission right; and
   means for assigning the transmission right to a transmission device which has the largest number of recognized transmission requests, and for permitting said assigned transmission device to perform data transmission during a period of time corresponding to the number of recognized transmission requests.

18. A system according to claim 17, wherein the transmission device, to which said one of said plurality of transmission devices has assigned the transmission right, comprises means for performing data transmission during a period of time corresponding to the number of transmission requests.

19. A system according to claim 17, wherein in the event that the number of transmission requests is in excess of a predetermined number, said assigning and permitting means of said one of said plurality of transmission devices permits a transmission device to which the transmission right is assigned to perform data transmission during a period of time longer than the predetermined period of time.

20. A system according to claim 17, wherein each transmission device comprises means for transmitting data on the transmission medium representing the number of transmission requests thereof.

21. A system according to claim 17, wherein said one of said plurality of transmission devices comprises a means for storing the number of recognized transmission requests.

22. A system according to claim 17, wherein the transmission device, to which said one of said plurality of transmission devices has assigned the transmission right, comprises means for assigning the transmission right to said one of said plurality of transmission devices after completion of data transmission.

23. A system according to claim 17, wherein said assigning means assigns the transmission right by transmitting and receiving a token between said plurality of transmission devices.

24. A data transmission system including a plurality of transmission devices connected to each other through a transmission medium, wherein only a transmission device to which a transmission right has been assigned is permitted to perform data transmission between said assigned transmission device and another transmission device during a given transmission occupied time, wherein the transmission right is assigned by means of transmitting and receiving a token between said plurality of transmission devices through the transmission medium, and wherein one of said plurality of transmission devices comprises:
   means for monitoring the disappearance of the token from the system by determining whether the token is transmitted from any one of said plurality of transmission devices through the transmission medium within a predetermined time; and
   wherein each of said plurality of transmission devices comprises:
      means for receiving the transmission right;
      means for extending the transmission occupied time on the basis of a number of transmission requests which could not be processed within a maximum token occupied time;
      means for assigning the transmission right to said another transmission device by transmitting the token to said another transmission device through the transmission medium; and
      means for informing said one of said plurality of transmission devices of an extension of the transmission occupied time.

25. A system according to claim 24, wherein said one of said plurality of transmission devices comprises means for producing a new the token when token disappears from the system, and for transmitting the new token to any one of said plurality of transmission devices.

26. A system according to claim 24, wherein said monitoring means of said one of said plurality of transmission devices extends the time for monitoring the disappearance of the token from the system if informed of an extension of the transmission occupied time.

27. A system according to claim 24, wherein said extending means extends the transmission occupied time if the number of transmission requests is in excess of a predetermined number.

28. A data transmission system including a plurality of transmission devices connected to each other through a transmission medium, wherein only a transmission device to which a transmission right has been assigned is permitted to perform data transmission between said assigned transmission device and another transmission device during a given transmission occupied time, wherein the transmission right is assigned by means of transmitting and receiving a token between said plurality of transmission devices through the transmission medium, and wherein one of said plurality of transmission devices comprises:
  means for monitoring the disappearance of the token from the system by determining whether the token is transmitted from any one of said plurality of transmission devices through the transmission medium within a predetermined time; and
wherein each of said plurality of transmission devices comprises:
  means for receiving the transmission right;
  means for determining the transmission occupied time base on the number of transmission requests which could not be processed within a maximum token occupied time;
  means for assigning the transmission right to said another transmission device by transmitting the token to said another transmission device through the transmission medium; and
  means for informing said specific transmission device of the determined transmission occupied time.

29. A system according to claim 28, wherein said one of said plurality of transmission devices comprises means for producing a new token when the token disappears from the system, and for transmitting the new token to any one of said plurality of transmission devices.

30. A system according to claim 28, wherein said monitoring means of said one of said plurality of transmission device modifies the time for monitoring the disappearance of the token from the system in accordance with the determined transmission occupied time informed by said informing means.

31. A system according to claim 28, wherein said determining means selects one of a plurality of mutually different periods of time in accordance with the number of transmission requests.

* * * * *

UNITED STATES PATENT AND TRADEMARK OFFICE
CERTIFICATE OF CORRECTION

PATENT NO. : 4,780,871
DATED : October 25, 1988
INVENTOR(S) : TADASHI ARAKAWA

Page 1 of 3

It is certified that error appears in the above-identified patent and that said Letters Patent is hereby corrected as shown below:

COLUMN 2

Line 13, "poses" should read --pose--.

COLUMN 3

Line 14, "of a" should read --of the--.

COLUMN 9

Line 49, "sent" should read --send--.

COLUMN 11

Line 24, "Whether" should read --In step S34, whether--.

COLUMN 13

Line 25, "maxium" should read --maximum--.

COLUMN 14

Line 62, "one or" should read --the--.
    Line 64, "tarnsmission" should read --transmission--.

UNITED STATES PATENT AND TRADEMARK OFFICE
CERTIFICATE OF CORRECTION

PATENT NO. : 4,780,871
DATED : October 25, 1988
INVENTOR(S) : TADASHI ARAKAWA

It is certified that error appears in the above-identified patent and that said Letters Patent is hereby corrected as shown below:

COLUMN 18

Line 34, "cotrol" should read --control--.
    Line 44, "tarnsmis-" should read --transmis- --.
    Line 47, "made" should read --make--.
    Line 59, "setp" should read --step--.

COLUMN 19

Line 62, "operations" should read --operation--.

COLUMN 20

Line 12, "as reference" should read --as a reference--.

COLUMN 21

Line 25, "S72 the" should read --S72, the--.

COLUMN 23

Line 57, "receivintg" should read --receiving--.

COLUMN 24

Line 62, "the token when token" should read --token when the token--.

UNITED STATES PATENT AND TRADEMARK OFFICE
CERTIFICATE OF CORRECTION

PATENT NO. : 4,780,871
DATED : October 25, 1988
INVENTOR(S) : TADASHI ARAKAWA

Page 3 of 3

It is certified that error appears in the above-identified patent and that said Letters Patent is hereby corrected as shown below:

COLUMN 26

Line 2, "base" should read --based--.
Line 20, "device" should read --devices--.

Signed and Sealed this

Ninth Day of January, 1990

*Attest:*

JEFFREY M. SAMUELS

*Attesting Officer*  *Acting Commissioner of Patents and Trademarks*